(12) United States Patent
Chalmers et al.

(10) Patent No.: US 12,189,848 B2
(45) Date of Patent: *Jan. 7, 2025

(54) MANAGING DEVICES HAVING ADDITIVE DISPLAYS

(71) Applicant: Apple Inc., Cupertino, CA (US)

(72) Inventors: Devin W. Chalmers, Oakland, CA (US); William D. Lindmeier, San Francisco, CA (US); Gregory Lutter, Boulder Creek, CA (US); Jonathan C. Moisant-Thompson, San Jose, CA (US); Rahul Nair, Hayward, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/394,897

(22) Filed: Dec. 22, 2023

(65) Prior Publication Data

US 2024/0143071 A1 May 2, 2024

Related U.S. Application Data

(63) Continuation of application No. 17/397,719, filed on Aug. 9, 2021, now Pat. No. 11,907,420, which is a (Continued)

(51) Int. Cl.
*G06F 3/01* (2006.01)
*G02B 27/00* (2006.01)
(Continued)

(52) U.S. Cl.
CPC .......... *G06F 3/013* (2013.01); *G02B 27/0093* (2013.01); *G02B 27/0172* (2013.01);
(Continued)

(58) Field of Classification Search
CPC .............. G06F 3/03545; G06F 3/0446; G06F 3/04166; G06F 3/0442; G06F 3/04162;
(Continued)

(56) References Cited

U.S. PATENT DOCUMENTS 10,810,701 B2 * 10/2020 Suzuki ................... G09G 5/391
2002/0167461 A1 11/2002 Bronson
(Continued)

FOREIGN PATENT DOCUMENTS

CN 104781853 A 7/2015
CN 107209390 A 9/2017
(Continued)

OTHER PUBLICATIONS

Office Action received for Korean Patent Application No. 10-2021-7033893, mailed on Jan. 18, 2024, 9 pages (4 pages of English Translation and 5 pages of Official Copy).
(Continued)

*Primary Examiner* — Nelson M Rosario
(74) *Attorney, Agent, or Firm* — DLA Piper LLP (US)

(57) ABSTRACT

One or more techniques for managing virtual objects between one or more displays are described. In accordance with some embodiments, exemplary techniques for displaying a virtual object are described.

23 Claims, 29 Drawing Sheets

Related U.S. Application Data continuation of application No. PCT/US2020/048842, filed on Aug. 31, 2020.

(60) Provisional application No. 63/067,461, filed on Aug. 19, 2020, provisional application No. 62/907,207, filed on Sep. 27, 2019.

(51) Int. Cl.
  *G02B 27/01* (2006.01)
  *G06T 5/70* (2024.01)
  *G06T 19/00* (2011.01)

(52) U.S. Cl.
  CPC ............ *G02B 27/0179* (2013.01); *G06T 5/70* (2024.01); *G06T 19/006* (2013.01); *G02B 2027/0185* (2013.01); *G02B 2027/0187* (2013.01)

(58) Field of Classification Search
  CPC ...... G06F 3/0383; G06F 3/044; G06F 3/0416; G06F 3/04182; G06F 3/04184; G06F 3/0441
  See application file for complete search history.

(56) References Cited

U.S. PATENT DOCUMENTS

| | | | |
|---|---|---|---|
| 2014/0364209 A1 | 12/2014 | Perry | |
| 2015/0054913 A1 | 2/2015 | Annau et al. | |
| 2016/0240013 A1 | 8/2016 | Spitzer | |
| 2016/0267715 A1* | 9/2016 | Patel ..................... | G09G 5/373 |
| 2018/0096461 A1 | 4/2018 | Okayama et al. | |
| 2018/0136471 A1 | 5/2018 | Miller et al. | |
| 2018/0196512 A1 | 7/2018 | Kim et al. | |
| 2018/0218484 A1 | 8/2018 | Shen et al. | |
| 2018/0365800 A1 | 12/2018 | Suzuki et al. | |
| 2019/0043167 A1 | 2/2019 | Steyskal et al. | |
| 2019/0172399 A1 | 6/2019 | Chen et al. | |
| 2020/0258482 A1* | 8/2020 | Morein ................. | G09G 5/377 |
| 2021/0365113 A1 | 11/2021 | Chalmers et al. | |

FOREIGN PATENT DOCUMENTS

| | | |
|---|---|---|
| CN | 107850934 A | 3/2018 |
| CN | 108289217 A | 7/2018 |
| CN | 108605148 A | 9/2018 |
| CN | 109643515 A | 4/2019 |
| CN | 110083227 A | 8/2019 |
| CN | 110226199 A | 9/2019 |
| EP | 4016250 A1 | 6/2022 |
| JP | 2016-191845 A | 11/2016 |
| JP | 2016-224086 A | 12/2016 |
| JP | 2017-181666 A | 10/2017 |
| JP | 2018-526726 A | 9/2018 |
| KR | 10-2018-0030881 A | 3/2018 |
| WO | 2016/130941 A1 | 8/2016 |
| WO | 2017/015162 A1 | 1/2017 |
| WO | 2018/094086 A1 | 5/2018 |
| WO | 2018/183405 A1 | 10/2018 |

OTHER PUBLICATIONS

Applicant-Initiated Interview Summary received for U.S. Appl. No. 17/397,719, mailed on Aug. 17, 2023, 2 pages.
Decision to Grant received for Japanese Patent Application No. 2021-559557, mailed on Oct. 16, 2023, 3 pages.
International Preliminary Report on Patentability received for PCT Patent Application No. PCT/US2020/048842, mailed on Apr. 7, 2022, 12 pages.
International Search Report and Written Opinion received for PCT Patent Application No. PCT/US2020/048842, mailed on Jan. 15, 2021, 18 pages.
Invitation to Pay Additional Fees received for PCT Patent Application No. PCT/US2020/048842, mailed on Nov. 18, 2020, 10 pages.
Non-Final Office Action received for U.S. Appl. No. 17/397,719, mailed on May 16, 2023, 13 pages.
Notice of Allowance received for U.S. Appl. No. 17/397,719, mailed on Nov. 15, 2023, 3 pages.
Notice of Allowance received for U.S. Appl. No. 17/397,719, mailed on Oct. 10, 2023, 9 pages.
Office Action received for European Patent Application No. 20775102.5, mailed on Sep. 28, 2023, 5 pages.
Office Action received for Japanese Patent Application No. 2021-559557, mailed on Feb. 13, 2023, 5 pages.
Office Action received for Japanese Patent Application No. 2021-559557, mailed on Oct. 11, 2022, 7 pages.
Office Action received for Chinese Patent Application No. 202080026845.1, mailed on Mar. 22, 2024, 21 pages (11 pages of English Translation and 10 pages of Official Copy).
Notice of Allowance received for Chinese Patent Application No. 202080026845.1, mailed on Jul. 8, 2024, 4 pages (1 page of English Translation and 3 pages of Official Copy).
Office Action received for Japanese Patent Application No. 2023-194270, mailed on Aug. 13, 2024, 7 pages (3 pages of English Translation and 4 pages of Official Copy).
Notice of Allowance received for Korean Patent Application No. 10-2021-7033893, mailed on Sep. 24, 2024, 7 pages (2 pages of English Translation and 5 pages of Official Copy).

* cited by examiner

MANAGING DEVICES HAVING ADDITIVE DISPLAYS

CROSS-REFERENCE TO RELATED APPLICATIONS

This application is a continuation of Ser. No. 17/397,719, entitled "MANAGING DEVICES HAVING ADDITIVE DISPLAYS," filed Aug. 9, 2021, which is a continuation of PCT/US2020/048842, entitled "MANAGING DEVICES HAVING ADDITIVE DISPLAYS," filed Aug. 31, 2020, which claims priority to U.S. Provisional Patent Application Ser. No. 63/067,461, entitled "MANAGING DEVICES HAVING ADDITIVE DISPLAYS," filed on Aug. 19, 2020, and U.S. Provisional Patent Application Ser. No. 62/907,207, entitled "TECHNIQUES FOR MANAGING DEVICES HAVING ADDITIVE DISPLAYS FOR USE IN A COMPUTER-GENERATED REALITY ENVIRONMENT," filed on Sep. 27, 2019. The contents of the aforementioned applications are hereby incorporated by reference in their entireties.

FIELD

The present disclosure generally relates to computer-generated reality environments, and, more specifically, to methods and techniques for managing devices having additive displays for use in computer-generated reality environments.

BACKGROUND

Users often use wearable devices, such as head-mounted display (HMD) devices, to interact with computer-generated reality environments. The use of a wearable device is often limited by the amount of the wearable device's battery life. Thus, one or more techniques are needed to manage power usage to conserve battery life in wearable devices.

BRIEF SUMMARY

In accordance with some embodiments, a method is performed at a system having one or more processors, memory, one or more image sensors, and a head-mounted display (HMD) device, the HMD device including a primary display that extends across a field-of-view and has a first resolution, and a secondary display that is physically and electronically coupled to the primary display and has a second resolution that is lower than the first resolution. The method includes: displaying a first portion of a virtual object via the secondary display; and displaying a second portion of the virtual object via the primary display, wherein displaying the second portion of the virtual object via the primary display includes: in accordance with a determination that the second portion of the virtual object is within a predefined distance from an edge of the primary display, applying a visual effect to the second portion of the virtual object.

In accordance with some embodiments, a head-mounted display (HMD) device includes one or more image sensors, a primary display that extends across a field-of-view and has a first resolution, and a secondary display that is physically and electronically coupled to the primary display and has a second resolution that is lower than the first resolution. The HMD device also includes one or more processors; and memory storing one or more programs configured to be executed by the one or more processors. The one or more programs include instructions for: displaying a first portion of a virtual object via the secondary display; and displaying a second portion of the virtual object via the primary display, wherein displaying the second portion of the virtual object via the primary display includes: in accordance with a determination that the second portion of the virtual object is within a predefined distance from an edge of the primary display, applying a visual effect to the second portion of the virtual object.

In accordance with some embodiments, a non-transitory computer-readable storage medium storing one or more programs configured to be executed by one or more processors of an electronic device having one or more sensors, a primary display that extends across a field-of-view and has a first resolution, and a secondary display that is physically and electronically coupled to the primary display and has a second resolution that is lower than the first resolution. The one or more programs include instructions for: displaying a first portion of a virtual object via the secondary display; and displaying a second portion of the virtual object via the primary display, wherein displaying the second portion of the virtual object via the primary display includes: in accordance with a determination that the second portion of the virtual object is within a predefined distance from an edge of the primary display, applying a visual effect to the second portion of the virtual object.

In accordance with some embodiments, a transitory computer-readable storage medium storing one or more programs configured to be executed by one or more processors of an electronic device having one or more sensors, a primary display that extends across a field-of-view and has a first resolution, and a secondary display that is physically and electronically coupled to the primary display and has a second resolution that is lower than the first resolution. The one or more programs include instructions for: displaying a first portion of a virtual object via the secondary display; and displaying a second portion of the virtual object via the primary display, wherein displaying the second portion of the virtual object via the primary display includes: in accordance with a determination that the second portion of the virtual object is within a predefined distance from an edge of the primary display, applying a visual effect to the second portion of the virtual object.

In accordance with some embodiments, a system includes one or more processors. The system also includes means for displaying a first portion of a virtual object via a secondary display; and means for displaying a second portion of the virtual object via a primary display, wherein displaying the second portion of the virtual object via the primary display includes: in accordance with a determination that the second portion of the virtual object is within a predefined distance from an edge of the primary display, applying a visual effect to the second portion of the virtual object.

In accordance with some embodiments, a method is performed at a system having one or more processors, memory, one or more image sensors, and a head-mounted display (HMD) device, the HMD device including a primary display that extends across a field-of-view and has a first resolution, a secondary display that is physically and electronically coupled to the primary display and has a second resolution that is lower than the first resolution, and a tertiary display. The method includes receiving directional information corresponding to a location of an object that is outside a field-of-view of the primary display of the HMD device and the secondary display of the HMD device. The method also includes, in response to receiving the directional information corresponding to the location of the object that is outside the field-of-view of the primary display and the secondary display, in accordance with a determination that first criteria are satisfied, wherein the first criteria includes a criterion that is met when directional information for the object is permitted to be displayed via the secondary display, displaying, via the secondary display, a first representation of directional information; and in accordance with a determination that second criteria are satisfied, wherein the second criteria includes a criterion that is met when directional information for the object is permitted to be displayed via the tertiary display, displaying, via the tertiary display, a second representation of directional information, wherein the first representation is a virtual object within a CGR environment, and wherein the second representation is not a virtual object within the CGR environment.

In accordance with some embodiments, a head-mounted display (HMD) device includes one or more image sensors, a primary display that extends across a field-of-view and has a first resolution, a secondary display that is physically and electronically coupled to the primary display and has a second resolution that is lower than the first resolution, and a tertiary display. The HMD device also includes one or more processors; and memory storing one or more programs configured to be executed by the one or more processors. The one or more programs include instructions for receiving directional information corresponding to a location of an object that is outside a field-of-view of the primary display of the HMD device and the secondary display of the HMD device. The one or more programs also include instructions for, in response to receiving the directional information corresponding to the location of the object that is outside the field-of-view of the primary display and the secondary display, in accordance with a determination that first criteria are satisfied, wherein the first criteria includes a criterion that is met when directional information for the object is permitted to be displayed via the secondary display, displaying, via the secondary display, a first representation of directional information; and in accordance with a determination that second criteria are satisfied, wherein the second criteria includes a criterion that is met when directional information for the object is permitted to be displayed via the tertiary display, displaying, via the tertiary display, a second representation of directional information, wherein the first representation is a virtual object within a CGR environment, and wherein the second representation is not a virtual object within the CGR environment.

In accordance with some embodiments, a non-transitory computer-readable storage medium stores one or more programs configured to be executed by one or more processors of an electronic device having one or more sensors, a primary display that extends across a field-of-view and has a first resolution, a secondary display that is physically and electronically coupled to the primary display and has a second resolution that is lower than the first resolution, and a tertiary display. The one or more programs include instructions for receiving directional information corresponding to a location of an object that is outside a field-of-view of the primary display of the HMD device and the secondary display of the HMD device. The one or more programs also include instructions for, in response to receiving the directional information corresponding to the location of the object that is outside the field-of-view of the primary display and the secondary display, in accordance with a determination that first criteria are satisfied, wherein the first criteria includes a criterion that is met when directional information for the object is permitted to be displayed via the secondary display, displaying, via the secondary display, a first representation of directional information; and in accordance with a determination that second criteria are satisfied, wherein the second criteria includes a criterion that is met when directional information for the object is permitted to be displayed via the tertiary display, displaying, via the tertiary display, a second representation of directional information, wherein the first representation is a virtual object within a CGR environment, and wherein the second representation is not a virtual object within the CGR environment.

In accordance with some embodiments, a transitory computer-readable storage medium stores one or more programs configured to be executed by one or more processors of an electronic device having one or more sensors, a primary display that extends across a field-of-view and has a first resolution, a secondary display that is physically and electronically coupled to the primary display and has a second resolution that is lower than the first resolution, and a tertiary display. The one or more programs include instructions for receiving directional information corresponding to a location of an object that is outside a field-of-view of the primary display of the HMD device and the secondary display of the HMD device. The one or more programs also include instructions for, in response to receiving the directional information corresponding to the location of the object that is outside the field-of-view of the primary display and the secondary display, in accordance with a determination that first criteria are satisfied, wherein the first criteria includes a criterion that is met when directional information for the object is permitted to be displayed via the secondary display, displaying, via the secondary display, a first representation of directional information; and in accordance with a determination that second criteria are satisfied, wherein the second criteria includes a criterion that is met when directional information for the object is permitted to be displayed via the tertiary display, displaying, via the tertiary display, a second representation of directional information, wherein the first representation is a virtual object within a CGR environment, and wherein the second representation is not a virtual object within the CGR environment.

In accordance with some embodiments, a system includes one or more processors. The system also includes means for receiving directional information corresponding to a location of an object that is outside a field-of-view of a primary display of a head-mounted display (HMD) device and a secondary display of the HMD device. The system further includes means, responsive to receiving the directional information corresponding to the location of the object that is outside the field-of-view of the primary display and the secondary display, for: in accordance with a determination that first criteria are satisfied, wherein the first criteria includes a criterion that is met when directional information for the object is permitted to be displayed via the secondary display, displaying, via a secondary display, a first representation of directional information; and in accordance with a determination that second criteria are satisfied, wherein the second criteria includes a criterion that is met when directional information for the object is permitted to be displayed via the tertiary display, displaying, via a tertiary display, a second representation of directional information, wherein the first representation is a virtual object within a CGR environment, and wherein the second representation is not a virtual object within the CGR environment.

In accordance with some embodiments, a method is performed at a system having one or more processors, memory, one or more image sensors, and a head-mounted display (HMD) device, the HMD device including a primary display that extends across a field-of-view and has a first resolution, and a secondary display that is physically and electronically coupled to the primary display and has a second resolution that is lower than the first resolution. The method includes: detecting an object in a computer-generated reality (CGR) environment at a first location; and in response to detecting the object in the CGR environment at the first location, in accordance with a determination that the first location is within a first predetermined distance outside of the field-of-view of the primary display of the HMD device, displaying, via the secondary display of the HMD device, a first modified representation of the object that is visually distinguished from a first actual representation of the object.

In accordance with some embodiments, a head-mounted display (HMD) device includes one or more image sensors, a primary display that extends across a field-of-view and has a first resolution, and a secondary display that is physically and electronically coupled to the primary display and has a second resolution that is lower than the first resolution. The HMD device also includes one or more processors; and memory storing one or more programs configured to be executed by the one or more processors. The one or more programs include instructions for: detecting an object in a computer-generated reality (CGR) environment at a first location; and in response to detecting the object in the CGR environment at the first location, in accordance with a determination that the first location is within a first predetermined distance outside of the field-of-view of the primary display of the HMD device, displaying, via the secondary display of the HMD device, a first modified representation of the object that is visually distinguished from a first actual representation of the object.

In accordance with some embodiments, a non-transitory computer-readable storage medium stores one or more programs configured to be executed by one or more processors of an electronic device having one or more sensors, a primary display that extends across a field-of-view and has a first resolution, and a secondary display that is physically and electronically coupled to the primary display and has a second resolution that is lower than the first resolution. The one or more programs include instructions for: detecting an object in a computer-generated reality (CGR) environment at a first location; and in response to detecting the object in the CGR environment at the first location, in accordance with a determination that the first location is within a first predetermined distance outside of the field-of-view of the primary display of the HMD device, displaying, via the secondary display of the HMD device, a first modified representation of the object that is visually distinguished from a first actual representation of the object.

In accordance with some embodiments, a transitory computer-readable storage medium stores one or more programs configured to be executed by one or more processors of an electronic device having one or more sensors, a primary display that extends across a field-of-view and has a first resolution, and a secondary display that is physically and electronically coupled to the primary display and has a second resolution that is lower than the first resolution. The one or more programs include instructions for: detecting an object in a computer-generated reality (CGR) environment at a first location; and in response to detecting the object in the CGR environment at the first location, in accordance with a determination that the first location is within a first predetermined distance outside of the field-of-view of the primary display of the HMD device, displaying, via the secondary display of the HMD device, a first modified representation of the object that is visually distinguished from a first actual representation of the object.

In accordance with some embodiments, a system includes one or more processors. The system also includes means for detecting an object in a computer-generated reality (CGR) environment at a first location. The system further includes means responsive to, detecting the object in the CGR environment at the first location, for, in accordance with a determination that the first location is within a first predetermined distance outside of the field-of-view of a primary display of the HMD device, displaying, via a secondary display of the HMD device, a first modified representation of the object that is visually distinguished from a first actual representation of the object.

In accordance with some embodiments, a method is performed at a system having one or more processors, memory, one or more image sensors, and a head-mounted display (HMD) device, the HMD device including a primary display that extends across a field-of-view and has a first resolution, a secondary display that is physically and electronically coupled to the primary display and has a second resolution that is lower than the first resolution, and a tertiary display. The method includes receiving directional information corresponding to a location of an object that is outside a field-of-view of the primary display of the HMD device and the secondary display of the HMD device. In response to receiving information corresponding to the change status of the process, the method also includes: in accordance with a determination that a first criterion is satisfied, displaying, via the secondary display of the HMD device, a first representation corresponding to the status of the process; and in accordance with a determination that a second criterion is satisfied, displaying, via the tertiary display of the HMD device, a second representation corresponding to the status of the process, wherein the second representation is different from the first representation.

In accordance with some embodiments, a head-mounted display (HMD) device includes one or more image sensors, a primary display that extends across a field-of-view and has a first resolution, a secondary display that is physically and electronically coupled to the primary display and has a second resolution that is lower than the first resolution, and a tertiary display. The HMD device also includes one or more processors; and memory storing one or more programs configured to be executed by the one or more processors. The one or more programs include instructions for receiving information corresponding to a change in a status of a process. In response to receiving information corresponding to the change status of the process, the one or more programs also include: in accordance with a determination that a first criterion is satisfied, displaying, via the secondary display of the HMD device, a first representation corresponding to the status of the process; and in accordance with a determination that a second criterion is satisfied, displaying, via the tertiary display of the HMD device, a second representation corresponding to the status of the process, wherein the second representation is different from the first representation.

In accordance with some embodiments, a non-transitory computer-readable storage medium stores one or more programs configured to be executed by one or more processors of an electronic device having one or more sensors, a primary display that extends across a field-of-view and has a first resolution, a secondary display that is physically and electronically coupled to the primary display and has a second resolution that is lower than the first resolution, and a tertiary display. The one or more programs include instructions for receiving information corresponding to a change in a status of a process. In response to receiving information corresponding to the change status of the process, the one or more programs also include: in accordance with a determination that a first criterion is satisfied, displaying, via the secondary display of the HMD device, a first representation corresponding to the status of the process; and in accordance with a determination that a second criterion is satisfied, displaying, via the tertiary display of the HMD device, a second representation corresponding to the status of the process, wherein the second representation is different from the first representation.

In accordance with some embodiments, a transitory computer-readable storage medium stores one or more programs configured to be executed by one or more processors of an electronic device having one or more sensors, a primary display that extends across a field-of-view and has a first resolution, a secondary display that is physically and electronically coupled to the primary display and has a second resolution that is lower than the first resolution, and a tertiary display. The one or more programs include instructions for receiving information corresponding to a change in a status of a process. In response to receiving information corresponding to the change status of the process, the one or more programs also include: in accordance with a determination that a first criterion is satisfied, displaying, via the secondary display of the HMD device, a first representation corresponding to the status of the process; and in accordance with a determination that a second criterion is satisfied, displaying, via the tertiary display of the HMD device, a second representation corresponding to the status of the process, wherein the second representation is different from the first representation.

In accordance with some embodiments, a system includes one or more processors. The system also includes means for receiving directional information corresponding to a location of an object that is outside a field-of-view of a primary display of a head-mounted display (HMD) device and a secondary display of the HMD device. The system further includes means, responsive to receiving information corresponding to the change status of the process, for: in accordance with a determination that a first criterion is satisfied, displaying, via the secondary display of the HMD device, a first representation corresponding to the status of the process; and in accordance with a determination that a second criterion is satisfied, displaying, via the tertiary display of the HMD device, a second representation corresponding to the status of the process, wherein the second representation is different from the first representation.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

DESCRIPTION OF THE FIGURES

In the following description, reference is made to the accompanying figures which form a part thereof, and which illustrate several examples of the present disclosure. It is understood that other examples may be utilized and structural and operational changes may be made without departing from the scope of the present disclosure. The use of the same reference symbols in different figures indicates similar or identical items.

DESCRIPTION

Figure 1A:
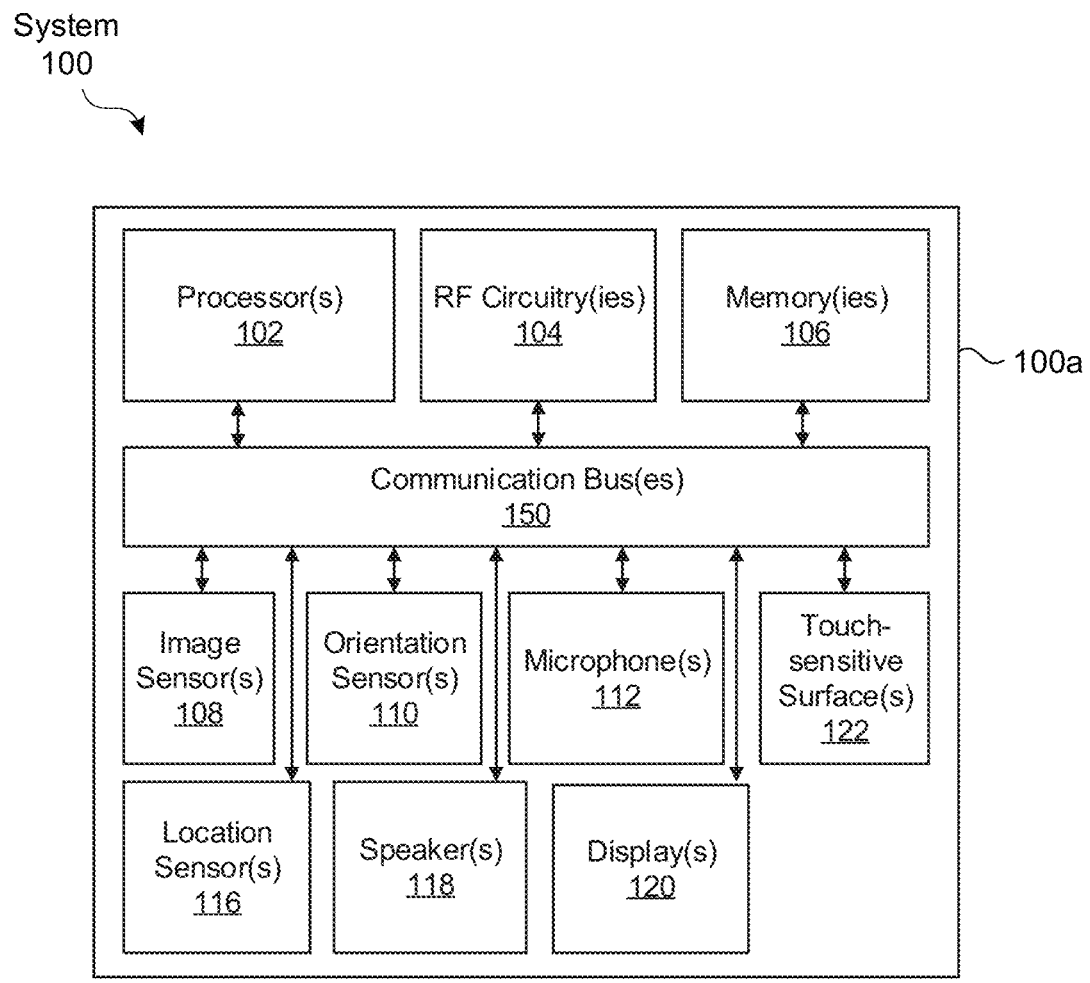
FIGS. 1A-1B depict exemplary systems for use in various computer-generated reality technologies.

Various examples of electronic systems and techniques for using such systems in relation to various computer-generated reality technologies are described.

A physical environment (or real environment) refers to a physical world that people can sense and/or interact with without aid of electronic systems. Physical environments, such as a physical park, include physical articles (or physical objects or real objects), such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment (or virtual environment) refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, an MR environment is anywhere between, but not including, a wholly physical environment at one end and a VR environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of MR include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An AR environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one example, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
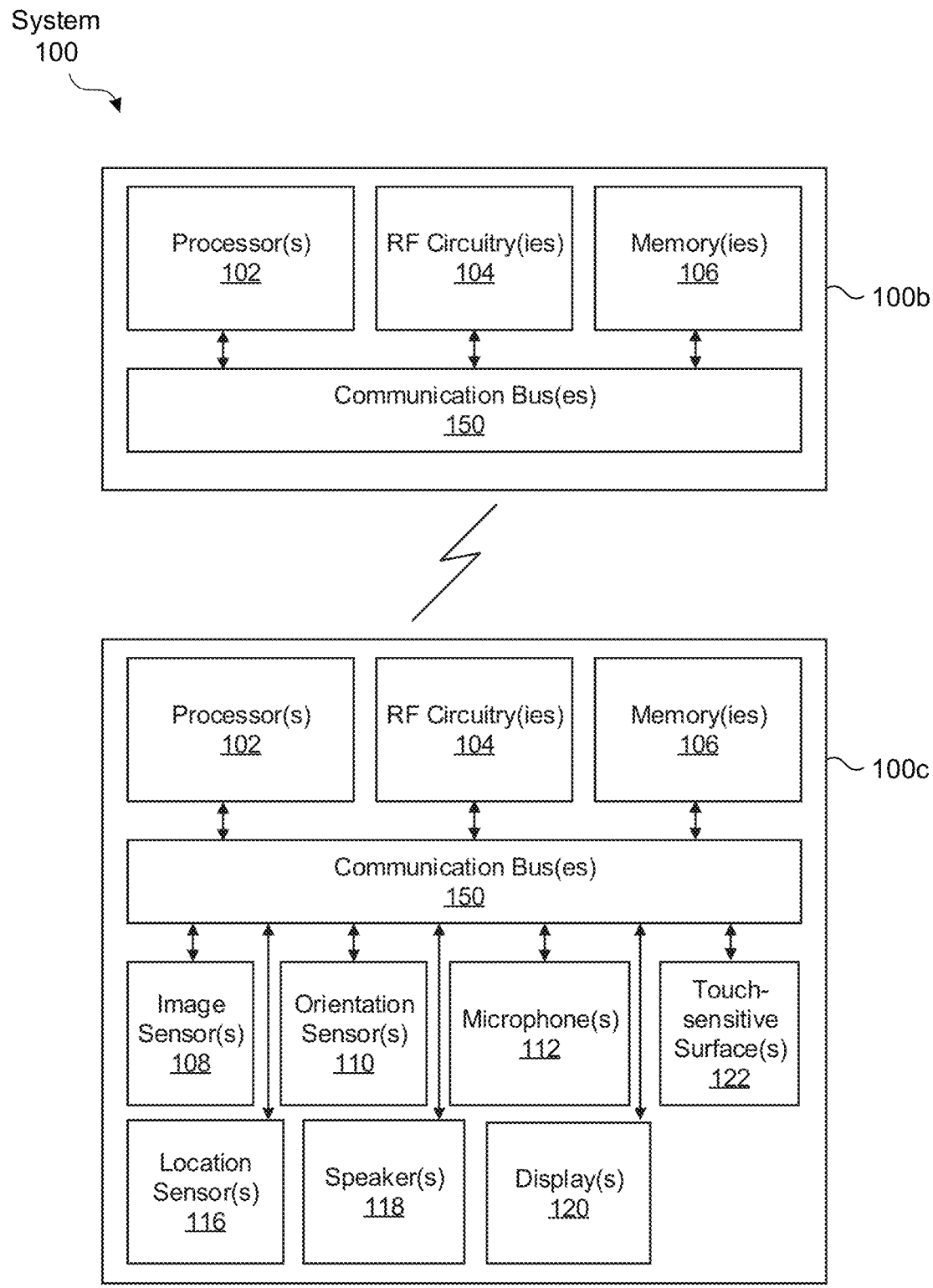

FIG. 1A and FIG. 1B depict exemplary system 100 for use in various computer-generated reality technologies.

In some examples, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some examples, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some examples, device 100a is implemented in a base station device or an HMD device.

As illustrated in FIG. 1B, in some examples, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

In some examples, system 100 is a mobile device. In some examples, system 100 is an HMD device. In some examples, system 100 is a wearable HUD device.

System 100 includes processor(s) 102 and memory(ies) 106. Processor(s) 102 include one or more general processors, one or more graphics processors, and/or one or more digital signal processors. In some examples, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some examples, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some examples, the first display can include a plurality of other displays (e.g., sub-displays), such as a primary display and a secondary display. In some embodiments, the primary display has a different resolution than the secondary display when system 100 is operating. In some examples, display(s) 120 include a single display (e.g., first display or second display). In some examples, the single display includes a plurality of other displays (e.g., sub-displays), such as primary display and secondary display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some examples, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensor(s) 108 optionally include one or more visible light image sensor(s), such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some examples, system 100 uses CCD sensors, event cameras, and depth sensors in combination to detect the physical environment around system 100. In some examples, image sensor(s) 108 include a first image sensor and a second image sensor. The first image sensor and the second image sensor are optionally configured to capture images of physical objects in the real environment from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some examples, system 100 includes microphone(s) 112. System 100 uses microphone(s) 112 to detect sound from the user and/or the real environment of the user. In some examples, microphone(s) 112 includes an array of microphones (including a plurality of microphones) that optionally operate in tandem, such as to identify ambient noise or to locate the source of sound in the space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

Figure 2A:
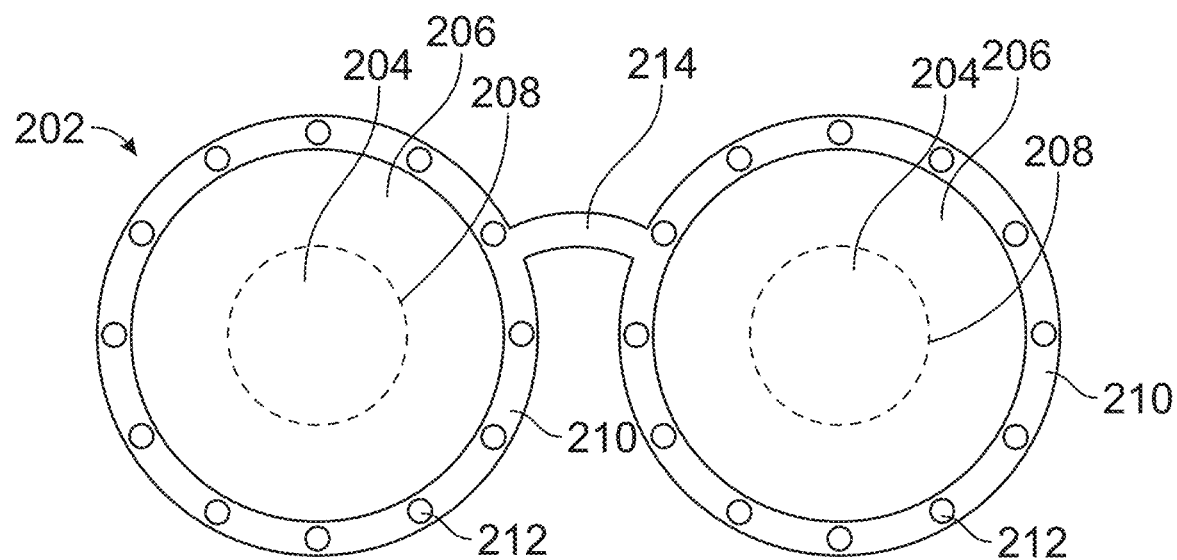
FIGS. 2A-2B depict an exemplary system that includes a device that has additive displays for use in various computer-generated reality environments.

FIG. 2A illustrates device 202. In some embodiments, device 202 can include one or more components of system 100, such as one or more processors (e.g., processor(s) 102), memories (e.g., memory(ies) 106), camera sensor(s) (e.g., image sensor(s) 108) or motion sensor(s) (e.g., orientation sensor(s) 110). For example, device 202 can be an embodiment of device 100a of system 100 depicted in FIG. 1A. Alternatively, in some embodiments, device 202 can be an embodiment of second device 100c depicted in FIG. 1B.

As illustrated in FIG. 2A, device 202 is a wearable device that includes a first display (e.g., left eye display panel of device 202) and a second display (e.g., right eye display panel of device 202). The first display and second display each include a primary display 204 that is surrounded by a secondary display 206. As illustrated in FIG. 2A, secondary display 206 circumscribes at least a portion of primary display 204. In some embodiments, secondary display 206 extends across the entirety of the first or second display. In some embodiments, primary display 204 overlaps only a portion (e.g., center) of secondary display 206.

In some embodiments, primary display 204 and secondary display 206 are two different types of displays. In some embodiments, primary display 204 is a wave guide display. In some embodiments, secondary display 206 is an organic light-emitting diode display.

In FIG. 2A, primary display 204 is physically coupled (e.g., connected, attached) to secondary display 206 as well as electronically coupled (e.g., connected, attached) to secondary display 206. In some embodiments, one or more regions or additional displays may be disposed between primary display 204 and secondary display 206.

In FIG. 2A, primary display 204 and secondary display 206 are depicted as oval-shaped displays. It should be recognized, however, that primary display 204 and secondary display 206 can have various shapes, such as rectangular shapes (e.g., rectangular prisms). Also, in some embodiments, the shape of primary display 204 can be different from the shape of secondary display 206. In some embodiments, when primary display 204 and/or secondary display 206 are in the shape of a rectangle, device 202 can apply a visual effect (e.g., blurring, fading the corners of the primary display and/or secondary display) to primary display 204 and/or secondary display 206, such that primary display 204 and/or secondary display 206 appear to be round.

As illustrated in FIG. 2A, edge 208 is defined between primary display 204 and secondary display 206. In some embodiments, edge 208 is transparent and/or translucent. In some embodiments, edge 208 is an edge of primary display 204 or an edge of secondary display 206. In some embodiments, edge 208 is a physical boundary between primary display 204 and secondary display 206.

In some embodiments, primary display 204 can be operated at a maximum resolution that is higher than the maximum potential resolution of secondary display 206. Because displays that can operate at higher resolution typically require more energy, device 202 can use more energy when displaying a virtual object (or CGR object) via primary display 204 than when displaying the same object via secondary display 206. Thus, device 202 can reserve battery life based on a determination to display one or more virtual objects in secondary display 206 in lieu of displaying the one or more virtual objects in primary display 204.

As illustrated in FIG. 2A, device 202 includes frame 210 that is positioned around secondary display 206. Frame 210 includes a tertiary display, such as light-emitting diodes (LEDs). Alternatively, in some embodiments, frame 210 does not include a tertiary display.

Figure 2B:
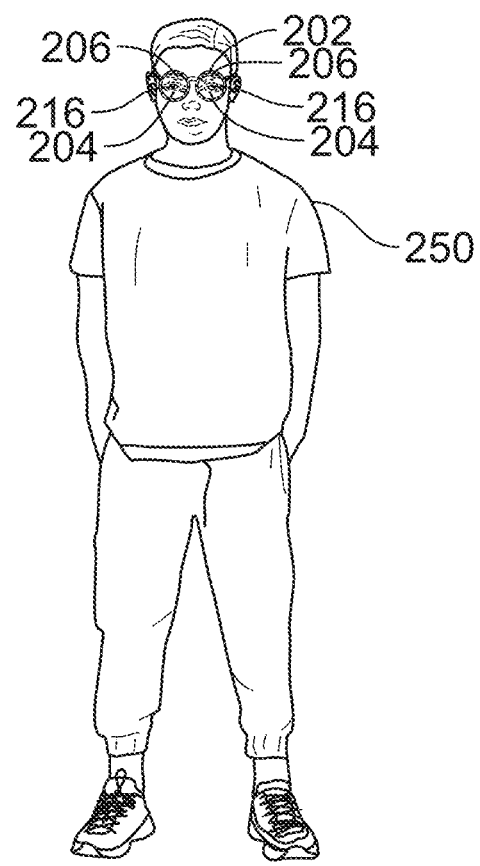

As will be described below, in some embodiments, device 202 causes one or more of the LEDs to emit light. In some embodiments, the LEDs do not surround the inner portion of secondary 206 located near the nose of a user. In FIG. 2B, device 202 is depicted being worn by user 250, such that the nose of user 250 is positioned under bridge 214 of device 202. As will be described below, device 202 enables user 250 to view a CGR environment.

FIG. 2B depicts user 250 standing in a physical environment with the eyes of user 250 at a location such that pupil 216 of user 250 is aligned with a portion of primary display 204. Thereby, at FIG. 2B, the central vision or line of sight of user 250 is aligned with a portion of the field-of-view of primary display 204, which indicates that objects displayed in primary display 204 are displayed in the user's central vision.

Moreover, FIG. 2B depicts the peripheral vision of user 250 aligned with a portion of the field-of-view of secondary display 206, which indicates that objects displayed in secondary display 206 are displayed in the user's peripheral vision. As will be described below, in some embodiments, when one or more LEDs are emitting light, the light is displayed in an exterior portion or edge of the peripheral vision of user 250. In some embodiments, one or more sensors of device 202 can track the movement of the user's eyes, including pupils 216. In some embodiments, device 202 uses the tracking of movement to adjust or modify one or more of the techniques discussed below.

Figure 3:
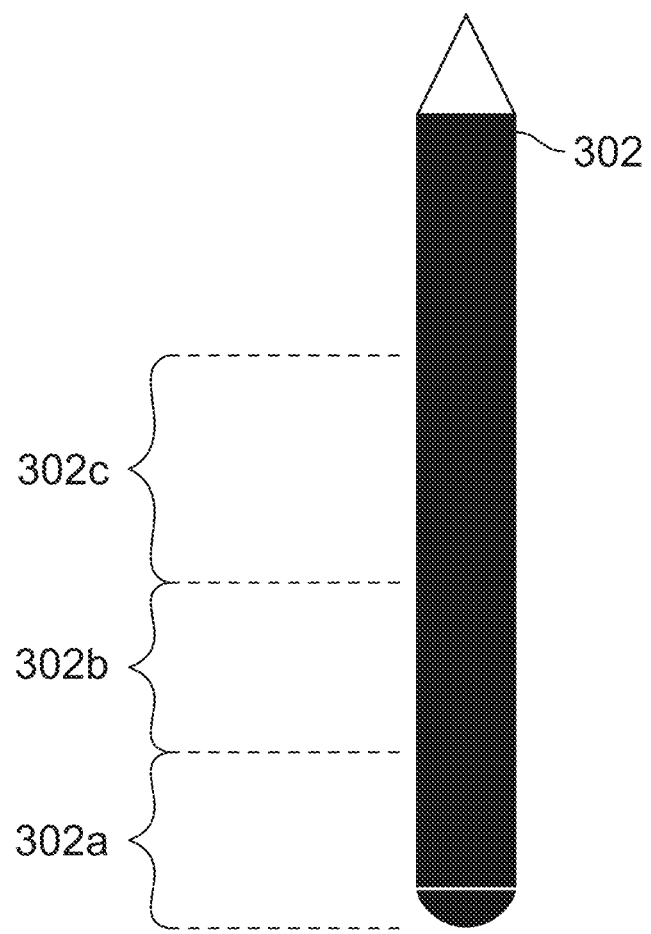
FIG. 3 depicts an exemplary virtual object in accordance with some embodiments.

FIG. 3 depicts an exemplary virtual object in accordance with some embodiments. In particular, FIG. 3 depicts the virtual object as pencil 302 shaded a solid color (e.g., black, blue). Pencil 302 has different portions 302*a*-302*c*.

Figure 4:
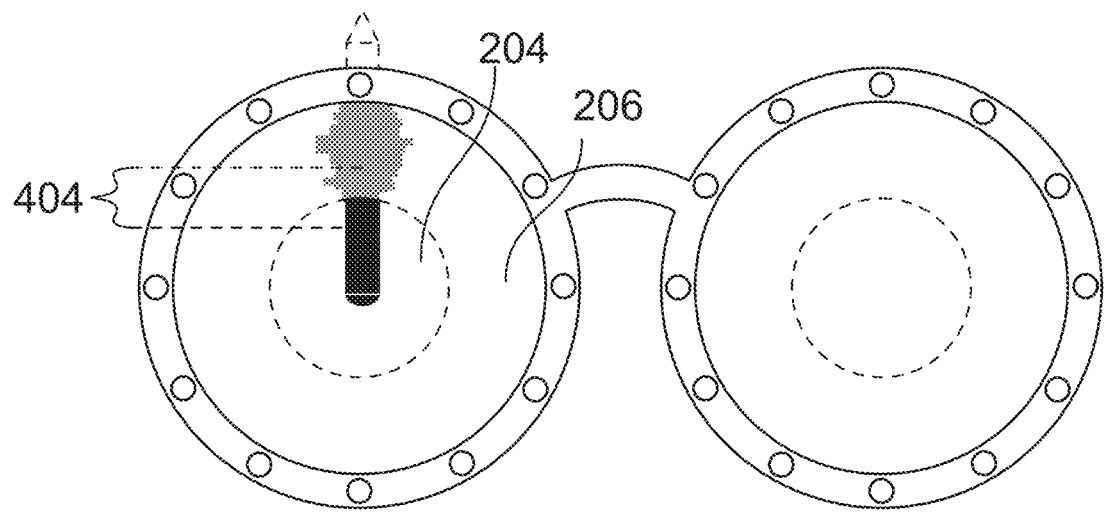
FIG. 4 depicts an exemplary technique for displaying a virtual object in accordance with some embodiments.

FIG. 4 depicts device 202 displaying a portion of pencil 302. In particular, in FIG. 4, pencil 302 is depicted falling from a position that is outside of the field-of-views of primary display 204 and secondary display 206. Specifically, in FIG. 4, pencil 302 is depicted at a position where portions 302*a* and 302*b* of pencil 302 are in the field-of-view of primary display 204 and portion 302*c* of pencil 302 is in the field-of-view of secondary display 206, but the portion of pencil 302 depicted in dashed lines in FIG. 4 is outside of the field-of-views of primary display 204 and secondary display 206.

As illustrated in FIG. 4, portion 302*c* is blurred when compared to portions 302*a* and 302*b*. Here, the blurring of portion 302*c* is illustrated by portion 302*c* being shaded a lighter shade than it was depicted in FIG. 3. In contrast, portions 302*a* and 302*b* contain little to no blur, which is illustrated by portions 302*a*-302*b* being shaded the same color as they were illustrated in FIG. 3. Portion 302*c* has more blur than portions 302*a* and 302*b* because portion 302*c* is being displayed via secondary display 206, which can have a lower maximum resolution than the maximum resolution of primary display 204 that is displaying portions 302*a*-302*b*.

When device 202 is worn by a user, the edge between the user's central vision and peripheral vision typically lies close to area 404. As depicted in FIG. 4, area 404 corresponds to the areas of primary display 204 and secondary display 206 that displays sections of portions 302*b* and 302*c*.

Because the portion of 302*c* is blurred in comparison to portion 302*b*, hard clipping can occur in area 404 and/or the edge between the user's central and peripheral visions. In some embodiments, hard clipping occurs when there is visual distortion between a portion of an object displayed on one display and a portion of an object displayed on another display. As further described below, hard clipping can occur when an object transitions from one display to another display.

In some embodiments, the hard clipping in area 404 is an unintended visual effect. In particular, hard clipping can cause the user interface displayed by device 202 to be distracting to a user wearing device 202. For example, the user interface can be distracting to a user wearing device 202 when objects are entering or leaving the user's central vision.

Figure 5:
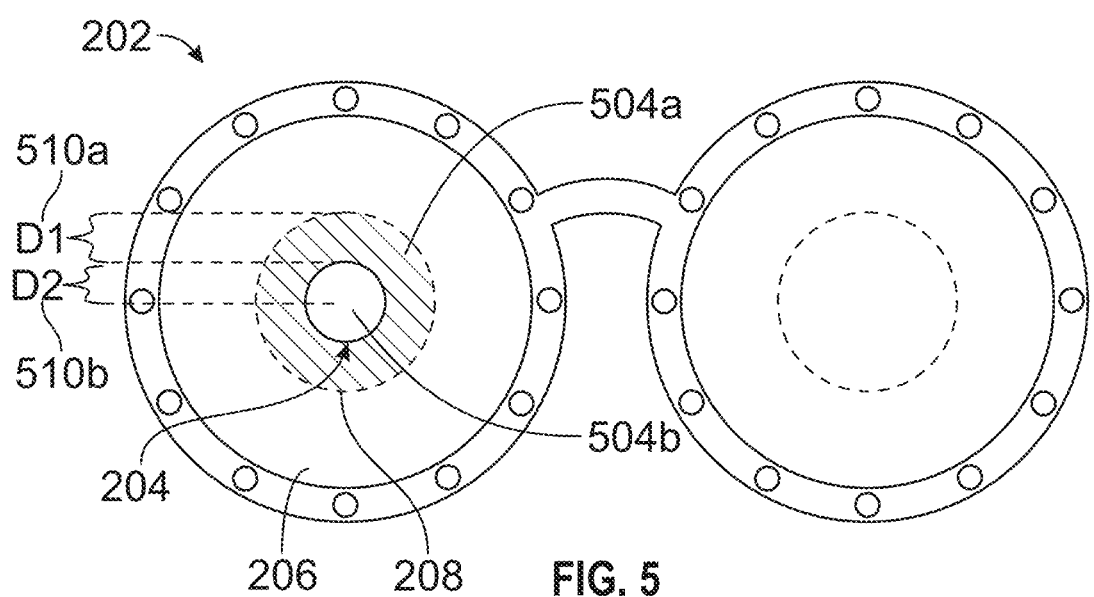
FIG. 5 depicts exemplary regions on a device that has additive displays for displaying a virtual object in accordance with some embodiments.

FIG. 5 depicts exemplary regions on a device that has additive displays in accordance with some embodiments. As further explained below, hard clipping may occur between one or more exemplary regions on the device. Because the field-of-view of primary display 204 is typically in a user's central vision and the field-of-view of secondary display 206 is in the user's peripheral vision, reducing hard clipping of objects transitioning between primary display 204 and secondary display 206 reduces high-frequency noise (e.g., vision snow, random and/or abrupt fluctuations of objects, irregular movement or spatial relationships between objects) in the user's central and/or peripheral vision. Reducing high-frequency noise in the user's central and/or peripheral vision is advantageous because the high-frequency noise can cause a user to look unnecessarily at objects in the user's peripheral vision. Therefore, high-frequency noise can impact a user's ability to focus on objects within the user's central vision, which can impact the ability of device 202 to track and/or make accurate determinations based on the eye movement of the user.

FIG. 5 illustrates device 202 having exemplary first region 504*a* and exemplary second region 504*b* of primary display 204. First region 504*a* extends across an area of primary display 204 from edge 208 of primary display 204 to distance 510*a* from edge 208 of primary display 204. In some embodiments, at least a portion of area 404 depicted in FIG. 4 overlaps a portion of first region 504*a* depicted in FIG. 5. In some embodiments, at least a portion of the edge of a user's central and peripheral visions lies in a portion of first region 504*a* when the user is wearing device 202.

Second region 504*b* extends across the area of primary display 204 from the center of primary display 204 to distance 510*b* towards the edge 208 of primary display 204. In some embodiments, no portion of area 404 depicted in FIG. 4 overlaps a portion of first region 504*b* depicted in FIG. 5. In some embodiments, no portion of the edge of a user's central and peripheral visions lies in a portion of first region 504*a* when the user is wearing device 202.

In some embodiments, first region 504*a* and/or the second region 504*b* extend across other areas of primary display 204 that are not illustrated by FIG. 5 or do not extend across areas illustrated by FIG. 5. In some embodiments, first region 504*a* and/or second region 504*b* extends across the entirety of primary display 204.

FIGS. 6A-6C and FIG. 7 depict an exemplary technique for displaying a virtual object in accordance with some embodiments. Notably, in FIGS. 6A-6C and FIG. 7, the exemplary technique and processes described below can reduce hard clipping (e.g., an abrupt change when an object transitions from one display to another display) of an object when the object is transitioned between displays with different resolutions (e.g., between primary display 204 and secondary display 206) as shown, for example, in FIG. 4 above. As mentioned above, reducing hard clipping of objects transitioning between primary display 204 and secondary display 206 reduces high-frequency noise in the user's central and/or peripheral visions. Reducing high-frequency noise in the user's central and/or peripheral vision is advantageous because high-frequency noise can impact the ability of device 202 to track and/or make accurate determinations based on the eye movement of the user.

Figure 6A:
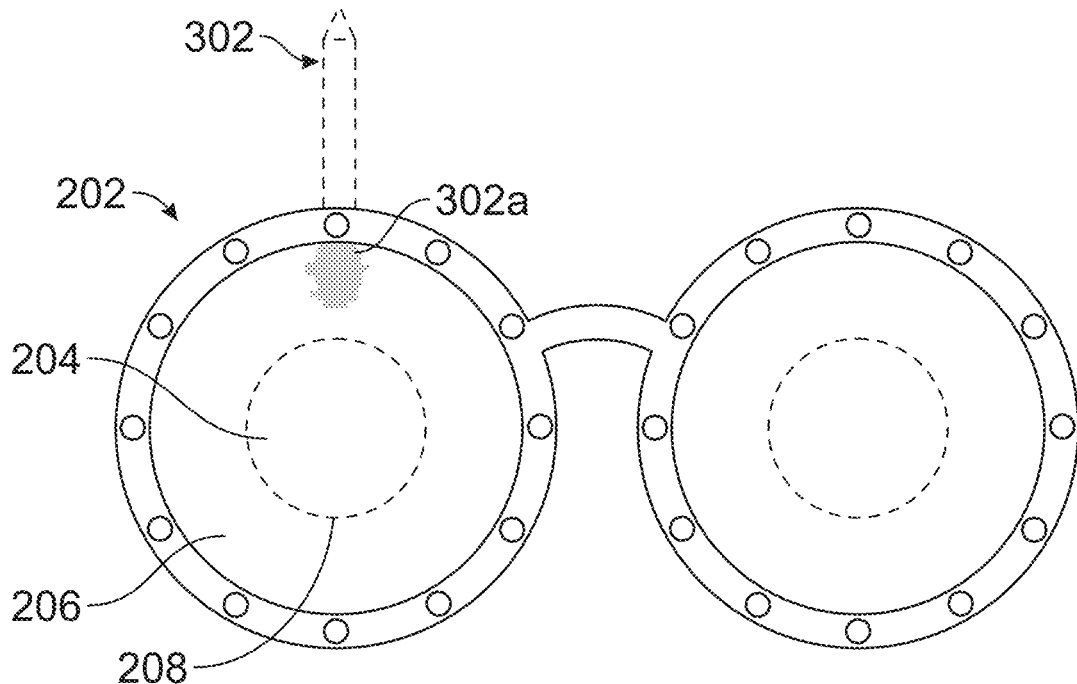
FIGS. 6A-6C depict an exemplary technique for displaying a virtual object in accordance with some embodiments.

FIG. 6A illustrates an environment that includes device 202 and pencil 302. At FIG. 6A, user 250 is wearing device 202 as described above in relation to FIG. 2B. However, for ease of discussion, user 250 is not depicted in FIG. 6A.

Figure 6B:
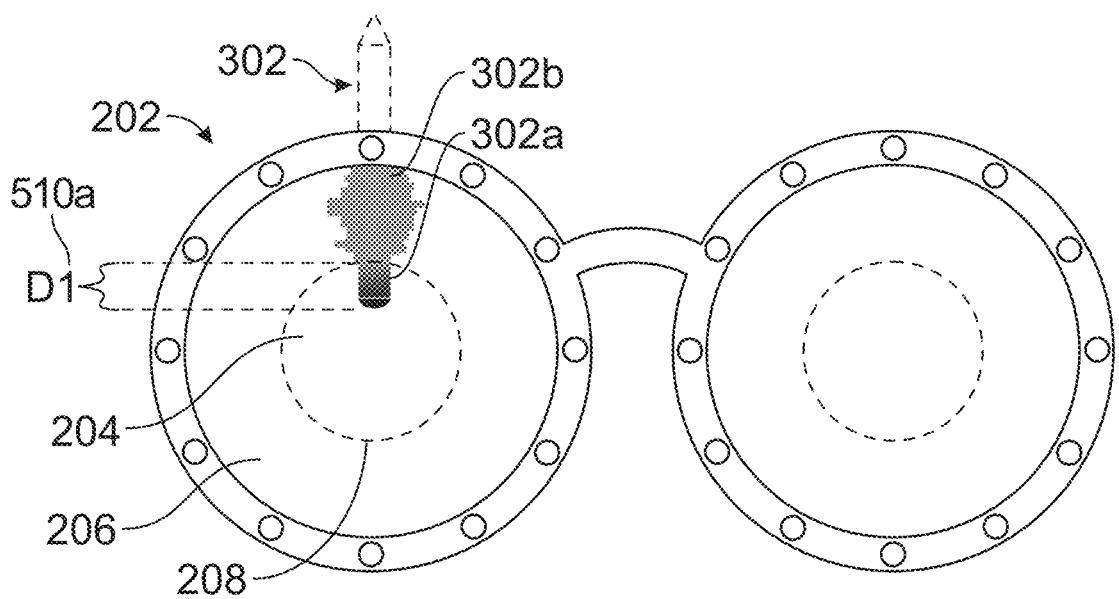
Figure 6C:
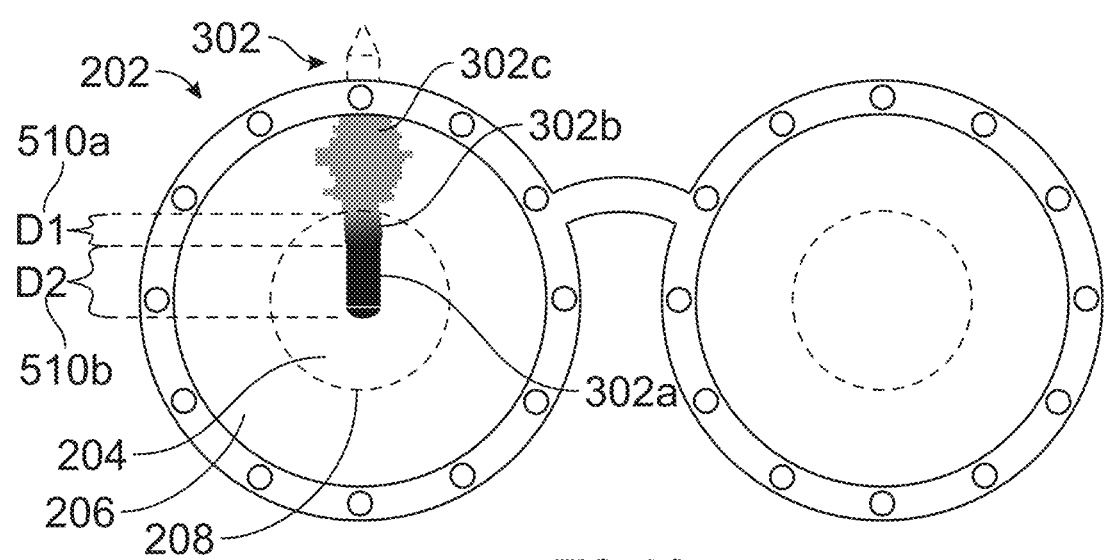

FIG. 6A depicts device 202 displaying pencil 302 falling from a position that is outside of the field of view of primary display 204 and secondary display 206. In FIGS. 6A-6C, the portions of pencil 302 that are represented by dashed lines correspond to the portions of pencil 302 that cannot be seen by a user looking through primary display 204 and/or secondary display 206 while wearing device 202.

As illustrated in FIG. 6A, pencil 302 has fallen from the position that is outside of the field-of-views of primary display 204 and secondary display 206 to a position that is inside the field-of-view of secondary display 206 and outside of the field-of-view of primary display 204. In FIG. 6A, portion 302*a* is presented via secondary display 206. In some embodiments, device 202 generates a virtual representation of portion 302a and displays, via secondary display 206, the virtual representation.

In FIG. 6A, device 202 displays the virtual representation of portion 302a that is presented at a resolution that corresponds to the maximum resolution of secondary display 206. As illustrated in FIG. 6A, portion 302a is blurred (e.g., illustrated by its lighter shade) when compared to portion 302a in FIG. 3. In some embodiments, the virtual representation of portion 302a displayed in FIG. 6A has no visual effect applied to create change in blur.

Some period of time following what is depicted in FIG. 6A, as pencil 302 continues to fall, FIG. 6B depicts portion 302a having fallen within a particular region of primary display 204 (e.g., region 504a as described below in FIG. 5). While displaying pencil 302 via secondary display 206 (e.g., inside the field-of-view of secondary display 206), pencil 302 is determined to have fallen to a location that is within distance 510a from edge 208 of primary display 204 (e.g., moving into primary display 204), as illustrated in FIG. 6B. Based on this determination, device 202 generates a virtual representation by applying a visual effect to portion 302a of pencil 302 and displays the virtual representation in primary display 204, as illustrated in FIG. 6B.

Here, the virtual representation that corresponds to portion 302a is blurred by applying the visual effect to portion 302a. As illustrated in FIG. 6B, applying the visual effect causes portion 302a to be displayed as a gradient (e.g., from a light color as shown to a dark color) to provide a smoother transition at the edge of the user's central and peripheral visions (and/or area 404 discussed in FIG. 4). In some embodiments, after applying the visual effect to portion 302a, the virtual representation that corresponds to portion 302a is faded. In some embodiments, the virtual representation is faded inversely proportional to a detected amount of blur of secondary display 206 (or blur of at least one region of secondary display 206) after applying the visual effect to portion 302a. In some embodiments, the virtual representation does not include a gradient after applying the visual effect to portion 302a. In other embodiments, applying the visual effect includes applying a blurring function to portion 302a. In some embodiments, the amount of blur applied to portion 302a at edge 208 can be selected to match the blur of secondary display 206. In doing so, the appearance of virtual object 302 on opposite sides of edge 208 may be the same or similar, thereby reducing the hard clipping effect discussed above. The amount of blur applied to portion 302a (or other virtual content) within portion 504a can be reduced based on the distance from edge 208, with no blur being applied at distance D1 from edge 208. The blur can be reduced linearly or non-linearly as a function of the distance from edge 208.

As illustrated in FIG. 6B, portion 302b has also moved into the field-of-view of secondary display 206. Thus, in addition to displaying a virtual representation that corresponds to portion 302a in primary display 204, device 202 also displays a virtual representation that corresponds to portion 302b of pencil 302. In some embodiments, device 202 displays the virtual representation that corresponds to portion 302b using the techniques as described above in relation to displaying the virtual representation that corresponded to the portion 302a in FIG. 6A.

Notably, as illustrated in FIG. 6B, the virtual representations that correspond to portion 302a and 302b are blurred, where the blurring is represented by the difference in shading of respective virtual representations that correspond to the respective portions of pencil 302. In FIG. 6B, the virtual representation that corresponds to portion 302b has more blur than the virtual representation that corresponds to portion 302a.

In FIG. 6B, the virtual representation that corresponds to portion 302b is blurred because it is displayed via secondary display 206, which is a lower-resolution display with more blur than primary display 204. On the other hand, the virtual representation that corresponds to portion 302a is blurred because device 202 applied a visual effect to portion 302a before displaying the virtual representation that corresponds to portion 302a via primary display 204. Thus, the virtual representation that corresponds to portion 302a with the visual effect applied is more similar to (e.g., has a closer blur value to) the virtual representation that corresponds to portion 302b than a virtual representation that corresponds to portion 302a that has no visual effect applied.

In some embodiments, device 202 applies a visual effect to portion 302a such that the virtual representation of portion 302a appears to visually match the virtual representation that corresponds to portion 302b displayed in secondary display 206 (e.g., where no visual effect has been applied to portion 302b). Because secondary display 206 has a lower resolution than primary display 204, device 202 applies the visual effect to portion 302a to make the visual appearance of the virtual representation that corresponds to portion 302a match the visual appearance of the virtual representation that corresponds to portion 302b.

In some embodiments, device 202 applies the visual effect to portion 302 to smooth out the transition of displaying the virtual representation that corresponds to portion 302a in FIG. 6A via a display having a lower resolution (e.g., secondary display) to displaying the virtual representation that corresponds to portion 302a in FIG. 6B via a display having a higher resolution (e.g., primary display 204).

As illustrated in FIG. 6C, pencil 302 has fallen to a new position that is inside the field-of-views of primary display 204 and secondary display 206. As illustrated in FIG. 6C, portion 302a is a distance (e.g., a distance that is the sum of distance 510a and distance 510b) from edge 208 of primary display 204, which is outside of distance 510a. Because portion 302a is outside of distance 510a from edge 208 of primary display 204, portion 302a has entered a second region (e.g., region 504b in FIG. 5) of primary display 204 that is outside of the first region of primary display 204. And, thus, no visual effect is applied to the virtual representation of portion 302a, which lies in second region 504b (shown in FIG. 5). In some embodiments, no visual effect (or a different visual effect than the visual effect applied to the first region) is applied to representations of portions of virtual objects in the second region 504b of primary display 204. In some embodiments, no visual effect is applied because portion 302a is within the user's central vision, and device 202 has determined that the user is likely to be distracted by a virtual object (e.g., or a particular visual object) that does not have a visual effect applied. As illustrated in FIG. 6C, device 202 displays a virtual representation of portion 302c, a new portion of pencil 302 that is in the field-of-view of secondary display 206, using the techniques as described above in relation to display of the virtual representation of portion 302a in FIG. 6A. Further, at FIG. 6C, device 202 displays the virtual representation of portion 302b with the visual effect applied (e.g., using techniques similar to those described above in relation to portion 302a in FIG. 6C) because portion 302b is within distance 510a from edge 208 of primary display 204.

In some embodiments, when the entirety of an object (e.g., pencil 302) is in the field-of-view of the primary display (e.g., no portion of the object is in the field-of-view of the secondary display), no visual effect is applied to any portion of a representation of the virtual object, including a portion of a representation of the virtual object displayed in second region 504b described above with respect to FIG. 5.

In some embodiments, device 202 can determine to display different virtual objects differently. In some embodiments, device 202 can apply a visual effect to one virtual object while not applying a visual effect to another virtual object. In some embodiments, device 202 can apply different visual effects to virtual objects. In some embodiments, device 202 uses different determinations to apply a visual effect to different sets of virtual objects. In some embodiments, device 202 can apply a visual effect to one type of virtual object based on a determination that the virtual object has entered a region of the display but forgo applying the visual effect to another type of virtual object based on a determination that the other type of virtual object has entered the region.

In some embodiments, the operations described in FIGS. 6A-6C can be described in reverse (e.g., FIGS. 6C-6A). For example, a virtual object can transition from being within the field-of-views of the primary display 204 and/or secondary display 206 to being out of the field-of-views of primary display 204 and secondary display 206, using similar techniques to those described above.

Figure 7:
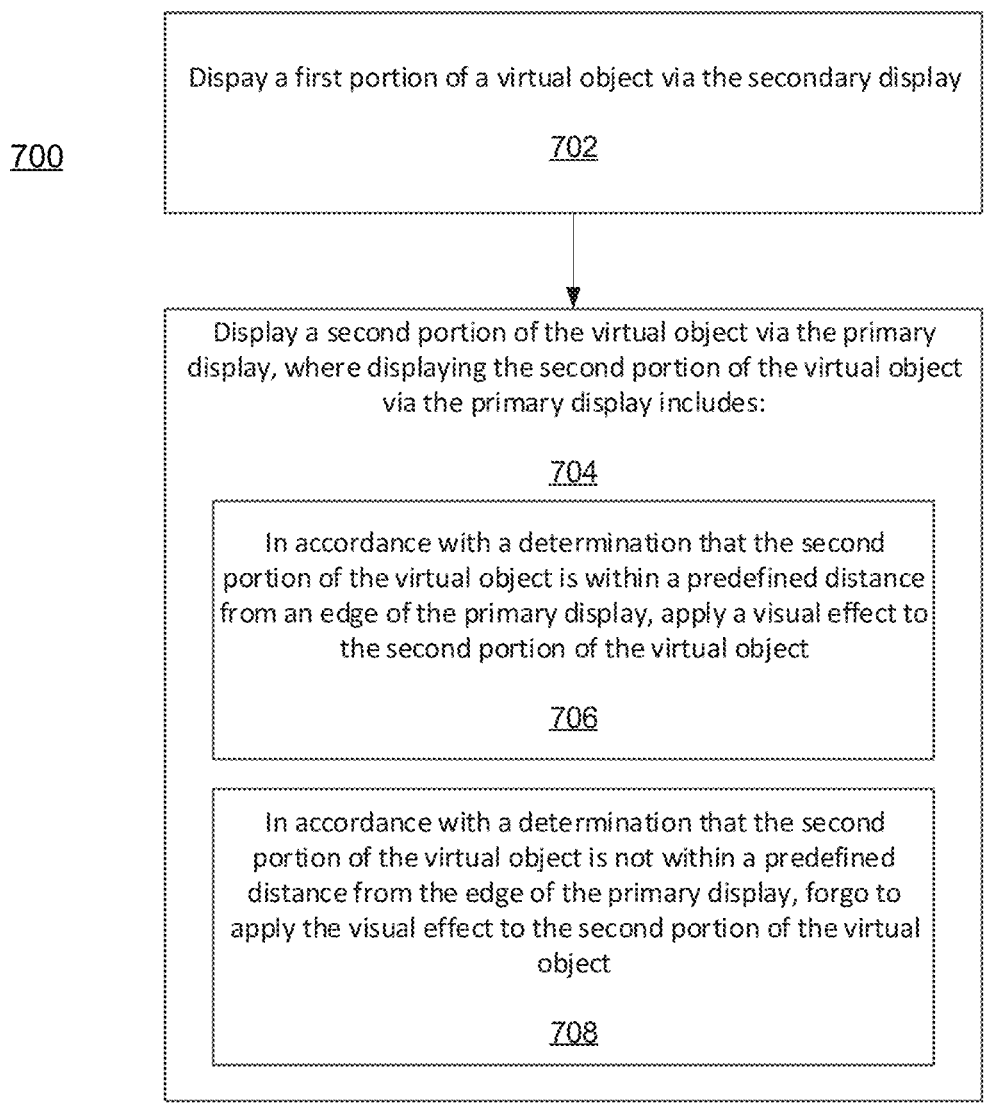
FIG. 7 is a flow diagram illustrating a method for displaying a virtual object in accordance with some embodiments.

FIG. 7 is a flow diagram illustrating method 700 displaying a virtual object in accordance with some embodiments. In some embodiments, the method is performed by system 100 (FIGS. 1A and 1). In some embodiments, the method is performed by device 202 (FIG. 2A). In some embodiments, the method is performed by a third device or system that is different from device 202 or system 100. In some embodiments, the method is performed by a combination of one or more of system 100, device 202, and the third device or system.

At block 702, a first portion of a virtual object is displayed via the secondary display. For example, as described above with reference to FIG. 6C, a first portion 302c of virtual object 302 is displayed via secondary display 206. In some embodiments, at a first instance in time, the virtual object is presented on the secondary display (e.g., secondary display 206) without displaying the virtual object on the primary display (e.g., primary display 204). In some embodiments, when the virtual object is presented on the secondary display and while the virtual object is not presented on the primary display, the virtual object is in a field-of-view of the secondary display while the virtual object is not within the field-of-view of the primary display.

With reference to FIG. 7, at block 704, a second portion of the virtual object is displayed via the primary display. For example, as described above with reference to FIG. 6C, a second portion 302b of virtual object 302 is displayed via primary display 204. In some embodiments, the second portion of the virtual object is displayed via the primary display when the device has moved within a predefined distance from the virtual object. In some embodiments, the second portion of the virtual object is displayed via the primary display when the virtual object moves within a predefined distance from the edge of the primary display or within a predefined distance from the field-of-view (e.g., the edge of the field-of-view) of the primary display.

With reference to FIG. 7, as part of displaying a second portion of the virtual object (block 704), at block 706, in accordance with a determination that the second portion of the virtual object is within a predefined distance from an edge of the primary display, a visual effect is applied to the second portion of the virtual object. For example, as described above with reference to FIG. 6C, as part of displaying second portion 302b of virtual object 302, in accordance with a determination that second portion 302b is within a predefined distance 510a from an edge of primary display 204, a visual effect is applied to second portion 302b of virtual object 302.

In some embodiments, the visual effect is applied to portions of one or more virtual objects while the portions of the one or more virtual objects are in a first region of the primary display. For example, as described above in relation to FIG. 6C, second portion 302b has a visual effect applied while displayed in region 504a that is illustrated in FIG. 5. In some embodiments, region 504a is within a predefined distance from an edge of the primary display that is adjacent to an edge of the secondary display.

In some embodiments, the amount of visual effect applied can be the same for two or more virtual objects in a particular region. Alternatively, in some embodiments, the amount of visual effect applied to a particular virtual object is dynamic. For example, the amount of visual effect applied can be based on one or more detected characteristics associated with the user wearing the device or based on one or more user settings. In some embodiments, user characteristics may include the user's pupil size, pupil direction, pupil location, eye dominance, rate of blinking, etc. at a different point in time.

In some embodiments, the amount of visual effect applied is dependent on one or more characteristics of the virtual object. For example, in some embodiments, the amount of visual effect applied depends on the size, movement (e.g., velocity, acceleration), color, etc. of the virtual object. In some embodiments, the amount of visual effect applied is smaller for a virtual object that is moving at a lower velocity and greater for a virtual object that is moving at a higher velocity.

In some embodiments, the amount of visual effect applied is dependent on one or more characteristics of the device, such as the velocity or acceleration of the device. In some embodiments, the amount of visual effect applied is smaller when the device is moving at a lower velocity and greater for when the device is moving at a greater velocity.

In some embodiments, while the visual effect is applied to a portion of a virtual object when it is displayed in one region of the primary display, the visual effect is not applied to another portion of the virtual object that is displayed in another region of the primary display. For example, as described above in relation to FIG. 6C, portion 302a does not have a visual effect applied while displayed in region 504b that is illustrated in FIG. 5.

In some embodiments, applying the visual effect to the second portion of the virtual object includes blurring the second portion of the virtual object. In some embodiments, before applying the visual effect to the second portion of the virtual object, the second portion of the virtual object already has a visual appearance that includes a first blurred appearance. In some embodiments, after applying the visual effect to the second portion of the virtual object, the second portion of the virtual object has a subsequent visual appearance that includes a second blurred appearance that is different from (e.g., blurrier than) the first blurred appearance.

In some embodiments, the second portion of the virtual object is blurred based on a characteristic of a detected, via the one or more images sensors, pupil aligned with a portion of primary and/or secondary display. In some embodiments, a portion of the virtual object is blurred or faded according to one or more characteristics of the detected pupil while another portion of the virtual object is not. In some embodiments, the blurring or fading of a portion of the virtual object increases when the detected pupil is farther away from the edge of the primary display.

In some embodiments, after the blurring the second portion of the virtual object, the second portion of the virtual object includes an amount of blur that is based on an amount of blur of the first portion of the virtual object. In some embodiments, the amount of blur (e.g., of the portion of the virtual object) matches the blur of the first portion of the virtual object. In some embodiments, as a part of blurring the second portion of the virtual object, an amount of blur of the second portion of the virtual object is changed (e.g., continuously as the distance between the object and device 202 changes) based on a respective distance between the virtual object and the secondary display.

In some embodiments, as a part of applying the visual effect to the second portion of the virtual object, the second portion of the virtual object is faded (e.g., faded in or out). In some embodiments, fading the second portion of the virtual object includes feathering an edge of the primary display and/or the virtual object that is adjacent to the second region.

In some embodiments, before applying the visual effect to the second portion of the virtual object, the second portion of the virtual object already has a visual appearance that includes a first faded appearance. In some embodiments, after applying the visual effect to the second portion of the virtual object, the second portion of the virtual object has a subsequent visual appearance that includes a second faded appearance that is different from (e.g., more faded than) the first faded appearance.

In some embodiments, the second portion of the virtual object is faded proportionally to a blur of the secondary display (e.g., display 206) (e.g., at least one region of the secondary display). In some embodiments, the second portion of the virtual object is faded out to a level that is inversely proportional to the blur of the secondary display.

In some embodiments, the second portion of the virtual object is faded from a first color to a second color. In some embodiments, the second portion of the virtual object is faded, such that a gradient is applied to the second portion of the virtual object. In some embodiments, when the gradient is applied to the second portion of the virtual object, the second portion of the virtual object includes a gradient (e.g., a gradient that transitions from a first color to a second color).

In some embodiments, as a part of applying the visual effect to the second portion of the virtual object, a corner of the second portion of the virtual object is rounded. In some embodiments, the edges between the primary display and the secondary display (and/or the first region) are rounded or modified to be displayed as rounded. In some embodiments, the corner is faded or has a particular visual effect applied (e.g., a visual effect is applied to the corner that fades the corner while other portions of the second portion of the virtual object are not faded or do not have the particular visual effect applied). In some embodiments, a gradient is applied to the corner when the corner is faded.

With reference again to FIG. 7, as part of displaying the second portion (block 704), in accordance with a determination that the second portion of the virtual object is not within a predefined distance from an edge of the primary display, applying a visual effect to the second portion of the virtual object is forgone. For example, as described above with reference to FIG. 6C displaying second portion 302c of virtual object 302 via primary display 204, in accordance with a determination that second portion 302c of virtual object 302 is not within predefined distance 510a from an edge of primary display 204, applying a visual effect to second portion 302c of virtual object 302 is forgone.

FIGS. 8A-8B, 9A-9B, 10A-10B, 11A-11B, 12A-12B, 13A-13B, and 14A-14B depict exemplary techniques for transitioning an object between displays in accordance with some embodiments. Among other benefits, the techniques and processes described below help to conserve the battery life of device 202 while continuing to maximize the ability of device 202 to present information (e.g., present information to user 250 in FIG. 2B). Device 202 conserves battery life by intelligently shifting the presentation of information from primary display 204 to one or more of secondary display 206 and a tertiary display (e.g., the LEDs around frame 210). Shifting the information preserves battery life because secondary display 206 and the tertiary display can have a maximum resolution that is lower than the resolution of primary display 204. Therefore, secondary display 206 and the tertiary display could use less energy than primary display 204 to display information.

As discussed below, FIGS. 8A, 9A, 10A, 11A, 12A, 13A, and 14A depict an exemplary scenario in which a user 250 interacts with an object 806 while wearing device 202. However, this particular scenario is provided for exemplary purposes only. The techniques discussed below or similar techniques can also be effectively applied to various other scenarios.

As mentioned above, FIG. 8A illustrates a scenario where user 250 is wearing device 202. In this scenario, device 202 is positioned distance 804a away from object 806, such as a set of keys. In some embodiments, object 806 is a physical article or physical object that is located in a physical environment with user 250. In some embodiments, object 806 is a virtual object that is located in a CGR environment that is being displayed to user 250 through device 202.

In some embodiments, object 806 moves while user 250 and/or device 202 are stationary or, alternatively, non-stationary.

In some embodiments, the environment includes one or more objects other than object 806. In some embodiments, device 202 detects that object 806 is in the environment shown in FIG. 8A. In some embodiments, device 202 determines that the object is useful or an important object (e.g., or more useful or more important than other objects in the environment). In some embodiments, device 202 can use one or more algorithms and/or one or more user preferences to determine whether an object is useful or important to a user or an application that corresponds to a particular object (e.g., an application that is in communication with device 202). In some embodiments, device 202 receives a request or a notification concerning an object and bases this determination on whether the object is useful or important based on the request or notification.

Figure 8A:
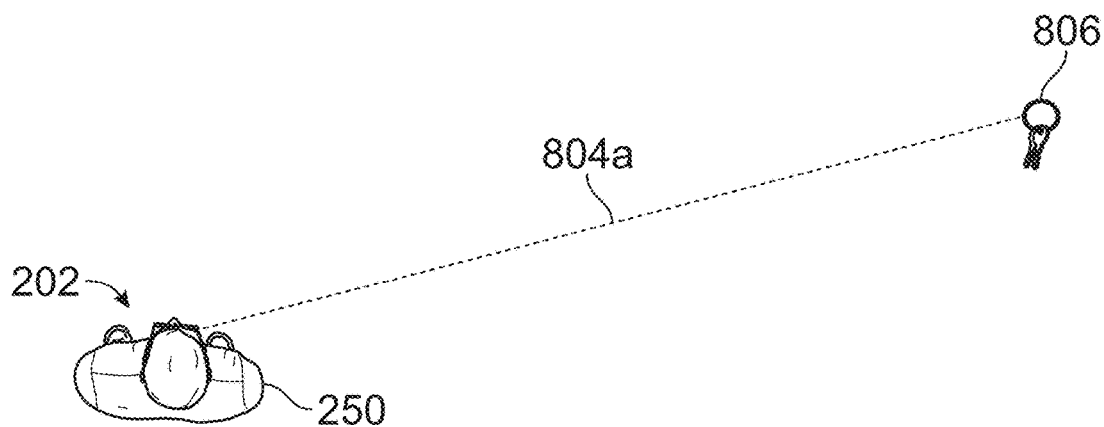
FIGS. 8A-8B depict an exemplary technique for displaying a virtual object in accordance with some embodiments.
Figure 8B:
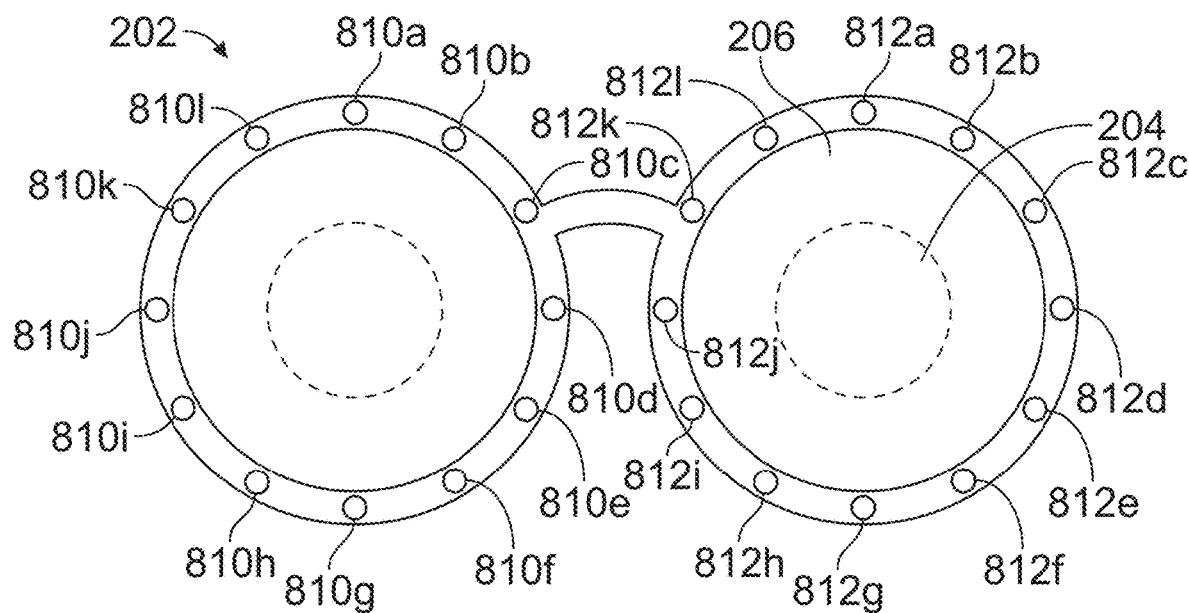

FIG. 8B illustrates device 202 at a time that corresponds to the scenario depicted in FIG. 8A. Device 202 includes primary display 204 and secondary display 206 (in addition to one or more components as described in FIG. 2A above). At FIG. 8B, primary display 204 and secondary display 206 are not displaying (or presenting) any visual information related to directional information that corresponds to the location of object 806 relative to device 202 (directional information). In some embodiments, at least some visual information is not displayed via primary display 204 and/or secondary display 206 because device 202 is too far from object 806 (or distance 804a is above a predetermined threshold distance).

As illustrated in FIG. 8B, device 202 further includes LEDs 810a-810f and 812a-812f (the LEDs). At FIG. 8B, the LEDs are not emitting light (e.g., emitting light to show directional information). In some embodiments, one or more of the LEDs are not emitting light because device 202 is too far from object 806 (or distance 804a is above a predetermined threshold distance).

Figure 9A:
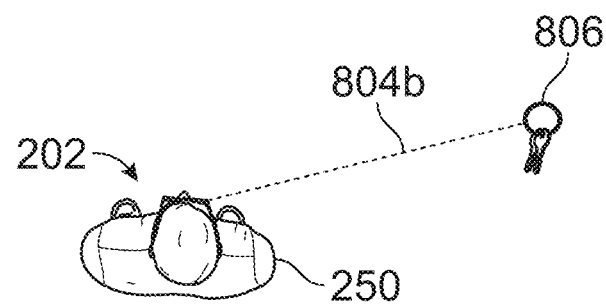
FIGS. 9A-9B depict an exemplary technique for displaying a virtual object in accordance with some embodiments.

FIG. 9A illustrates object 806 and/or device 202 having moved from their positions in FIG. 8A to their positions in FIG. 9A.

Figure 9B:
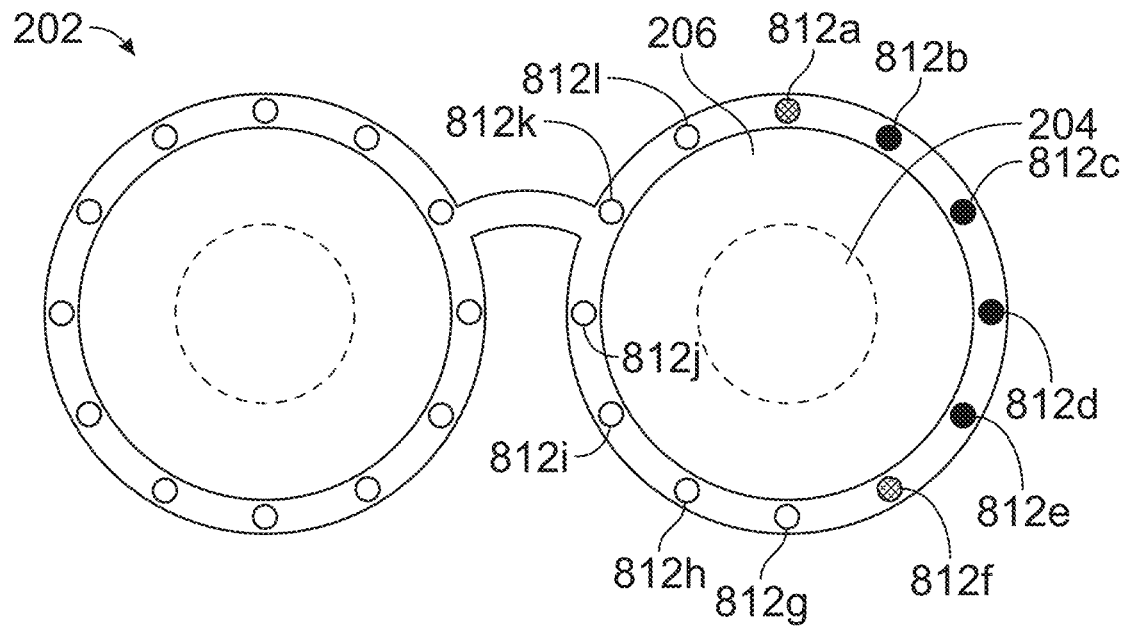

FIG. 9B illustrates device 202 at a time that corresponds to the scenario depicted in FIG. 9A. With reference to FIGS. 9A and 9B, assume that when device 202 is distance 804b away from object 806, device 202 receives directional information. In response to receiving the directional information, device 202 determines that object 806 is a type of object where directional information can be (e.g., is configured to be, is determined to be) displayed via one or more of the LEDs. In some embodiments, device 202 makes this determination because device 202 is distance 804b away from object 806 (or distance 804b is less than a predetermined threshold distance (e.g., a threshold distance that corresponds to a maximum distance to display directional information).

As illustrated in FIG. 9B, device 202 causes LEDs 812a-812f to emit light in a pattern to show directional information because device 202 is distance 804b away from object 806 (or that object 806 is a type of object where directional information can be displayed via one or more of the LEDs). As illustrated in FIG. 9B, LEDs 812a-812f are on the right side of device 202 in a direction that is more upward than downward as positioned on frame 210 of device 202. Thus, LEDs 812a-812f indicate that object 806 is in front of and to the right of device 202, which matches the general direction of the path between device 202 and object 806 in FIG. 9A.

In FIG. 9B, LEDs 812a and 812f are hatched while LEDs 812b-812e are solid to demonstrate a gradient field of light. Here, the gradient field of light can show stronger points (e.g., solid LEDs 812b-812e) of the directional pull of the directional information between object 806 and device 202 from the weaker points (e.g., hatched LEDs 812a, 812f) of the directional pull. Notably, the gradient field can provide more directional information to a user, which can help the user navigate more efficiently towards object 806.

In some embodiments, directional information is displayed via the LEDs rather than primary display 204 and/or secondary display 206 at distances greater than or equal to a predetermined threshold distance (e.g., a distance that is greater than or equal to distance 804b). In some embodiments, directional information is displayed via the LEDs rather than primary display 204 and/or secondary display 206 because displaying directional information via the LEDs instead of primary display 204 and/or secondary display 206 reserves battery power.

In some embodiments, directional information is displayed via the LEDs rather than primary display 204 and/or secondary display 206 based on the type of information that is permitted to be displayed when device 202 is a certain distance away from object 806. In some embodiments, device 202 displays directional information that is not based on the appearance of the object (e.g., blinking LEDs) when device 202 is further away from object 806 (or within a first set of distances from an object). In some embodiments, device 202 displays directional information that is based on the appearance of the object (e.g., a visual representation of the object or a proxy object displayed via primary display 204 and/or secondary display 206) when device 202 is closer to object 806 (or within a second set of distances away from an object, where the second set of distances is different from the first set of distances). In some embodiments, device 202 can display directional information that is based on the appearance of the object and directional information that is not based on the appearance of the object (e.g., when device 202 is within a third set of distances away from the object that is between the first and second set of distances away from the object. In some embodiments, directional information is displayed via the LEDs rather than the primary display 204 and/or secondary display 206 based on whether or not the object is within the FOVs of the primary display 204 and/or secondary display 206. In some embodiments, directional information is displayed via the LEDs rather than the primary display 204 and/or secondary display 206 when the object is a certain distance outside of the FOVs of primary display 204 and/or secondary display 206.

Figure 10A:
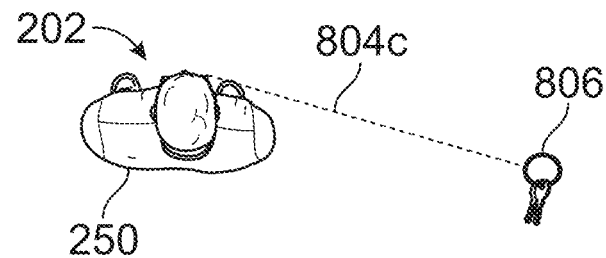
FIGS. 10A-10B depict an exemplary technique for displaying a virtual object in accordance with some embodiments.

FIG. 10A illustrates object 806 and/or device 202 having moved from their positions in FIG. 9A to their positions in FIG. 10A. In particular, in FIG. 10A, device 202 is positioned distance 804c from object 806, where distance 804c is different than distance 804b in FIG. 9A.

Figure 10B:
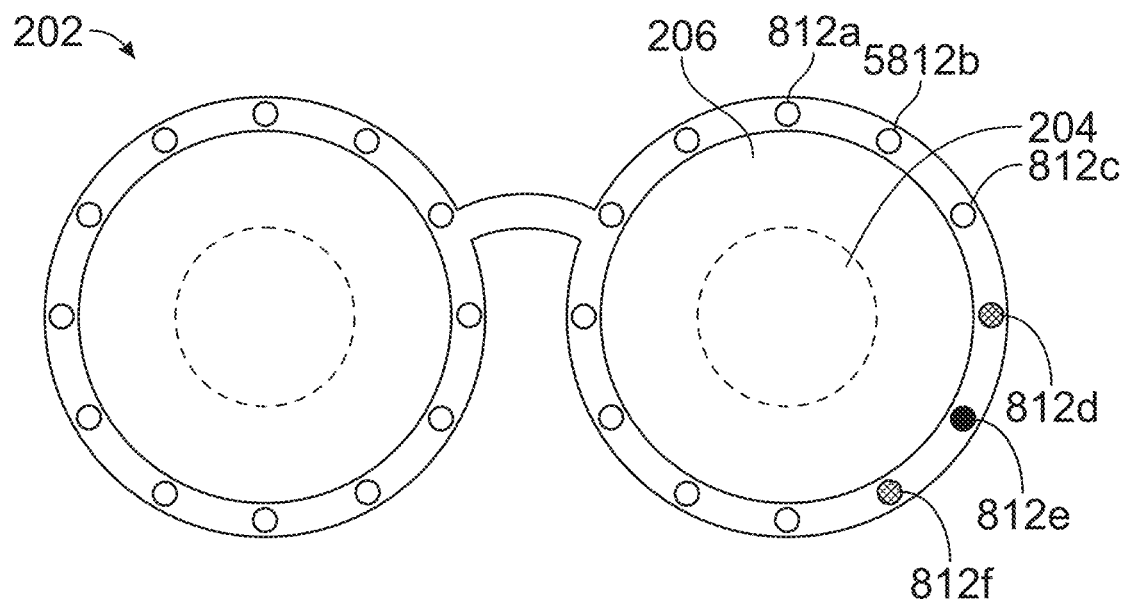

FIG. 10B illustrates device 202 at a time that corresponds to the scenario depicted in FIG. 10A. With reference to FIGS. 10A and 10B, assume device 202 receives directional information. In response to receiving the directional information, using similar techniques to those discussed above with respect to FIGS. 9A and 9B, device 202 determines that object 806 is a type of object where directional information can be displayed via the LEDs (e.g., because device 202 is distance 804c away from object 806). Based on this determination, device 202 then causes LEDs 812d-812f to emit light that corresponds to the directional information and LEDs 812a-812c to cease emitting light. Here, the updated LEDs of device 202 show the newly received directional information (e.g., showing directional information of the relative path to the position of object 806 being down and to the left of the position of device 202).

As illustrated in FIG. 10B, device 202 reduces the number of LEDs emitting light from the number of LEDs that were emitting light in FIG. 9B. In some embodiments, when device 202 is closer to object 806 than it was in FIG. 9B (e.g., in some embodiments, fewer LEDs can provide better directional information when user 250 is closer to the object). In some embodiments, when there are physical and/or virtual structures or objects between device 202 and object 806, device 202 updates the plurality of LEDs (and/or primary display 204 and/or secondary display 206) of device 202 in succession (e.g., LEDs emitting light in a pattern) such that user 250 can navigate around the physical and/or virtual structures or objects between device 202 and object 806.

Figure 11A:
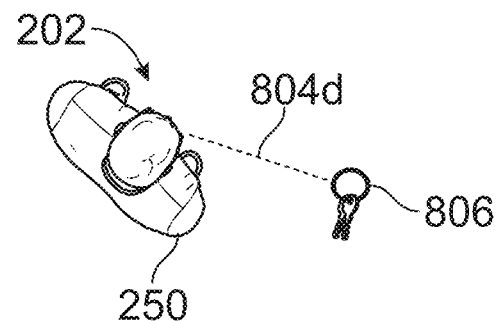
FIGS. 11A-11B depict an exemplary technique for displaying a virtual object in accordance with some embodiments.

FIG. 11A illustrates object 806 and/or device 202 having moved from their positions in FIG. 10A to their positions in FIG. 11A. In particular, in FIG. 11A, device 202 is positioned distance 804d from object 806, where distance 804d is different than distance 804c in FIG. 10A.

Figure 11B:
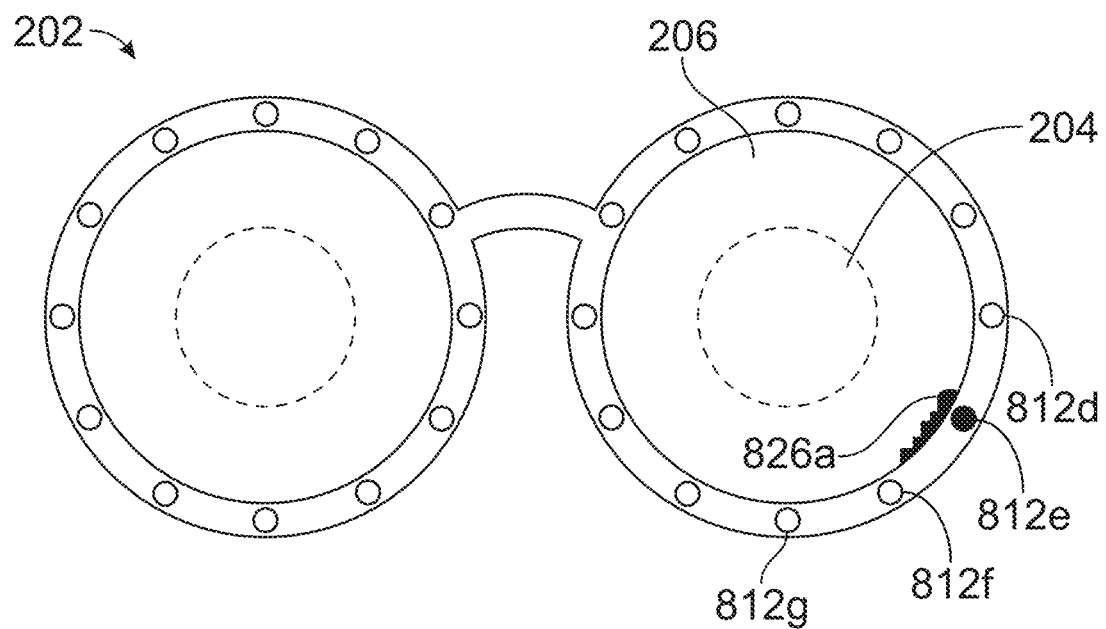

FIG. 11B illustrates device 202 at a time that corresponds to the scenario depicted in FIG. 11A. With reference to FIGS. 11A and 111B, assume device 202 updates not only the LEDs but also secondary display 206 because device 202 is closer (e.g., within a set of predetermined threshold distances) at distance 804d away from object 806 (as opposed to device 202 being distance 804c away from object 806 in FIG. 10B). In some embodiments, device 202 updates not only the LEDs but also secondary display 206 because object 806 is within the FOV of the secondary display 206.

Assume also that device 202 receives directional information. In response to receiving the directional information, using similar techniques to those discussed above with respect to FIGS. 9A and 9B, device 202 determines that object 806 is a type of object where directional information can be displayed via LED 812e (e.g., because device 202 is distance 804d away from object 806). Based on this determination, device 202 causes LED 812e to emit light that corresponds to the directional information and LEDs 812d and 812f to cease emitting light, using one or more techniques described above in relation to FIGS. 9B and 10B.

If device 202 determines that object 806 is a type of object where directional information can be displayed via secondary display 206, then device 202 displays the directional information via secondary display 206. Here, device 202 makes this determination because it is distance 804d away from object 806.

In some embodiments, because device 202 is distance 804d away from object 806 and/or object 806 is within a predetermined threshold distance outside the field-of-view of primary display 204, device 202 causes secondary display 206 to display modified representation 826a of object 806. Here, modified representation 826a is a representation of a proxy object or a symbolic representation of object 806 and is visually distinguishable from object 806. As illustrated in FIG. 11B, modified representation 826a is a blob of a plurality of pixels at the edge of secondary display 206.

In some embodiments, object 806 is inside of the field-of-view of secondary display 206 when device 202 is distance 804d away from object 806. In some embodiments, object 806 is at a location inside of the field-of-view of secondary display 206 that corresponds to the location on secondary display 206 where modified representation 826a is displayed.

In some embodiments, object 806 is outside of the field-of-view of secondary display 206 when device 202 is distance 804d away from object 806. Thus, in some embodiments, device 202 displays modified representation 826a, via secondary display 206, when object 806 is outside of the field-of-view of secondary display 206. In some embodiments, displaying modified representation 826a at a respective location on secondary display 206 when object 806 is outside of the field-of-view of secondary display 206 provides directional information for locating objects that are outside of the field-of-view of the displays of device 202.

In FIG. 11B, modified representation 826a does not resemble an actual representation of object 806. In some embodiments, modified representation 826a does not resemble object 806 because it does not have two or more features, such as the size, shape, color, texture, blur, etc., of object 806.

Modified representation 826a shows that an object (e.g., an object that is useful or important as described above in relation to FIG. 8A) is within or outside of the user's peripheral vision (e.g., the user's peripheral vision receiving visual information presented or displayed via secondary display 206). Modified representation 826a also can show the general direction of an object's position relative to the position of device 202. In some embodiments, the general direction is shown by positioning modified object representation 826a at a particular location on secondary display 206.

In some embodiments, modified representation 826a is static (e.g., not moving, not pulsating, not animating) while the lights emitting from one or more of the LEDs are not static (e.g., moving, pulsating, animating) or vice-versa. In some embodiments, modified representation 826a and LEDs 812a-812l are both static (e.g., or not static).

Figure 12A:
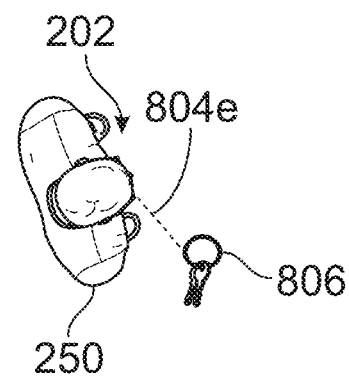
FIGS. 12A-12B depict an exemplary technique for displaying a virtual object in accordance with some embodiments.

FIG. 12A illustrates object 806 and/or device 202 having moved from their positions in FIG. 11A to their positions in FIG. 12A. In particular, in FIG. 12A, device 202 is positioned distance 804e from object 806, where distance 804e is different than distance 804d in FIG. 11A.

Figure 12B:
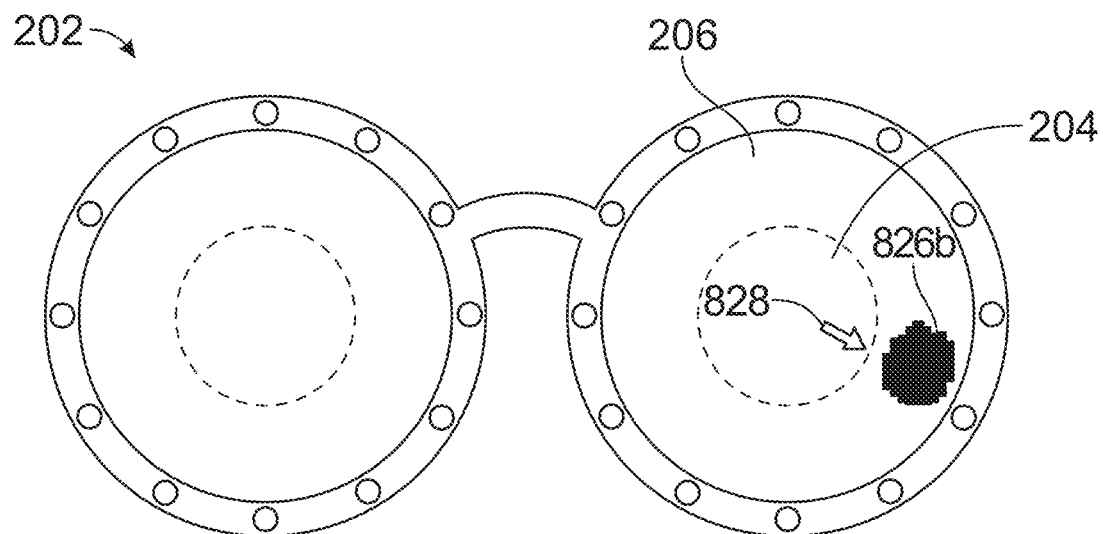

FIG. 12B illustrates device 202 at a time that corresponds to the scenario depicted in FIG. 12B. With reference to FIGS. 12A and 12B, assume device 202 receives new directional information. Here, based on the new directional information, device 202 updates primary display 204 and secondary display 206 to display representations of directional information and forgoes displaying directional information via the LEDs.

In some embodiments, device 202 determines that object 806 is not a type of object where directional information can be displayed via LEDs 812a-812l because device 202 is distance 804e away from object 806. For example, device 202 can determine that distance 804e is a distance where device 202 is too close to object 806. In some embodiments, device 202 ceases to display directional information the LEDs when directional information or one or more types (e.g., representation 828) of directional information are displayed via primary display 204 and/or secondary display 206.

In some embodiments, in response to receiving the directional information, device 202 determines that object 806 is a type of object where directional information for the object can be displayed via secondary display 512 (e.g., because device 202 is distance 804e away from object 806 and/or object 806 is within a predetermined threshold distance outside the field-of-view of primary display 204), using similar techniques as described above in FIG. 11B. Because of this determination, device 202 causes secondary display 206 to display modified representation 826b.

In FIG. 12B, modified representation 826b is larger than modified representation 826a because device 202 is closer to object 806 in FIG. 12B than it was in FIG. 11B. As illustrated in FIG. 12B, modified representation 826b is displayed in a new location on secondary display 206 that is closer to primary display 204 than the location of modified representation 826a as shown in FIG. 11A. Modified representation 826b is displayed in the new location because object 806 is closer to the field-of-view of primary display 204.

In some embodiments, modified representation 826b occupies a portion of secondary display 206 that modified representation 826a occupied. In some embodiments, modified representation 826b grows from modified representation 826a (e.g., via an animation). In some embodiments, device 202 displays modified representation 826b and/or modified representation 826a with a brightness that is based on the size of object 806. For example, device 202 displays a modified representation of the large object with a brightness that is lower or dimmer than the brightness of a modified representation of a small object.

In some embodiments, in response to receiving the directional information, device 202 determines that object 806 is a type of object where directional information for the object can be displayed via primary display 204. At FIG. 12B, device 202 makes this determination based on a determination that distance 804e is close enough to object 806. Based on this determination, device 202 causes representation 828 to be displayed via primary display 204.

In FIG. 12B, representation 828 is an arrow pointing to the position of object 806. In some embodiments, device 202 displays representation 828 to indicate that user 250 can adjust the field-of-view of primary display 204 (e.g., by moving the head of user 250 while standing stationary), such that object 806 can be located within the field-of-view of primary display 204. In some embodiments, device 202 causes representation 828 to be animated. In some embodiments, device 202 causes representation 828 (or a representation that corresponds to representation 828) to be displayed via secondary display 206.

Figure 13A:
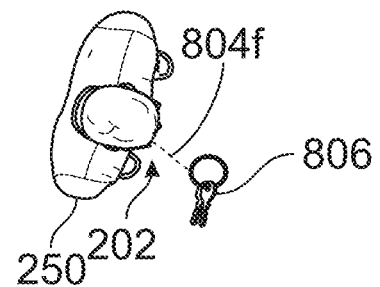
FIGS. 13A-13B depict an exemplary technique for displaying a virtual object in accordance with some embodiments.

FIG. 13A illustrates object 806 and/or device 202 having moved from their positions in FIG. 12A to their positions in FIG. 13A. In particular, in FIG. 13A, device 202 is positioned distance 804f from object 806, where distance 804f is different than distance 804e in FIG. 12A. Moreover, as depicted in FIG. 13A, object 806 is within the field of view of primary display 204 of device 202.

Figure 13B:
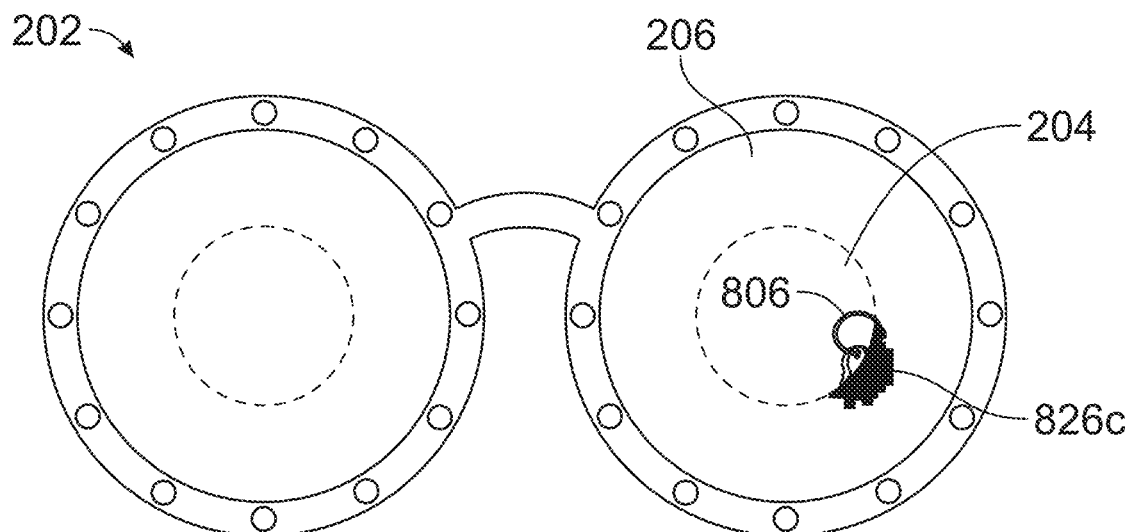

FIG. 13B illustrates device 202 at a time that corresponds to the scenario depicted in FIG. 13A. With reference to FIGS. 13A and 13B, assume device 202 receives new directional information. Because device 202 is distance 804f from object 806 and/or because at least a portion of object 806 is in the field-of-view of the primary display and in the field-of-view of the secondary display, device 202 displays an actual representation of a portion of object 806 via primary display 204 and a modified representation 826c of object 806 via secondary display 206. In some embodiments, the actual representation of the portion of the object resembles (e.g., has two or more features that are similar to object 806), while the modified representation does not resemble object 806. In some embodiments, the actual representation of the portion of the object is displayed using a first model of the object while the modified representation is displayed using a second model of the object. In some embodiments, the first model of the object is different from the second model of the object because the second model of the object is simpler than the first model of the object. In some embodiments, the second model of the object is simpler than the first model of the object because the second model has less detail (e.g., a three-dimensional model that has fewer polygons) than the first model.

In some embodiments, a portion of modified representation 826b moves into primary display 204 by applying a visual effect to a virtual representation of a portion of object 806, using similar techniques to those described above in FIG. 7 (e.g., to reduce the clipping of object 806 transitioning between primary display 204 and secondary display 206). In some embodiments, device 202 replaces modified representation 826b or 826c with a representation of an actual portion of object 806 on secondary display 206 when transitioning an actual representation of a portion of object 806 to be displayed via primary display 204, using similar techniques to those described above in FIG. 7.

Figure 14A:
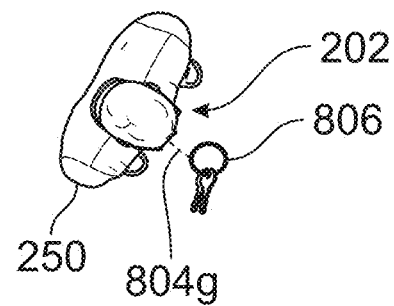
FIGS. 14A-14B depict an exemplary technique for displaying a virtual object in accordance with some embodiments.

FIG. 14A illustrates object 806 and/or device 202 having moved from their positions in FIG. 13A to their positions in FIG. 14A. In particular, in FIG. 14A, device 202 is positioned distance 804g from object 806, where distance 804g is different than distance 804f in FIG. 13A. Moreover, as depicted in FIG. 14A, the entirety of object 806 is now in the field of view of primary display 204 of device 202.

Figure 14B:
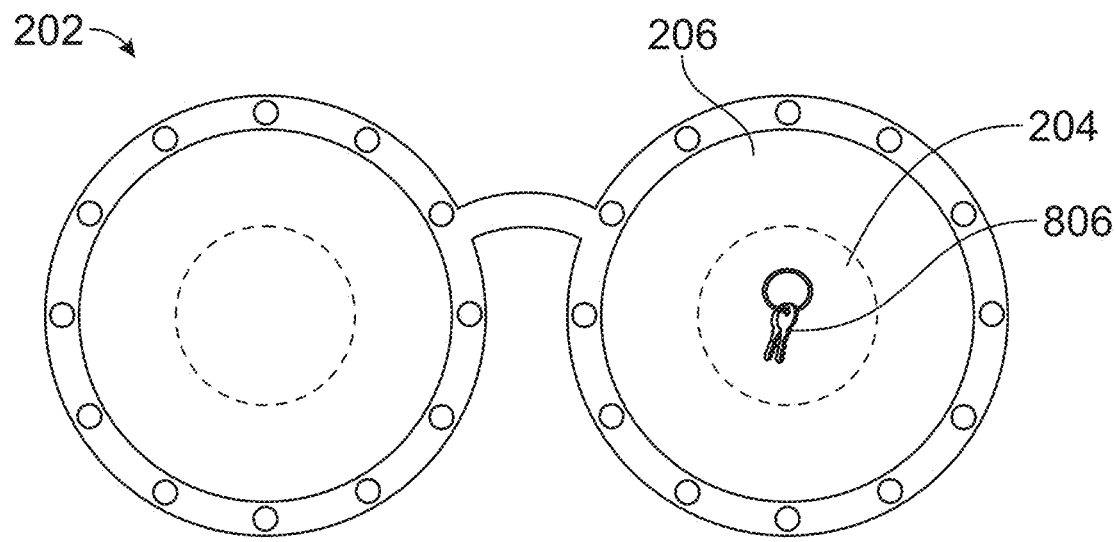

FIG. 14B illustrates device 202 at a time that corresponds to the scenario depicted in FIG. 14A. With reference to FIGS. 14A and 14B, device 202 displays an actual representation of object 806 (or, in some embodiments, a portion of object 806) to be displayed via primary display 204 and ceases to display a modified representation of object 806 via secondary display 206. In some embodiments, device 202 causes the actual representation of object 806 via primary display 204 and ceases to display the modified representation of object 806 via secondary display 206 because device 202 is within the field-of-view of primary display 204 and not within the field-of-view of secondary display 206.

In some embodiments, at FIGS. 13B and 14B, device 202 can display a proxy representation of object 806 via secondary display 206 instead of displaying the actual representation of object 806 via primary display 204. In some embodiments, secondary display 206 can overlap primary display 204, such that secondary display 206 covers most (or the entirety) of primary display 204. Thus, in some of these embodiments, a proxy representation of object 806 can be shown via the secondary display 206 over a portion of primary display 204 until device 202 receives a request to interact with object 806. For example, a request to interact with object 806 can be received when an input (e.g., voice input, physical input) is determined to be directed to object 806 and/or a process is initiated to perform an operation that involves (e.g., indirectly or directly) one or more components of object 806 and/or an object associated with object 806. In some embodiments, in response to receiving the request to interact with object 806, device 202 ceases to display the proxy representation of object 806 via secondary display 206 and displays the actual representation of object 806 via primary display 204. Thus, in embodiments where device 202 uses more battery power to display objects via primary display 204 than secondary display 206, device 202's battery power is saved because primary display 204 is not used to display a representation of object 806 until a determination has been made that object 806 may be interacted with.

In some embodiments, at FIGS. 13B and 14B, device 202 can display a proxy representation of object 806 instead of displaying the actual representation of object 806 via primary display 204. In some embodiments, the proxy representation of object 806 has less visual details and/or takes less power to display than the actual representation of object 806. In some embodiments, while displaying the proxy representation of object 806 via primary display 204, device 202 receives a request to interact with object 806. For example, a request to interact with object 806 can be received when an input (e.g., voice input, physical input) is determined to be directed to object 806 and/or a process is initiated to perform an operation that involves (e.g., indirectly or directly) one or more components of object 806 and/or an object associated with object 806. In some embodiments, in response to receiving the request to interact with object 806, device 202 replaces display of the proxy representation of object 806 with the actual representation of object 806. Thus, in some embodiments, battery power is saved and/or the number of processes being performed by device 202 is reduced because the actual representation of object 806 is displayed only after a determination has been made that object 806 may be interacted with. In some embodiments, the LEDs are inactive (or not included as a part of device 202) while the proxy representation of object 806 and/or the actual representation of object 806 are displayed.

Figure 15:
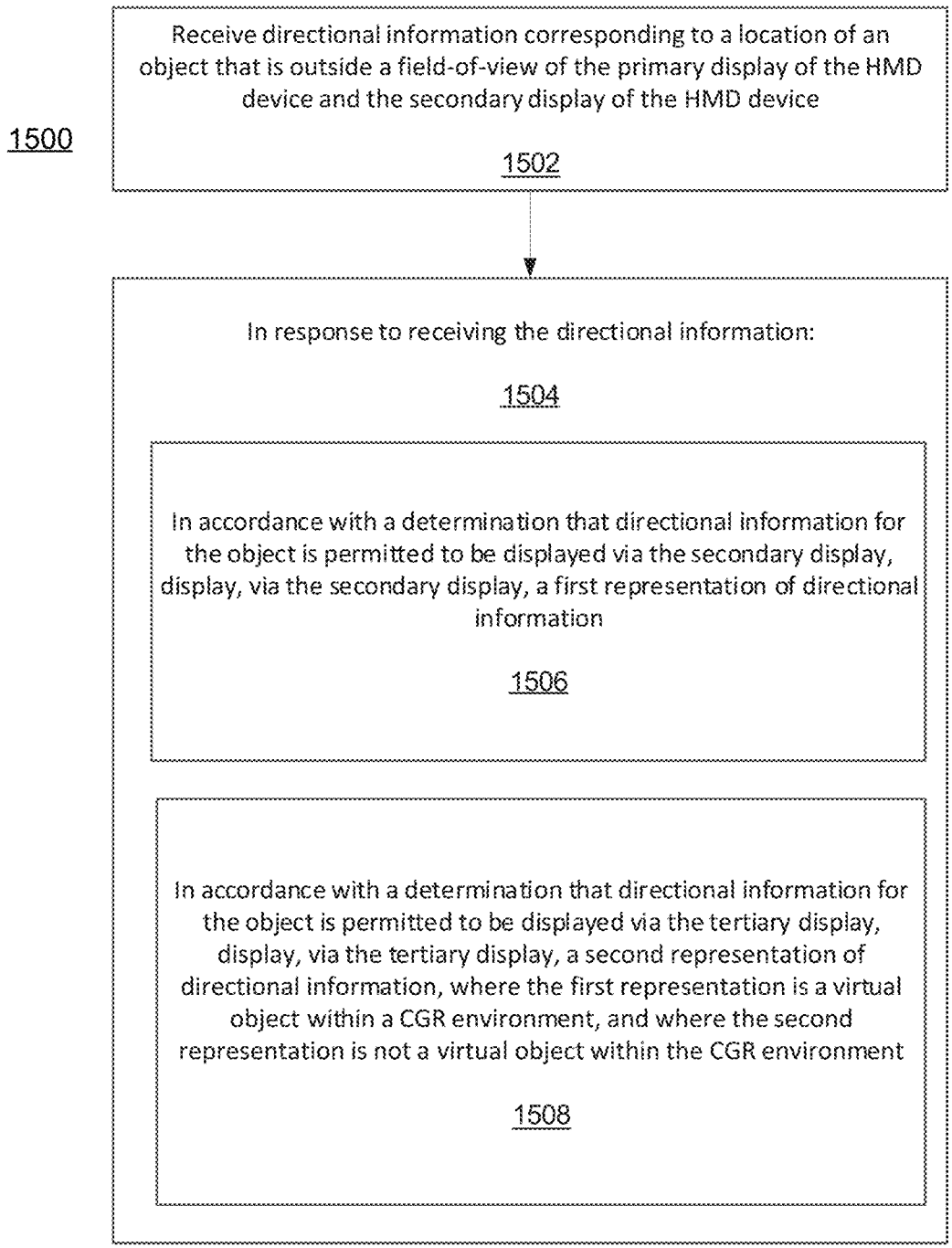
FIG. 15 is a flow diagram illustrating a method for transitioning objects between displays based on directional information in accordance with some embodiments.

FIG. 15 is a flow diagram illustrating a method for transitioning objects between displays based on directional information in accordance with some embodiments. In some embodiments, the method is performed by system 100 (FIGS. 1A and 1). In some embodiments, the method is performed by device 202 (FIG. 2A). In some embodiments, the method is performed by a third device or system that is different from device 202 or system 100. In some embodiments, the method is performed by a combination of one or more of system 100, device 202, and the third device or system.

At block 1502, directional information (e.g., 804a-804d) corresponding to a location (e.g., north, south, east, west, right, left, back, forward, other cardinal directions, or any combination thereof) of an object that is outside a field-of-view of the primary display (e.g., 204) of the device and the secondary display of the device is received. In some embodiments, the object is a physical object or article in a physical environment; in some embodiments, the object is a virtual object in a virtual environment.

In some embodiments, the primary display, secondary display, and/or tertiary display are different types of displays. In some embodiments, the primary display is a wave guide display. In some embodiments, the secondary display is an organic light-emitting diode display. In some embodiments, the tertiary display is a plurality of light-emitting diodes.

At blocks 1504 and 1506, in response to receiving the directional information corresponding to the location of the object that is outside the field-of-view of the primary display and the secondary display and in accordance with a determination that first criteria are satisfied, a first representation of directional information is displayed via the secondary display.

In some embodiments, the first criteria include a criterion that is met when the object is a type of object where directional information for the object can be displayed in the secondary display. In some embodiments, directional information for the object is permitted to be displayed via the secondary display when the object is a predetermined distance away from or beside a portion (e.g., primary display, secondary display, the frame of the device). In some embodiments, directional information for the object is permitted to be displayed via the secondary display when the directional information is received from an application or the object corresponding to an application and the object is configured by the application (or another process) to be displayed via the secondary display, when the object has one or more properties or features (e.g., size, shape, distance) that allow it to be displayed via the secondary display). In some embodiments, directional information for the object is permitted to be displayed via the secondary display, when the object is not in a particular location or direction, or the object would cause the representation of the object to be displayed adjacent to a portion of the device (e.g., the inside of the frame of the device, near the bridge of the device, near the nose of the user).

At blocks 1504 and 1508, in response to receiving the directional information corresponding to the location of the object that is outside the field-of-view of the primary display and the secondary display and in accordance with a determination that second criteria are satisfied, a second representation (e.g., 812a-812g) of directional information (e.g., 804b-804d) is displayed via the tertiary display.

In some embodiments, the second criteria include a criterion that is met when the object is a type of object where directional information for the object can be displayed in the tertiary display. In some embodiments, directional information for the object is permitted to be displayed via the tertiary display when the object is a predetermined distance away from or beside a portion (e.g., primary display, secondary display, frame) of the device when the directional information is received from an application or the object corresponding to an application and the object is configured by the application (or another process) to be displayed via the tertiary display, when the object has one or more properties or features (e.g., size, shape, distance) that allow it to be displayed via the tertiary display, when the object is not in a particular location or direction or when the object would cause the representation of the object to be displayed adjacent to a portion of the device (e.g., the inside of the frame of the device, near the bridge of the device, near the nose of the user) or in a portion of the tertiary display.

In some embodiments, the first representation is a virtual object (e.g., first representation is a modified representation of the object), and the second representation is not a virtual object within the CGR environment. In some embodiments, the first modified representation of the virtual object can be visually distinguished from an actual representation of the object. For example, the first modified representation can have a visual appearance that is not similar or does not look like the actual object, while the actual representation of the object can have a visual appearance that is similar or does look like the actual object. In some embodiments, a device will not be able to identify, using image recognition techniques, the actual object when processing the modified representation of the object, but will be able to identify the actual object when processing the actual representation of the object. In some embodiments, the first modified representation can be a representation that does not resemble (e.g., does not have two or more of the same features such as color, shape, texture, size, brightness, boldness, fading) the actual object while the actual representation is a representation that does resemble the actual object.

In some embodiments, the first representation is a static representation. For example, a static representation is a representation that does not move or is not animated over a period of time (e.g., not changing, not pulsating, not being in a predetermined sequence or pattern, etc.). In some embodiments, the second representation is a dynamic representation. For example, a dynamic representation is a representation that does move or is animated over a period of time (e.g., pulsating, displayed in a predetermined sequence or pattern, changing colors over a period of time). In some embodiments, the first representation is a different color than the second representation. In some embodiments, the first representation is a different size than the second representation. In some embodiments, the first representation is not displayed while the second representation is displayed or vice-versa. In some embodiments, at least one of the first representation and the second representation includes a gradient (e.g., a gradient field (e.g., solid and hatched LEDs) that shows direction).

In some embodiments, the primary display and the secondary display can display different representations of the object. In some embodiments, the first representation of directional information is a first representation of the object that is displayed via the secondary display. In some embodiments, while the first representation of directional information is displayed via the secondary display, the object is detected inside of the field-of-view of the primary display of the HMD device. In some embodiments, in response to detecting that the object is inside of the field-of-view of the primary display, a second representation of the object is displayed via the primary display. In some embodiments, the first representation of the object, that is displayed via the secondary display, is displayed based on a first model of the object. In some embodiments, the second representation of the object, that is displayed via the primary display, is displayed based on a second model of the object. In some embodiments, the second model of the object is simpler (e.g., has more visual characteristics, more visual details) than the first model of the object.

In some embodiments, the tertiary display circumscribes a first portion of the secondary display. In some embodiments, the tertiary display circumscribes the first portion of the secondary display while not circumscribing a second portion of the secondary display. In some embodiments, the primary display overlaps the secondary display.

In some embodiments, a representation of the object that is different from the first and second representations of directional information is displayed via the primary display while the first representation is displayed via the secondary display. In some embodiments, the representations of directional information are associated with the location of the object. For example, the representations of directional information can indicate the position of a device relative to the location of the object.

In some embodiments, a representation of the object may not be displayed via the primary display until the object is interacted with. In some embodiments, directional information corresponding to a location of an object that is inside a field-of-view of the primary display of the HMD device and the secondary display of the HMD device is received. In some embodiments, in response to receiving the directional information corresponding to the location of the object that is inside the field-of-view of the primary display of the HMD device and the secondary display of the HMD device, a fourth representation of the object is displayed via the secondary display without a fifth representation of the object being displayed via the primary display. In some embodiments, a request to interact with (e.g., select the object, initiate a process that involves the object) the object is received. In some embodiments, in response to receiving the request to interact with the object, the fifth representation of the object is displayed via the primary display, and the fourth representation of the object ceasing to be displayed via the secondary display.

In some embodiments, a request to interact with the object is received. In some embodiments, a representation of the object is displayed via the primary display in response to receiving the request to interact with the object.

In some embodiments, while the first representation and the second representation are displayed, the first representation is displayed, via the secondary display, in a first location that is in a respective direction relative to the primary display and the second representation is not displayed, via the tertiary display, in a second location that is in the respective direction relative to the primary display.

Figure 16:
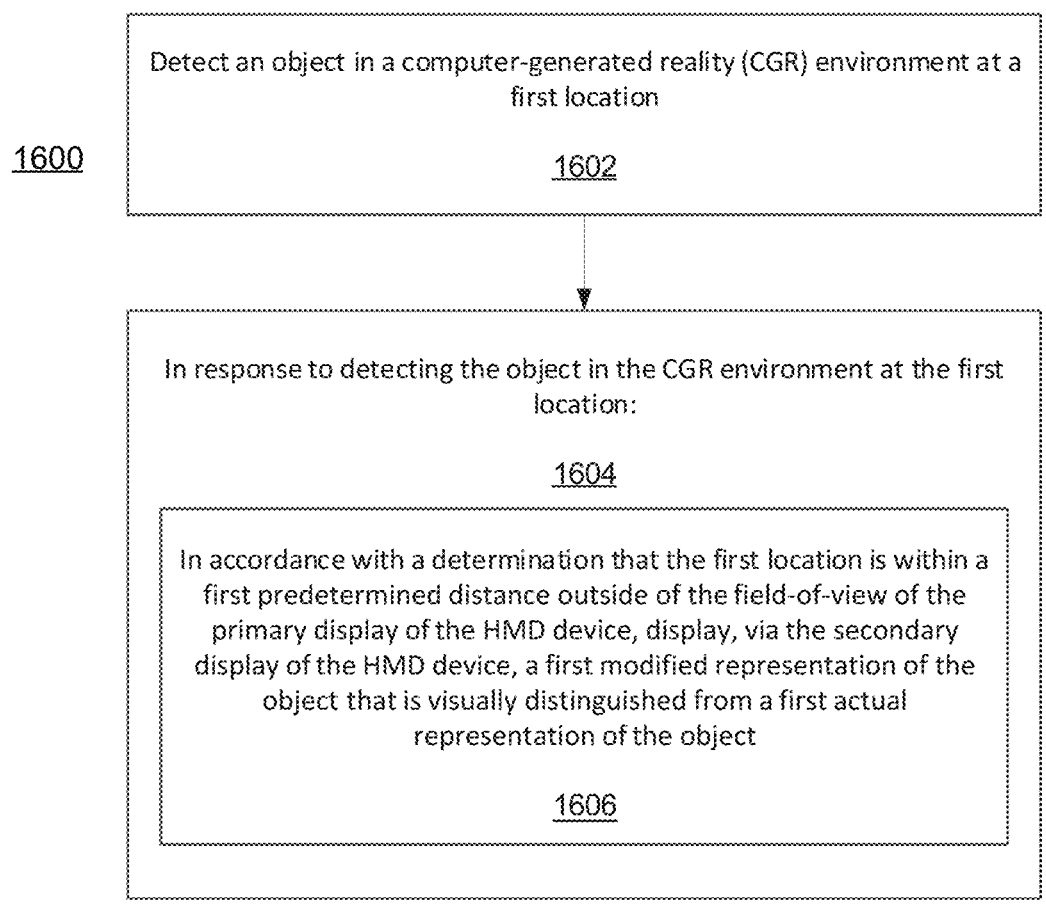
FIG. 16 is a flow diagram illustrating a method for displaying a modified representation of an object in accordance with some embodiments.

FIG. 16 is a flow diagram illustrating a method for displaying a modified representation of an object in accordance with some embodiments. In some embodiments, the method is performed by system 100 (FIGS. 1A and 1). In some embodiments, the method is performed by device 202 (FIG. 2A). In some embodiments, the method is performed by a third device or system that is different from device 202 or system 100. In some embodiments, the method is performed by a combination of one or more of system 100, device 202, and the third device or system.

At block 1602, an object (e.g., a virtual object, a virtual object that is a representation of a physical object, a physical object in a physical environment) in a computer-generated reality (CGR) environment at a first location (or a position) is detected. In some embodiments, the object is determined to be important or useful. For example, an object can be determined to be important or useful by receiving user input related to the object, by receiving user interaction that is related to the object, by receiving data identifying the object as important or useful, etc. In some embodiments, data identifying that the object is important or useful is received from one or more applications in communication with or being executed by device 202.

At blocks 1604 and 1606, a first modified representation of the virtual object is displayed in response to detecting the object in the CGR environment at the first location and in accordance with a determination that the first location is within a first predetermined distance outside of the field-of-view of the primary display of the device.

The first modified representation of the virtual object can be visually distinguished from an actual representation of the object. For example, the first modified representation can have a visual appearance that is not similar or does not look like the actual object, while the actual representation of the object can have a visual appearance that is similar or does look like the actual object. In some embodiments, a device may not be able to identify, using image recognition techniques, the actual object when processing the modified representation of the object, but will be able to identify the actual object when processing the actual representation of the object. In some embodiments, the first modified representation can be a representation that does not resemble (e.g., does not have two or more of the same features, such as color, shape, texture, size, brightness, boldness, fading) the actual object while the actual representation is a representation that does resemble the actual object.

In some embodiments, the first modified representation has visual content (e.g., data that represents a displayed representation) that is different from visual content of the first actual representation. In some embodiments, the modified representation of the object has a structure that is different from the structure of the actual object, and the actual representation of the object has the same structure as the object. For example, if the actual object is a tree, the actual representation of the object can visually look like a tree, while the first modified representation looks like a blob of pixels that is not in the shape of a tree.

In some embodiments, the first modified representation has a size that is based on the distance between the first location and the field-of-view of the primary display of the device. In some embodiments, the first modified representation is a first size when the location of the object is a first distance outside of the primary display. In some embodiments, the first modified representation is a second size when the location of the object is a second distance outside of the primary display. In some embodiments, the first modified representation displayed at the first size is bigger than the first modified representation displayed at the second size when the first distance is closer to the primary display than the second distance. In some embodiments, the size of the first modified representation increases in size when the object is detected at a location that is closer to the field-of-view of the primary display of the device than the first location.

In some embodiments, the first modified representation has a brightness (e.g., larger objects are made to be dimmer) that is based on the size of the object. In some embodiments, the first modified representation has a first brightness when the object is a first size. In some embodiments, the first modified representation has a second brightness when the object is a second size. In some embodiments, the first modified representation displayed at the first brightness is brighter than the first modified representation displayed at the second brightness when the first size of the object is smaller than the second size of the object.

In some embodiments, the first modified representation has a brightness that is based on the size of the object relative to another object that is displayed via a device. For example, the brightness of the first modified representation can increase as the size of the object gets greater than the size of the other object, and vice-versa. In some embodiments, when the size of the object is substantially equal to the size of the other object, the brightness of the modified representation of the object can be equal to the brightness of a representation of the other object. Thus, in some embodiments, as a user moves throughout an environment, the brightness of the modified representation of the object can change based on other objects within the environment.

In some embodiments, the first modified representation has a blur that is higher than a blur of the first actual representation. In some embodiments, the first modified representation is faded more than the first actual representation.

In some embodiments, as a part of displaying the first modified representation, an animation can be displayed. For example, the animation can be a pulsating animation, an animation that shifts or moves the first modified representation, an animation that transforms the first actual representation of the object into the first modified representation, an animation that fades in or fades out the first modified representation.

In some embodiments, a second actual representation of a first portion of the object is displayed via the primary display in response to detecting the object in the CGR environment at the first location and in accordance with a determination that the first location is within the field-of-view of the primary display and a field-of-view of the secondary display. For example, as illustrated in FIG. 13B, the second actual representation (e.g., 806) of the first portion of the object can be displayed via the primary display when a device is within a threshold distance inside of the field-of-view of the secondary display.

While displaying, via the primary display, the second actual representation of the first portion of the object, a second modified representation of a second portion of the object is displayed via the secondary display. For example, as illustrated in FIG. 13B, the second modified representation (e.g., 826c) is displayed via the secondary display.

In some embodiments, the second portion of the object is a different portion of the object than the first portion of the object. In some embodiments, the first portion of the object is within the field-of-view of the primary display but not in the field-of-view of the secondary display. In some embodiments, the second portion of the object is within the field-of-view of the secondary display but not in the field-of-view of the primary display. In some embodiments, the second actual representation is displayed at a higher resolution than the second modified representation. In some embodiments, the second actual representation is displayed adjacent to an edge of the primary display that is adjacent to the secondary display. In some embodiments, the second modified representation is displayed adjacent to an edge of the secondary display that is adjacent to the primary display.

In some embodiments, as a part of displaying, via the primary display, the second actual representation of the object, a visual effect is applied to the second actual representation of the object. In some embodiments, the second actual representation of the object after the visual effect is applied has a blur that is greater than a blur of the second actual representation of the object before the visual effect was applied. In some embodiments, one or more of the second actual representation of the first portion of the object, displayed via the primary display, and the second modified representation of the second portion of the object, displayed via the secondary display, are displayed using one or more techniques discussed above in relation to FIG. 7.

In some embodiments, a representation that corresponds to directional information to locate the object is displayed via the primary display in response to detecting the object in the CGR environment at the first location and in accordance with a determination that the first location is within a second predetermined distance outside of the field-of-view of the primary display of the device. For example, as illustrated in FIGS. 12A and 12B, the representation (e.g., 828) that corresponds to directional information to locate the object is displayed via the primary display when the distance between user 250 and object 806 is distance 804e away from each other, which is different from user 250 and object 806 being distance 804d away from each other in FIG. 11A.

In some embodiments, the representation that corresponds to directional information to locate the object is different from the actual representation. The representation that corresponds to the directional information to locate the object may provide an indication of the location of the object, the closeness of the object to the device, whether the device is moving away from or closer to the object.

In some embodiments, while displaying, via the primary display, the representation that corresponds to the location of the object, a modified representation of the object is displayed via the secondary display.

In some embodiments, in response to detecting the object at the first location and in accordance with a determination that the first location is within the field-of-view of the primary display and not within the field-of-view of the secondary display, the first actual representation (e.g., 806) is displayed via the primary display, while the first modified representation ceases to be displayed via the secondary display. In some embodiments, a portion of the first actual representation of the object is displayed. In some embodiments, the entirety of the object is displayed.

Figure 17A:
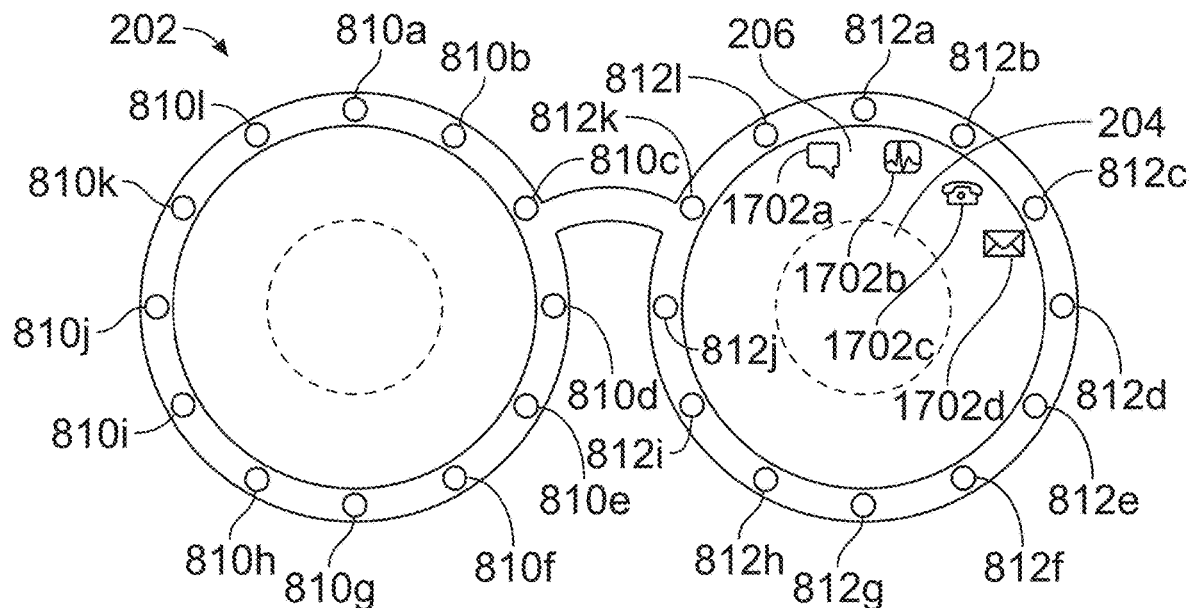
FIGS. 17A-17B depict an exemplary technique for managing one or more displays based on data associated with one or more processes in accordance with some embodiments.

FIGS. 17A-17B, 18, and 25 depict exemplary techniques for managing one or more displays based on data associated with one or more processes in accordance with some embodiments. In FIG. 17A, device 202 is depicted with one or more components, as discussed above in FIGS. 2A-2B and FIG. 8A.

FIG. 17A depicts device 202 displaying a plurality of application icons. The plurality of application icons include messaging application icon 1702a, health application icon 1702b, phone application icon 1702c, and e-mail application icon 1702d.

With reference to FIG. 17A, assume that device 202 receives a new message via a messaging application that corresponds to messaging icon 1702a. In response to receiving the new message, device 202 can determine if the information related to the new message will be displayed via a particular display (e.g., primary display 204, secondary display 206, the LEDs, etc.).

Figure 17B:
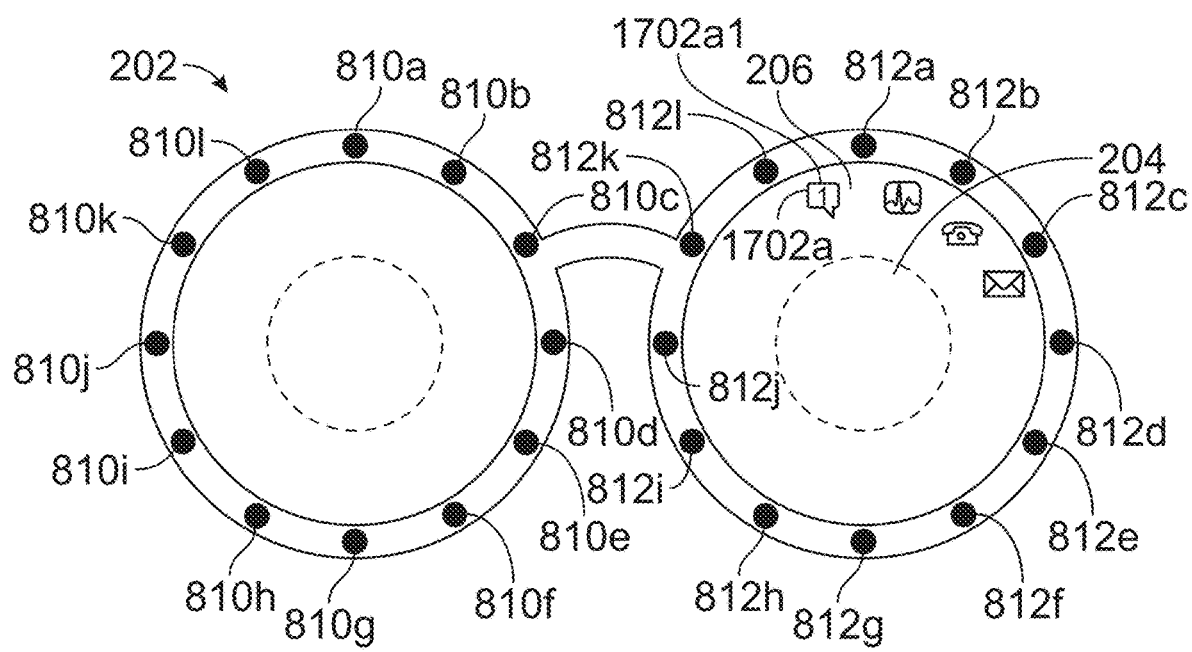

In some embodiments, in response to receiving the new message, device 202 determines that information related to the new message is permitted (or configured) to be displayed via secondary display 206. As depicted in FIG. 17B, device 202 updates messaging application icon 1702a to include message status indicator 1702a1 because of this determination. As shown in FIG. 17B, message status indicator 1702a1 is a "1" adjacent to messaging icon 1702a and indicates that one additional new or unread message has been received. An unread message can include a message that has not received any user interaction, such as a voicemail message that has not been heard, a text or e-mail message that has not been read, a notification or alert from an application that has not been opened, a notification or alert that has not been deleted, etc.

In some embodiments, in response to receiving the new message, device 202 determines that information related to the new message is permitted (or configured) to be displayed via a tertiary display, such as the LEDs. As depicted in FIG. 17B, device 202 causes the LEDs to emit light because of this determination. In some embodiments, device 202 causes only a portion of the LEDs to emit light.

One or more other types of alerts, notifications, sensor data, requests or data from an application, incoming phone calls, etc. can be received. In some embodiments, device 202 performs similar actions in response to their receipt, as described above in relation to the new message received in FIGS. 17A-17B. For example, device 202 can cause the LEDs to emit light when it is determined that health data detected by a heart rate sensor (or one or more other sensors that detect personal or health data) is above or below a threshold level and that information relating the data is permitted to be displayed via the LEDs.

Figure 18:
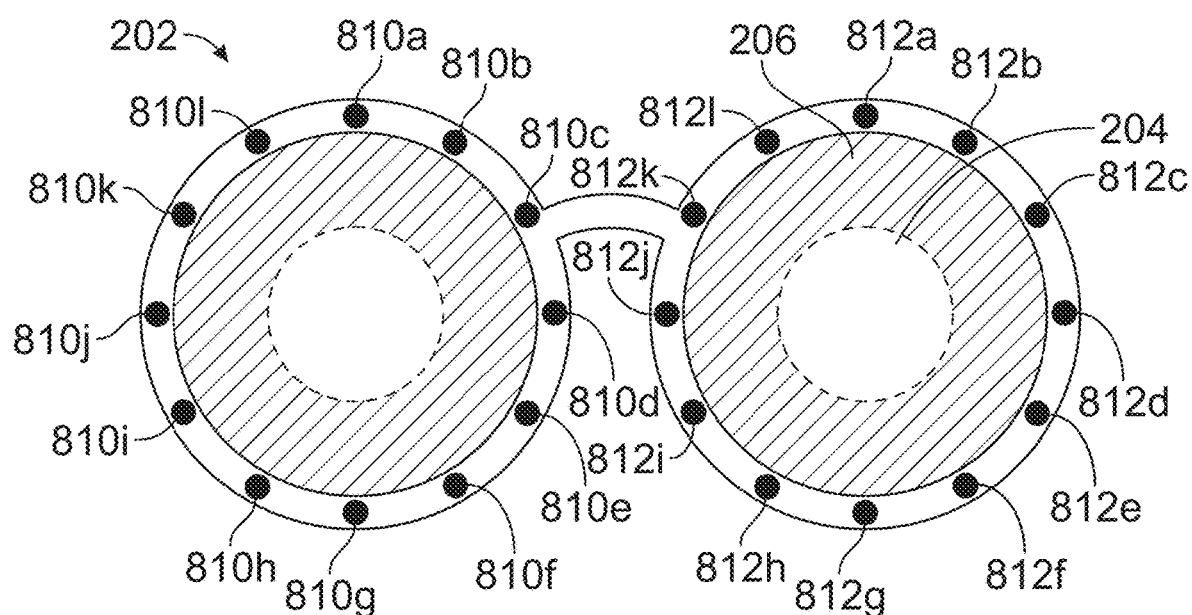
FIG. 18 depicts an exemplary technique for managing one or more displays based on data associated with one or more processes in accordance with some embodiments.

Device 202 can also perform other actions in response to receiving one or more messages, alerts, notifications, sensor data, requests or data from an application, incoming phone calls, etc. For example, as depicted in FIG. 18, device 202 displays a color across at least a portion of secondary display 206 based on the determination that information related to the new message is permitted to be displayed via secondary display 206. In some embodiments, a portion of primary display 204 is updated because of this determination.

In some embodiments, device 202 can display an animation via one or more displays. In some embodiments, the animation can include one or more pulsating colors, one or more moving objects, one or more objects changing shape or transitioning into one or more other objects, etc. For example, device 202 can display an animation of a pulsating color on primary display 204 and/or secondary display 206 based on a determination that health data of a user is above/below a threshold level and that information relating to the health data is permitted to be displayed on the respective display.

Figure 19A:
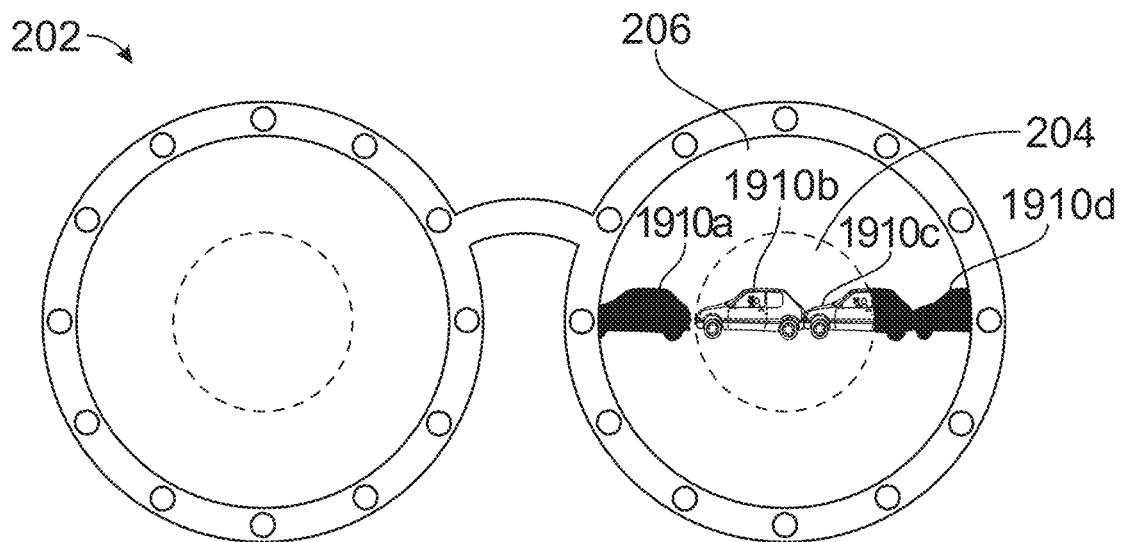
FIGS. 19A-19B depict an exemplary technique for managing one or more displays based on data associated with one or more processes in accordance with some embodiments.
Figure 19B:
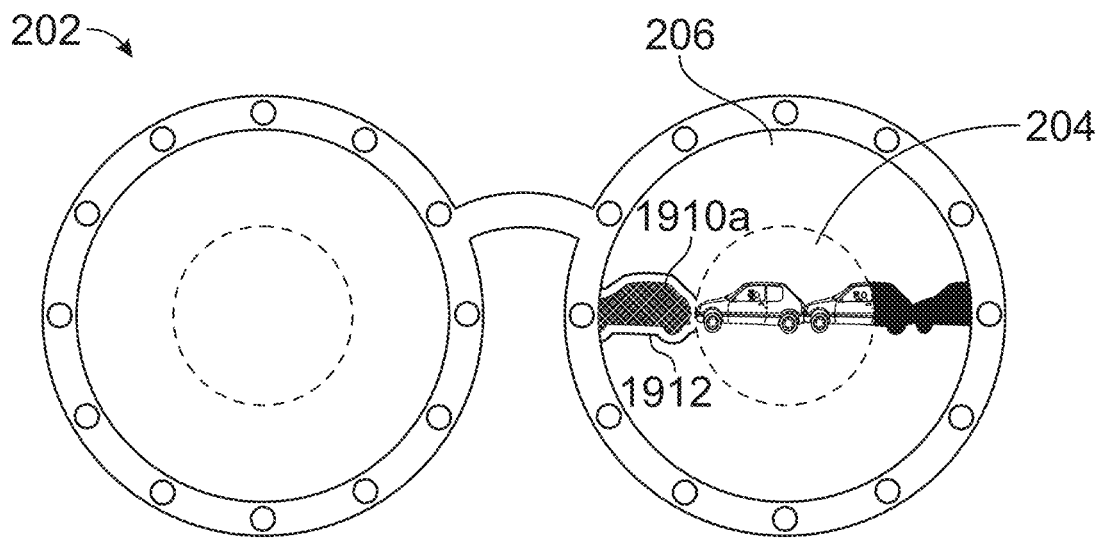
Figure 25:
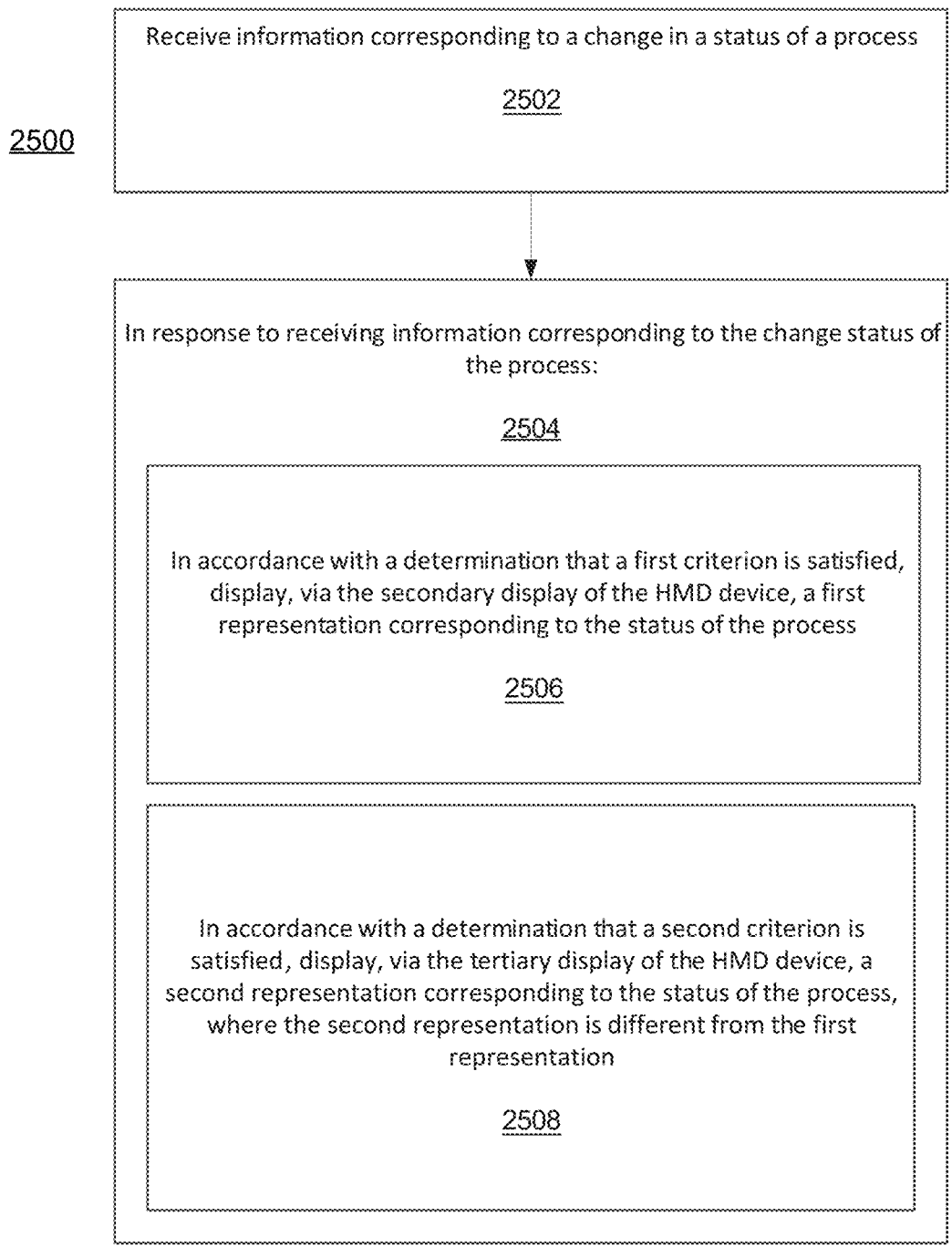
FIG. 25 is a flow diagram illustrating a method for managing one or more displays based on data associated with one or more processes in accordance with some embodiments.

FIGS. 19A-19B and 25 depict an exemplary technique for managing one or more displays based on data associated with one or more processes in accordance with some embodiments.

FIG. 19A depicts device 202 displaying a CGR environment that includes representations of a plurality of objects 1910a-1910d. Objects 1910a-1910d are cars, which are in the field-of-views of primary display 204 and secondary display 206. Here, objects 1910a-1910d are representative of physical cars in a physical environment that are viewed through the primary 204 and secondary 206 displays of device 202. In some embodiments, objects 1910a-1910d are representative of virtual objects that are displayed by primary 204 and secondary 206 displays of device 202.

With reference to FIG. 19A, assume device 202 receives data from an application that indicates that object 1910a is associated with the user of device 202. For example, in FIG. 19A, the application can be a car-sharing application, taxi application, car location application, etc. In some embodiments, device 202 determines that object 1910a is associated with the user of device 202 without receiving data from a dedicated application using one or more user settings, data stored in memory, one or more machine learning algorithms, etc.

In response to receiving the data from the application, device 202 can determine if the information related to the data from the application will be displayed via a particular display. In some embodiments, in response to receiving the data from the application, device 202 determines that information related to the data is permitted to be displayed via secondary display 206. As depicted in FIG. 19B, based on this determination, device 202 displays indicator 1912 around object 1910a on secondary display 206.

Indicator 1912 is displayed around object 1910a to visually distinguish object 1910a from objects 1910b-1910d. In some embodiments, device 202 causes object 1910a to be visually distinguished from the other objects in other ways. For example, device 202 can cease to display objects 1910b-1910d, minimize objects 1910b-1910d, enlarge object 1910a, highlight object 1910a, etc.

In some embodiments, in response to receiving the data from the application, device 202 determines that information related to the data is permitted to be displayed via the LEDs. As depicted in FIG. 19B, device 202 causes one or more of the LEDs to emit light based on this determination.

FIGS. 20A-20D and 25 depict an exemplary technique for managing one or more displays based on data associated with one or more processes in accordance with some embodiments.

Figure 20A:
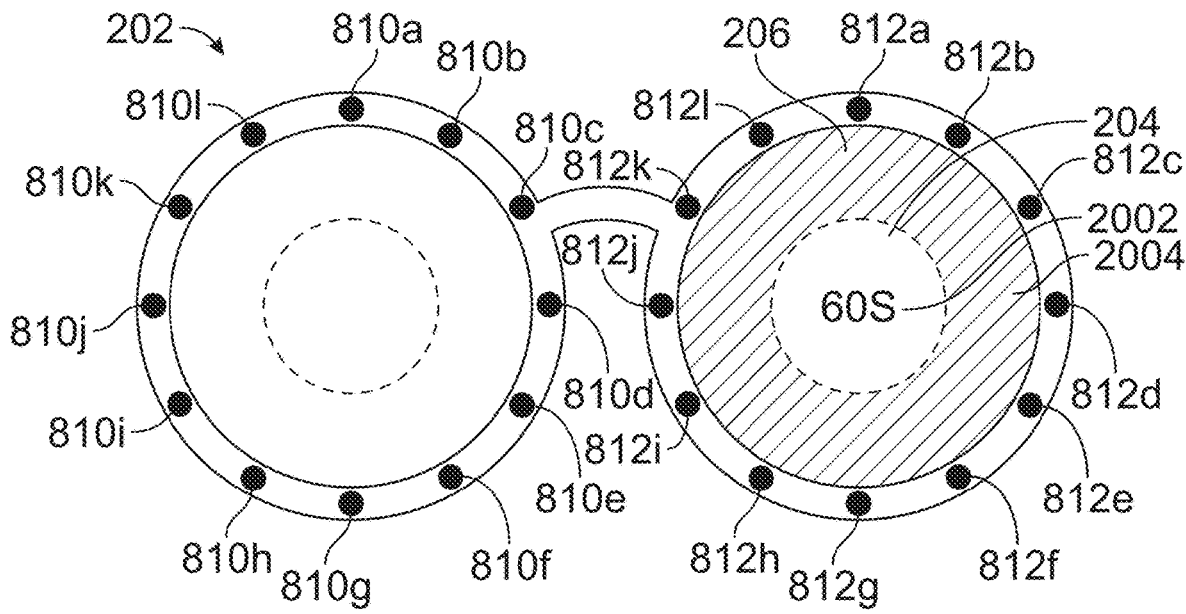
FIGS. 20A-20D depict an exemplary technique for managing one or more displays based on data associated with one or more processes in accordance with some embodiments.

FIG. 20A depicts device 202 displaying a CGR environment that includes representation of time 2002. Representation of time 2002 is displayed via primary display 204 and indicates that a process has a remaining time of 60 seconds. In some embodiments, representation of time 2002 is representative of a process associated with a timer application, delivery application, workout application, meeting application, productivity application, etc. In some embodiments, representation of time 2002 is displayed via primary display 204 because a determination has been made that representation of time 2002 is permitted to be displayed via primary display 204.

Concurrently with representation of time 2002, representation of the time 2004 is displayed via secondary display 206. Representation of time 2004 includes a colored overlay that covers the entirety of secondary display 206 to indicate a time remaining of 60 seconds. In some embodiments, representation of time 2004 indicates the time represented by representation of time 2002. In other words, in some embodiments, a representation displayed via one display can correspond to or be representative of a representation displayed via another display.

In some embodiments, representation of time 2002 is displayed via secondary display 206 because a determination has been made that representation of time 2004 is permitted to be displayed via secondary display 206.

As depicted in FIG. 20A, representation of time 2004 indicates a percentage of time remaining when compared to an initiation time of a timer or process. For example, representation 2004 indicates that the percentage of time remaining is 100% when assuming that the process was initiated to end in 60 seconds.

Concurrently with representation of time 2002 and representation of time 2004, device 202 causes the LEDs to emit light, as shown in FIG. 20A. Like representation of time 2004, the LEDs indicate the time represented by representation of time 2002 and, thus, correspond to representation of time 2002. Here, all of the LEDs are emitting light because the percentage of time remaining is 100% when assuming that the process was initiated to end in 60 seconds.

Figure 20B:
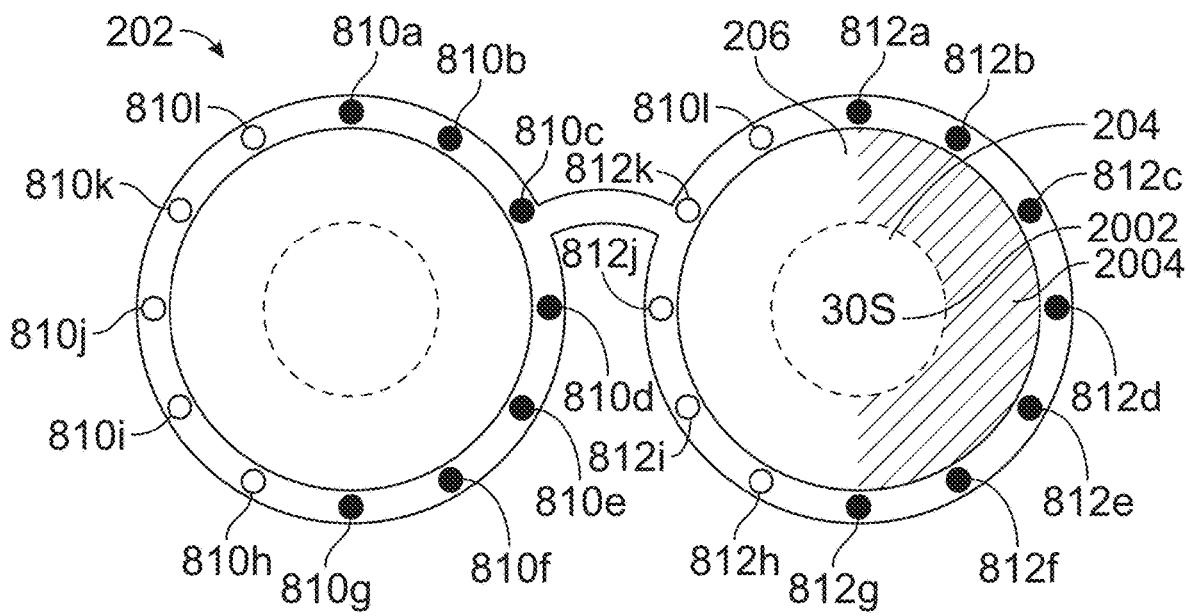

As illustrated in FIG. 20B, assume that device 202 receives an indication that the process has a remaining time of 30 seconds. In response to receiving the indication, device 202 updates representation of the time 2002 and the representation of the time 2004. In FIG. 20B, representation of time 2004 includes a colored overlay that covers roughly half the area of secondary display 206. In some embodiments, representation 2004 in FIG. 20B represents that the time remaining (e.g., 30 seconds) is 50% of the original time (e.g., 60 seconds in FIG. 20A) to which the process was set. In addition, device 202 also causes half of the LEDs (e.g., 810a-810l and 812a-812l) to cease to emit light in accordance with the time remaining being at least 50% of the original time.

Figure 20C:
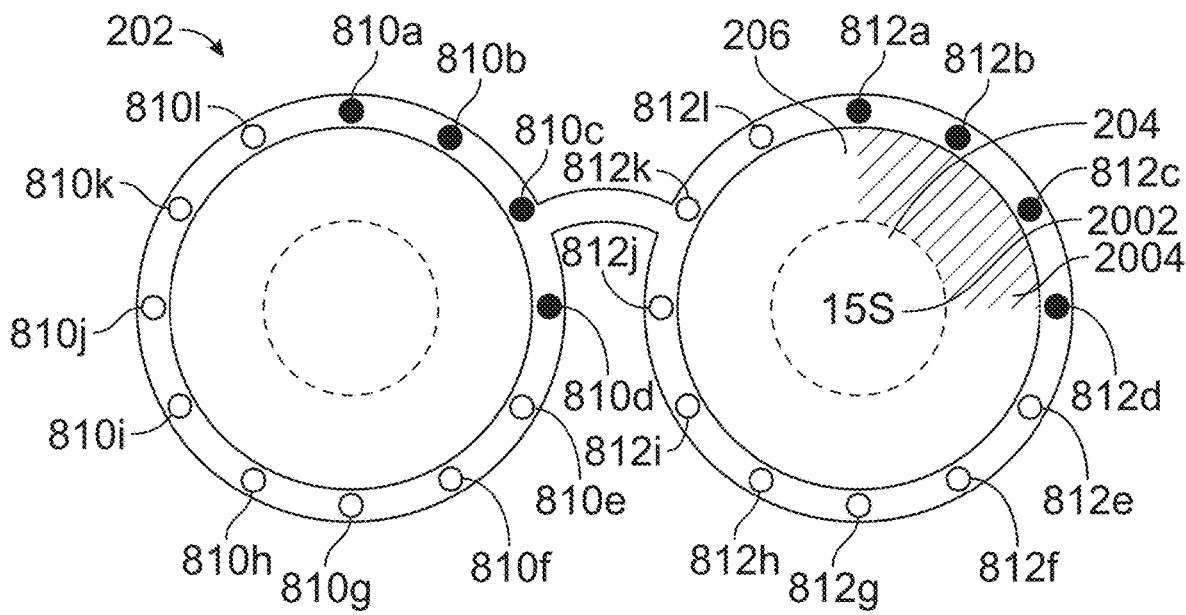
Figure 20D:
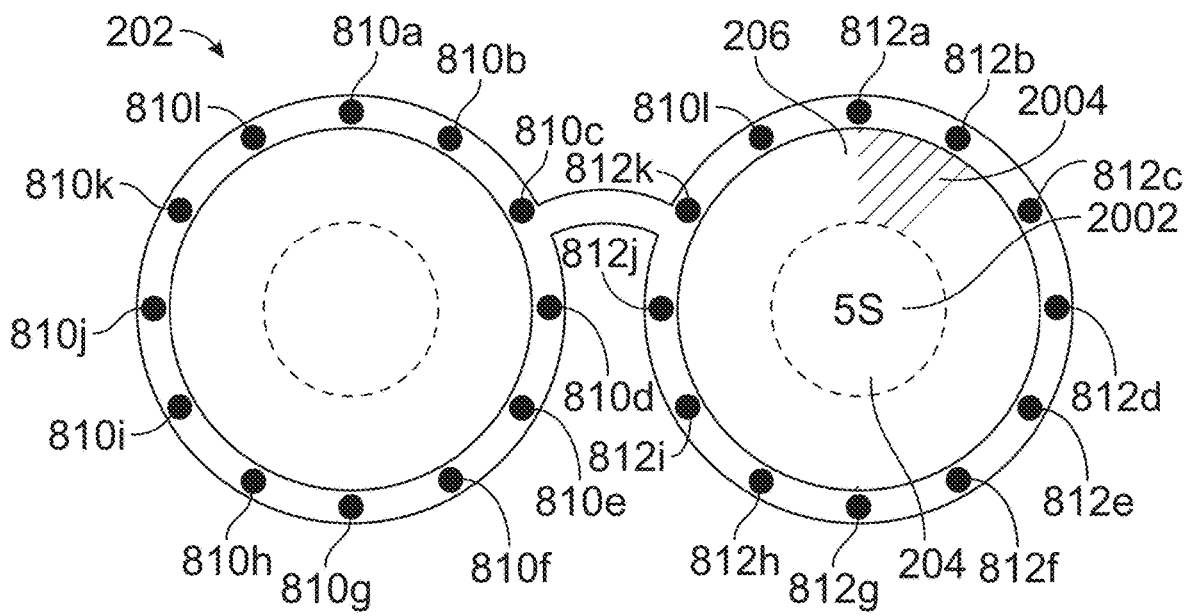

As illustrated in FIG. 20C-20D, the time remaining is 15 seconds and 5 seconds, respectively. As illustrated in FIG. 20C-20D, device 202 continues to update primary display 204, secondary display 206, and LEDs (e.g., 810a-810l and 812a-812l) based on the remaining time (e.g., 15 second in FIG. 20C and 5 seconds in FIG. 20D) of the process.

However, contrary to FIGS. 20A-20C, device 202 causes more than the expected portion (e.g., more than $\frac{1}{12}^{th}$) of LEDs to emit light in FIG. 20D. Here, device 202 causes all of the LEDs to emit light to provide an indication that the time remaining is less than a predetermined minimum time.

In some embodiments, device 202 causes one or more of the LEDs and/or secondary display 206 to animate (e.g., pulsate, brighten) as the time remaining moves closer to zero. In some embodiments, secondary display 206 and/or the LEDs change to a different color and/or tint when a predetermined amount of time is remaining. For example, secondary display 206 can change from translucent to red when a predetermined amount of time is remaining. In some embodiments, one or more of the LEDs and/or secondary display 206 animate while one or more of the other displays do not animate. In some embodiments, secondary display 206 can overlap primary display 204, such that the animations shown in the overlapping portion of secondary display 206 are shown in the center (e.g., an area that corresponds to an around the pupil of a user) of the displays of device 202.

FIGS. 21A-21D and 25 depict an exemplary technique for managing one or more displays based on data associated with one or more processes in accordance with some embodiments.

Figure 21A:
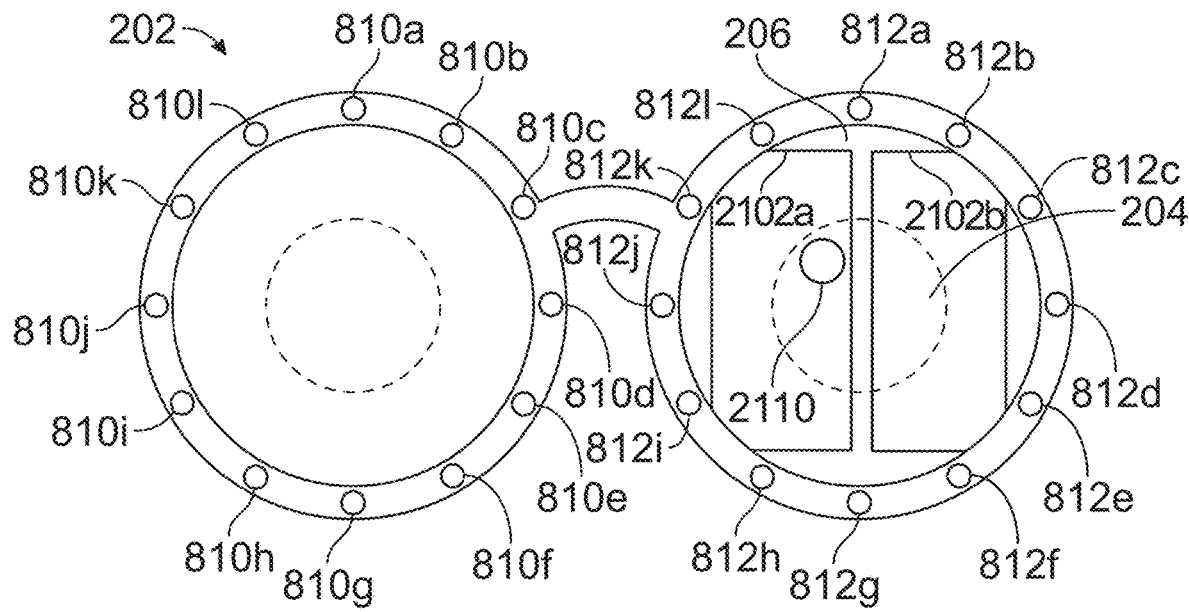
FIGS. 21A-21D depict an exemplary technique for managing one or more displays based on data associated with one or more processes in accordance with some embodiments.

FIG. 21A depicts device 202 displaying a CGR environment that includes device 2102a and device 2102b. As depicted in FIG. 21A, device 2102a and device 2102b are in the field-of-views of primary display 204 and secondary display 206.

As illustrated in FIG. 21A, user interface (UI) element 2110 is displayed on device 2102a. For example, UI element 2110 can be one or more icons, files, application shortcuts, characters, etc.

Figure 21B:
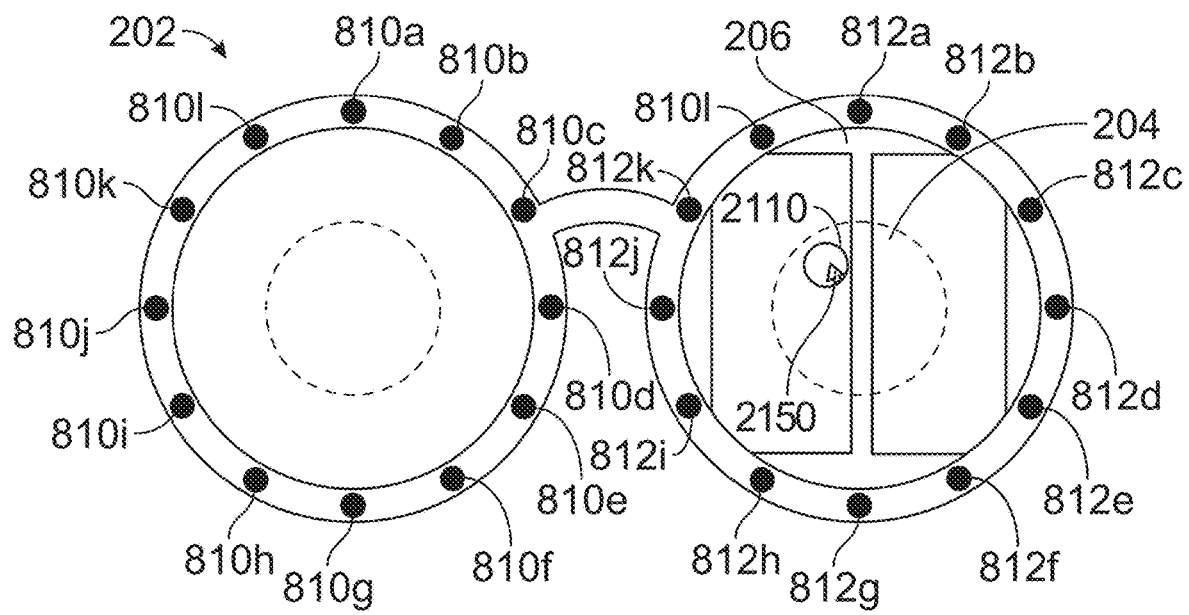

With reference to FIG. 21B, device 202 detects drag-and-drop input 2150 on UI element 2110. In response detecting drag-and-drop input 2150 on UI element 2110, device 202 determines if information associated with the status of the drag-and-drop input can be displayed via the LEDs. As depicted in FIG. 21B, device 202 causes the LEDs to emit light because of this determination.

With reference to FIG. 21B, assume device 202 detects movement of drag-and-drop input 2150. In response to detecting the movement of drag-and-drop input 2150, device 202 displays UI element 2110 moving from a position on device 2102a to a position on device 2102b.

Figure 21C:
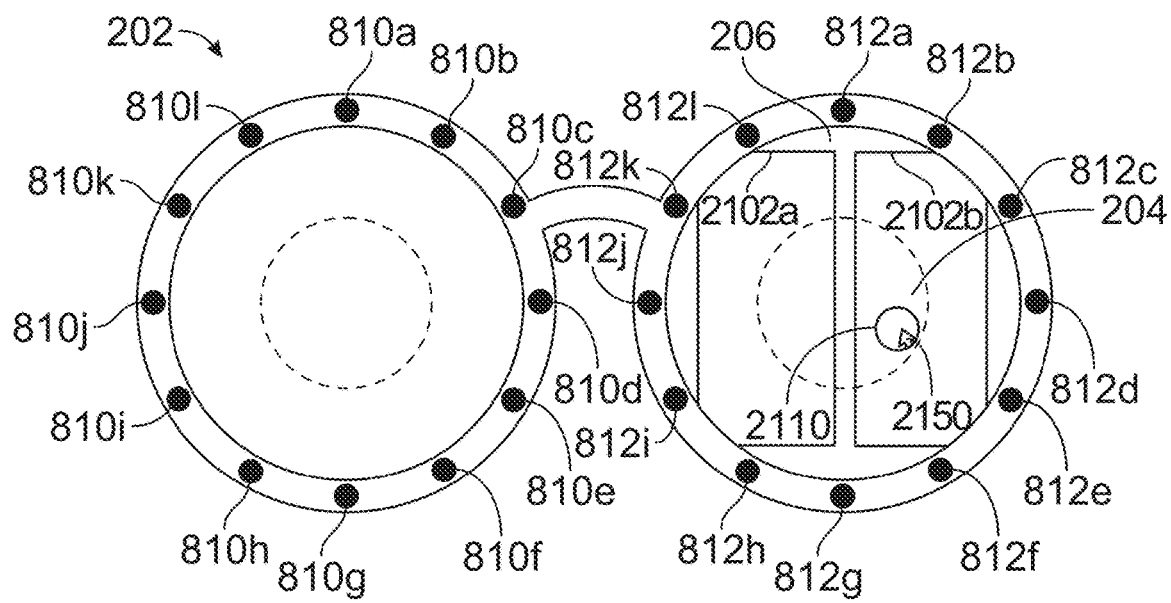

FIG. 21C depicts UI element 2110 at the position on device 2102b. As depicted in FIG. 21C, the LEDs continue to emit light because UI element 2110 remains selected.

Figure 21D:
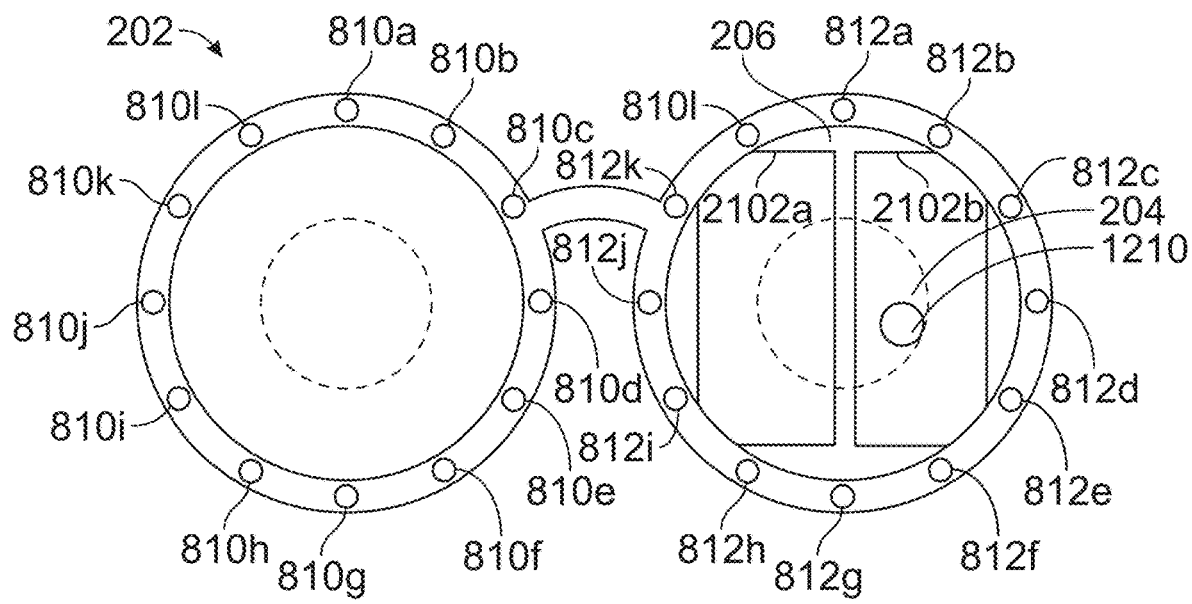

With reference to FIG. 21C, assume device 202 detects that UI element 2110 is not selected. In response to detecting that UI element 2110 is not selected, device 202 forgoes causing the LEDs to emit light as depicted in FIG. 21D. In some embodiments, in response to detecting that UI element 2110 is not selected, device 202 causes one or more of the LEDs to emit light differently. For example, device 202 can cause one or more of the LEDs to emit a light that is a different color than it was previously emitting in FIG. 21C while UI element 2110 was selected.

In some embodiments, causing one or more of the LEDs to emit light differently indicates completion or an effect of a user action. For example, device 202 can cause the LEDs to emit light differently in accordance with the rhythm of a media file that is played after a user has dragged the media file from device 2102a to device 2102b.

In some embodiments, device 202 performs the techniques described above (e.g., in FIGS. 21A-21D), with respect to drag-and-drop input 2150, to indicate other user interactions and/or states of applications. For example, in some embodiments, device 202 performs the techniques described above when a dragging, releasing, copying, editing, clipping, or moving operation is detected. In some embodiments, device 202 performs the techniques described above when device 202 receives data concerning a state of an application or process, such as a state associated with the downloading of a file, a state associated with the playing of media, a state associated with the completion of an exercise routine, a state associated with the completion of periodic goals (e.g., health goals, productivity goals), etc.

Figure 22A:
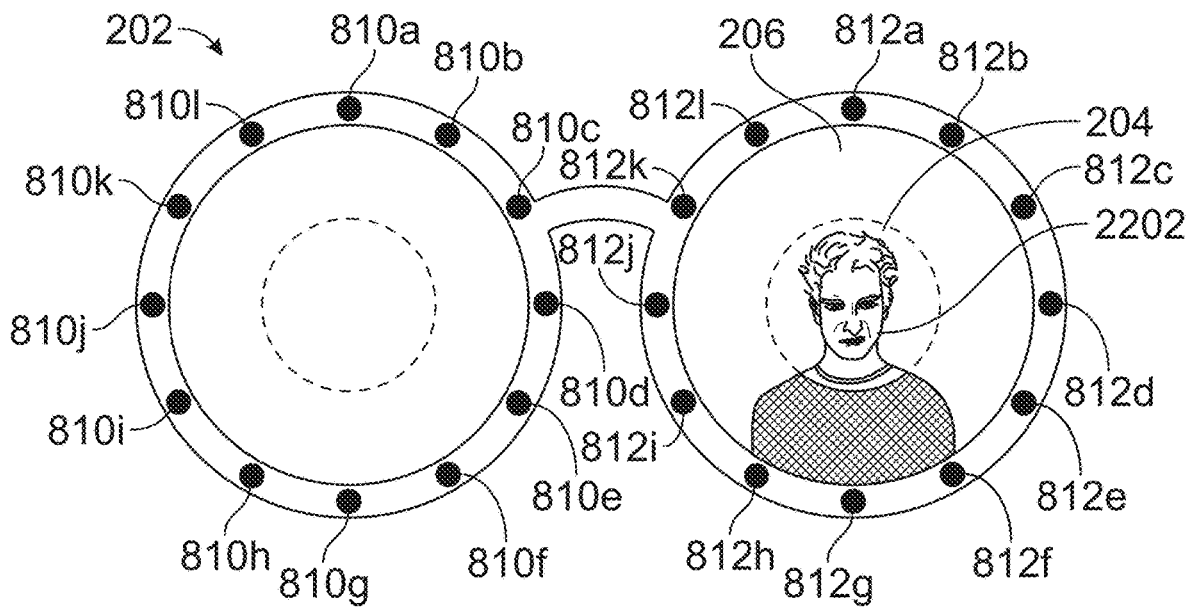
FIGS. 22A-22B depict an exemplary technique for managing one or more displays based on data associated with one or more processes in accordance with some embodiments.
Figure 22B:
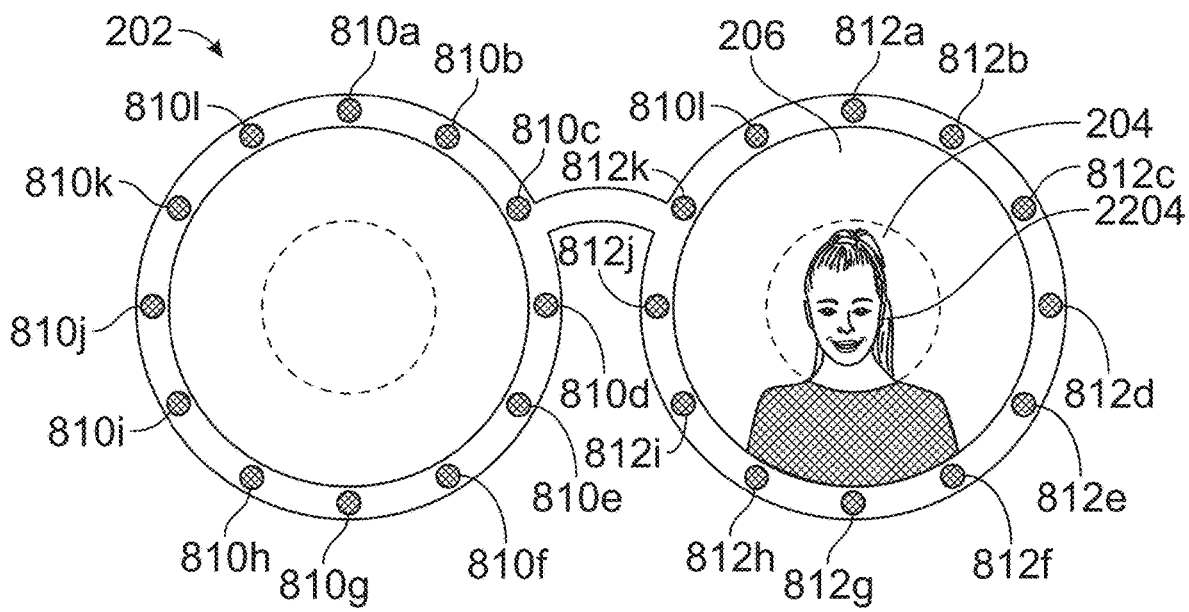

FIGS. 22A-22B and 25 depict an exemplary technique for managing one or more displays based on data associated with one or more processes in accordance with some embodiments.

FIG. 22A depicts device 202 displaying a CGR environment that includes person 2202. Person 2202 is in the field-of-views of and seen through primary display 204 and secondary display 206.

As depicted in FIG. 22A, person 2202 is frowning. With reference to FIG. 22A, assume device 202 receives data representing the mood of person 2202 that is processed by one or more algorithms, such as one or more facial recognition algorithms. In some embodiments, the one or more algorithms can determine that person 2202 is frowning and send data that is representative of this determination.

In response to receiving the data representing that person 2202 is frowning, device 202 determines that information related to the data is permitted to be displayed via the LEDs. In some embodiments, in accordance with this determination, device 202 causes the LEDs to emit light in a first state. For example, FIG. 22A shows the LEDs being in the first state (e.g., the LEDs are filled-in). In some embodiments, device 202 updates only a portion of the LEDs that are depicted solid in FIG. 22A.

In some embodiments, device 202 updates secondary display 206 with a colored overlay in a state to suggest the mood of person 22A (e.g., in accordance with a determination that data is permitted to be displayed via secondary display 206).

FIG. 22B depicts device 202 displaying a CGR environment that includes person 2204. As depicted in FIG. 22B, person 2204 is smiling as opposed to person 2202 in FIG. 22A. With reference to FIG. 22B, assume device 202 receives data representing the mood of person 2204 that is processed by one or more algorithms, such as one or more facial recognition algorithms.

In response to receiving the data representing the mood of the person 2204, device 202 determines that information related to the data is permitted to be displayed via the LEDs. In some embodiments, in accordance with this determination, device 202 causes the LEDs to emit light in a second state as opposed to the first state. For example, FIG. 22B depicts the LEDs being in the second state by illustrating the LEDs as being hatched. Here, device 202 causes the LEDs to emit light differently in the second state than in the first state because the data represents a different mood of the user.

In some embodiments, data representing other moods (e.g., sad, content, etc.) or other types of data can be displayed using similar techniques to those described above in relation to FIGS. 22A-22B. For example, other types of data can include the state of financial markets, weather forecasts, ratings (e.g., restaurant ratings, movie ratings, etc.).

Figure 23A:
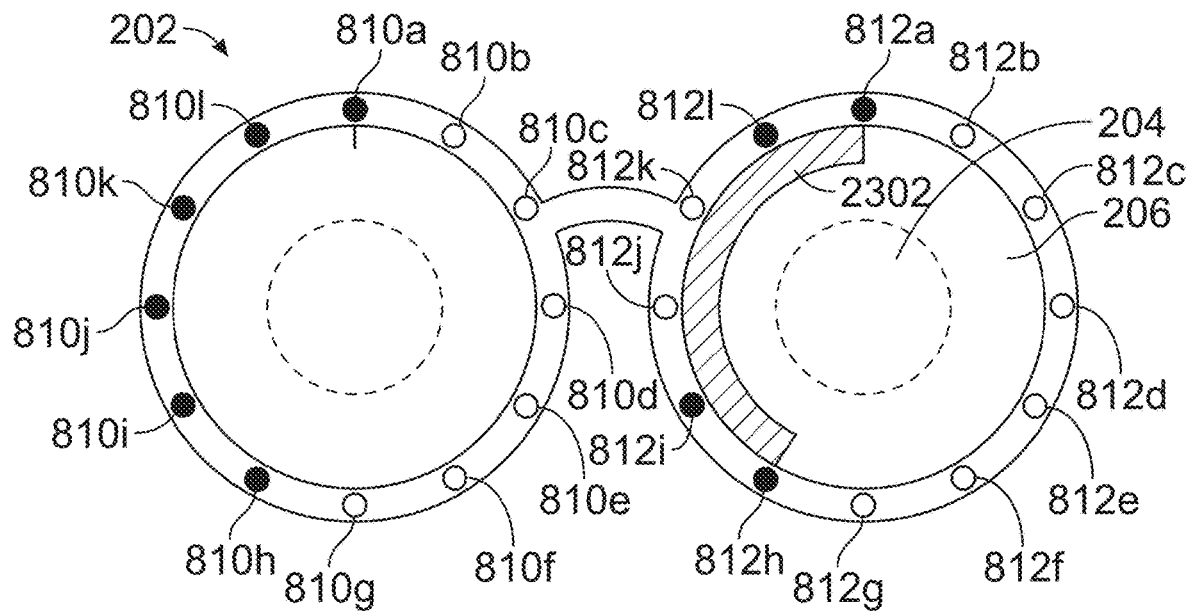
FIGS. 23A-23B depict an exemplary technique for managing one or more displays based on data associated with one or more processes in accordance with some embodiments.
Figure 23B:
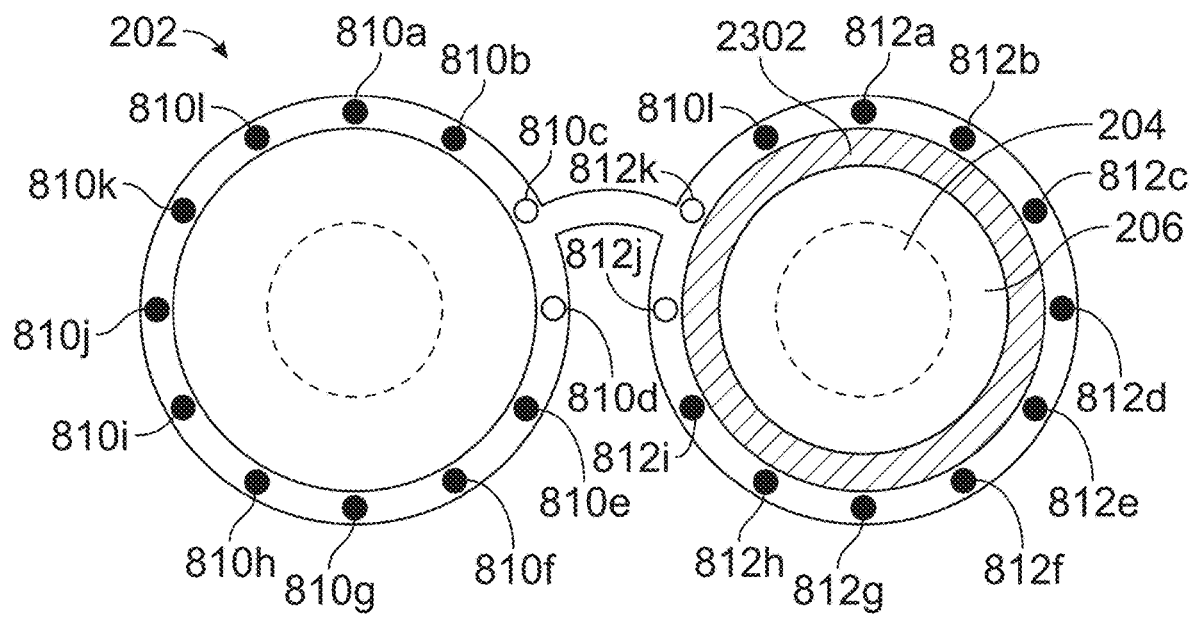

FIGS. 23A-23B and 25 depict an exemplary technique for managing one or more displays based on data associated with one or more processes in accordance with some embodiments.

FIG. 23A depicts device 202 displaying a CGR environment that includes representation 2302 of a progress indicator displayed via secondary display 206. In some embodiments, representation 2302 indicates one or more metrics that are being tracked. For example, a metric can be a number of steps taken (or left to meet a goal), a download speed, a number of workouts over a period of time, and/or any other metrics. In some embodiments, representation 2302 corresponds to data received from one or more health applications, such as a walking application, training application, strength training application, etc.

In some embodiments, device 202 causes the LEDs to emit light that is representative of the progress indicator based on a determination that information related to the progress indicator is permitted to be displayed via the LEDs. For example, as depicted in FIG. 23A, LEDs 810a and 810h-810l are emitting light, where LEDs 810a and 810h-810l correspond to the length and the position of representation 2302. LEDs 810a and 810h-810l indicate the level of the progress indicator.

In some embodiments, as depicted in FIG. 23A, LEDs 812a, 812h, 812i, 812l emit light. LEDs 812a, 812h, 812i, 812l are on the right side of device 202 along the length of representation 2302. LEDs 812a, 812h, 812i, 812l also indicate the level of the progress indicator. Notably, device 202 LEDs 812j and 812k do not emit light because they are within a certain distance from the nose of a user wearing device 202.

With reference to FIG. 23B, device 202 updates representation 2302 via secondary display 206 and the LEDs to indicate that the progress of a tracked metric has been fulfilled. Notably, LEDs 812j and 812k continue not to emit light because they are within a certain distance to the nose of a user wearing device 202.

FIGS. 24A-24D depict an exemplary technique for managing one or more displays based on data associated with one or more processes in accordance with some embodiments. FIGS. 24A-24D depict a scenario where device 202 causes one or more of LEDs 810a-2101 and 812a-812l to emit light sequentially in a clockwise pattern around both eyes of a user wearing device 202. In some embodiments, the pattern can indicate a direction to the user and could replace or be used in addition to the examples described above in relation to FIGS. 8A-8B, 9A-9B, 10A-10B, 11A-11B, 12A-12B, 13A-13B, 14A-14B, 15, and 16.

Figure 24A:
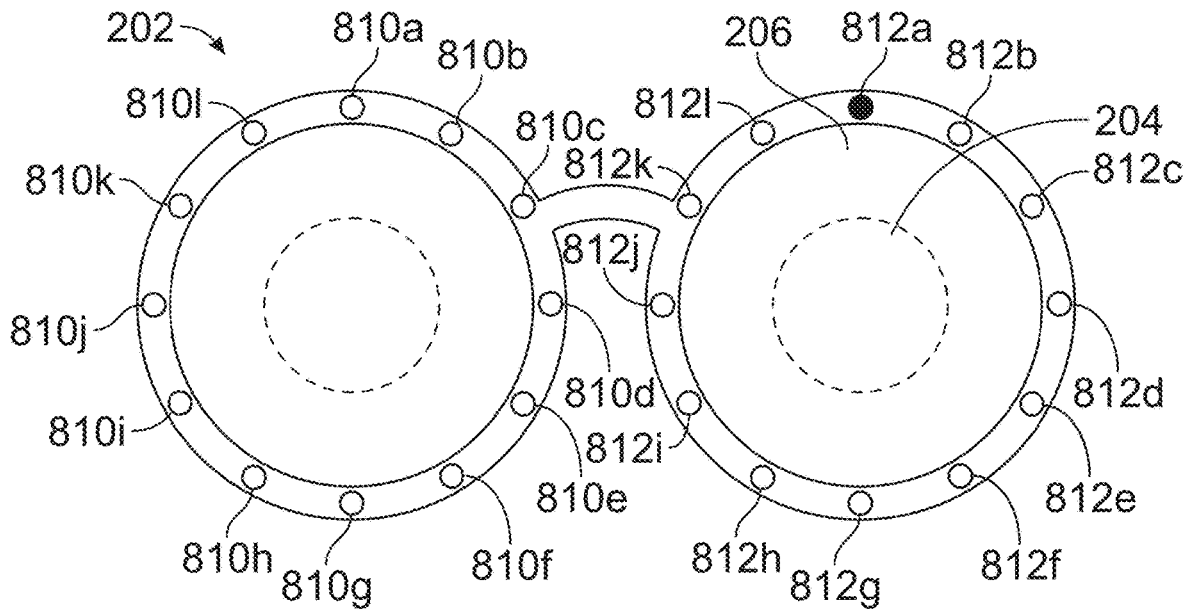
FIGS. 24A-24D depict an exemplary technique for managing one or more displays based on data associated with one or more processes in accordance with some embodiments.
Figure 24B:
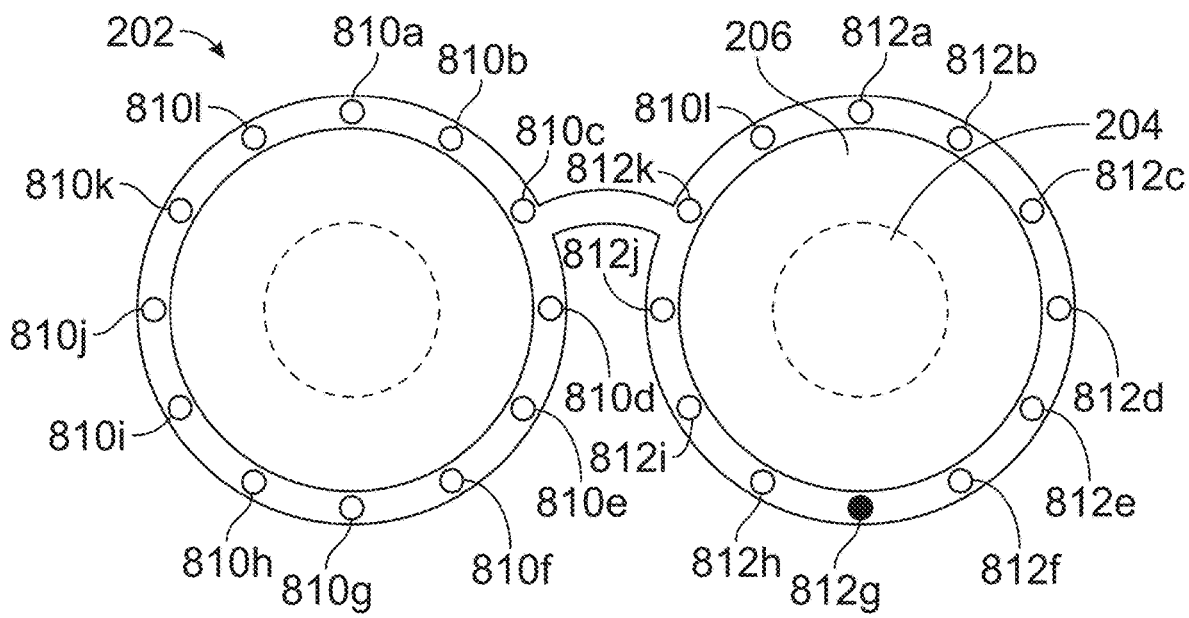
Figure 24C:
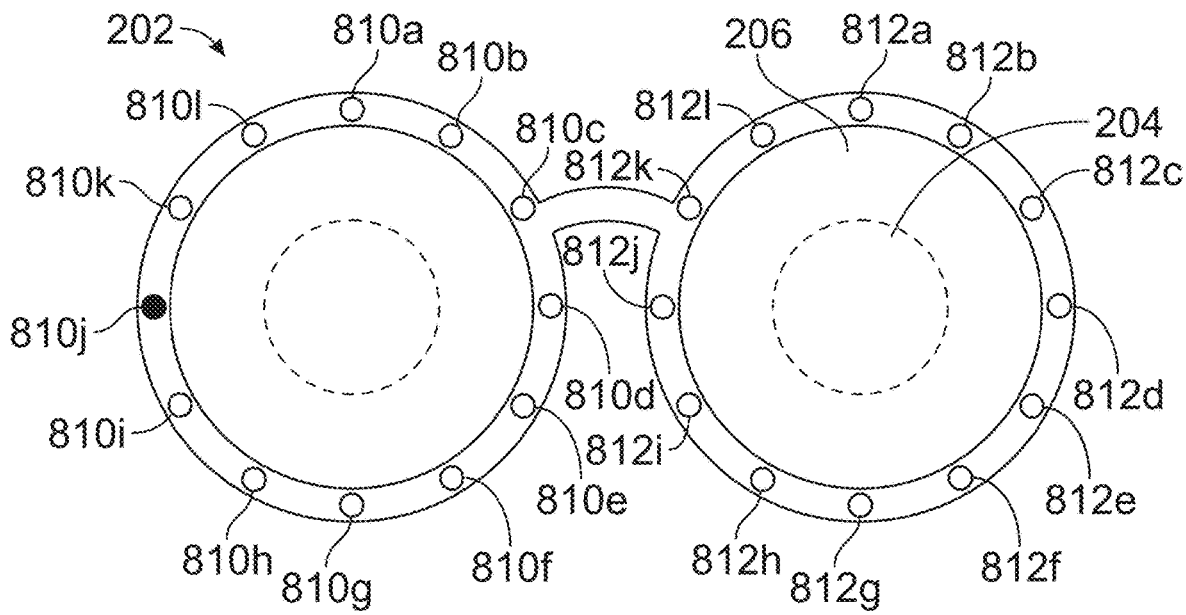
Figure 24D:
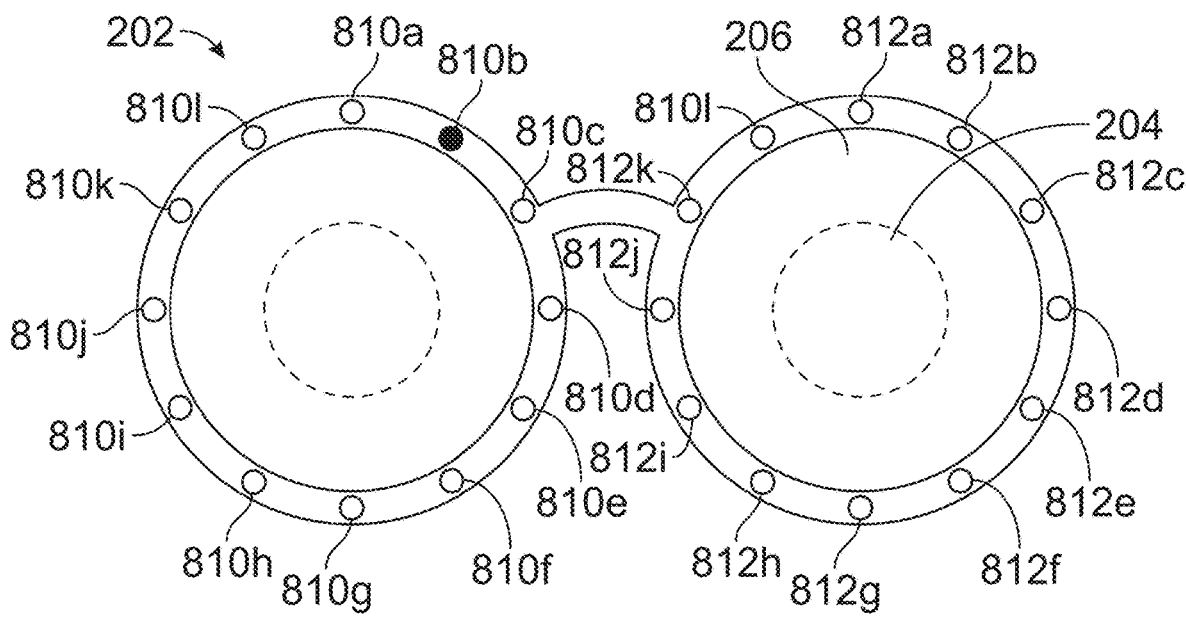

For example, the LEDs can emit a pattern, where the LEDs turn on and off sequentially, which resembles a point moving around a circle. The circle can be animated around one or more eyes of the user wearing device 202 in a clockwise or counter-clockwise direction. In some embodiments, when drawing the pattern around both eyes of the user, device 202 transitions between the LEDs of the right and left sides of device 202, as shown in FIGS. 24B-24C, where device 202 skips a portion of the LEDs (e.g., 810g and 810h) in the sequence.

FIG. 25 is a flow diagram illustrating a method for managing one or more displays based on data associated with one or more processes in accordance with some embodiments. In some embodiments, the method is performed by system 100 (FIGS. 1A and 1). In some embodiments, the method is performed by device 202 (FIG. 2A). In some embodiments, the method is performed by a third device or system that is different from device 202 or system 100. In some embodiments, the method is performed by a combination of one or more of system 100, device 202, and the third device or system.

At block 2502, information corresponding to a change in a status of a process is received. In some embodiments, information can be one or more notifications, alerts, and/or one or more outputs from one or more functions, processes, applications, sensors, etc. In some embodiments, sensors can include one or more health sensors, heart rate sensors, pedometers, heat sensors, etc.

In some embodiments, information is computed based on one or more environmental factors or data from one or more applications. For example, in FIGS. 20A-20D, device 202 can compute the start or end of a process as described above. In some embodiments, an environmental factor can include data that corresponds to the weather, characteristics of one or more users or devices within an environment, etc.

With reference to FIG. 25, at blocks 2504 and 2506, a first representation corresponding to the status of the process is displayed via the secondary display in response to receiving information corresponding to the changed status of the process and in accordance with a determination that first criteria are satisfied. For example, the representation may include one or more representations, such as representation status indicator 1702a1 in FIG. 17B, a color overlay displayed across secondary display 206 in FIG. 18, indicator 1912 in FIG. 19B, representation 2004 in FIGS. 20A-20D, representation 2302 of a progress indicator in FIGS. 23A-23B, etc.

In some embodiments, the first criteria include a criterion that is met when a determination is made that directional information for the object is permitted to be displayed via the secondary display, as described above in relation to FIGS. 8A-8B, 9A-9B, 10A-10B, 11A-11B, 12A-12B, 13A-13B, 14A-14B, 15, and 16.

With reference to FIG. 25, at blocks 2504 and 2506, a second representation corresponding to the status of the process is displayed in response to receiving information corresponding to the change in status of the process and in accordance with a determination that second criteria are satisfied. For example, 810a-810l and 812a-812l in FIGS. 17A-17B, 18, 19A-19B, 20A-20D, 21A-21D, 22A-22B, 23A-23B, and 24A-24D.

In some embodiments, the second criteria include a criterion that is met when a determination is made that the object is permitted to be displayed via the tertiary display as described above in relation to FIGS. 8A-8B, 9A-9B, 10A-10B, 11A-11B, 12A-12B, 13A-13B, 14A-14B, 15, and 16.

In some embodiments, the second representation is different from the first representation. In some embodiments, the first representation is a virtual object, and the second representation is not a virtual object.

In some embodiments, one or more of the first representation and the second representation are associated with (e.g., corresponding to one or more processes of the same application) a third representation that is presented via the primary display. For example, in FIGS. 20A-20D, representation 2004 displayed via the secondary display and the LEDs (e.g., the tertiary display) are both associated with representation of time 2002, which is displayed via primary display 204.

In some embodiments, while presenting the first representation, a second virtual object is concurrently displayed with the first representation. In some embodiments, the first representation highlights at least a portion of the second virtual or physical object displayed via the secondary display. For example, in FIG. 19B, indicator 1912 highlights (or brackets) object 1910a display via secondary display 206.

In some embodiments, one or more of the first representation and the second representation include a progress indicator. In some embodiments, the progress indicator updates to show a change in a metric associated with the device as described above in relation to representation 2302 in FIGS. 23A-23B.

In some embodiments, the first representation includes an application icon. In some embodiments, the process is associated with an application that includes a status indicator that updates based on the process. For example, in FIGS. 17A-17B, status indicator 1702a1 is displayed in response to receiving data associated with a messaging application.

In some embodiments, one or more of the first representation and the second representation are displayed based on one or more sensors. In some embodiments, the one or more sensors include a heart rate sensor. In some embodiments, the received information corresponds to data detected via the heart rate sensor. In some embodiments, as a part of displaying one or more of the first representation (e.g., 206 in FIG. 18) and the second representation based on at least one of the one or more sensors, an animation is displayed based data detected via heart rate sensor.

In some embodiments, the received information corresponds to an alert that corresponds to an application. In some embodiments, one or more of the first representation and the second representation are presented based on the alert that corresponds to the application as described above, for example, in relation to FIG. 18.

In some embodiments, the received information corresponds to an alert that corresponds to a calendar event. In some embodiments, one or more of the first representation and the second representation are presented based on the alert that corresponds to the calendar event as described above, for example, in relation to FIG. 18.

In some embodiments, the received information corresponds to data obtained via a facial recognition algorithm. In some embodiments, one or more of the first representation and the second representation are presented based on the data obtained via a facial recognition algorithm as described above, for example, in relation to the LEDs in FIGS. 22A and 22B.

In some embodiments, the received information corresponds to a state of an application. In some embodiments, one or more of the first representation and the second representation are presented based on the state of the application. For example, in FIGS. 21A-21D, the LEDs are updated based on whether drag-and-drop input 2150 is detected.

In some embodiments, the received information corresponds to the detected posture of a user. In some embodiments, one or more of the first representation and the second representation are presented based on a detected posture of a user wearing the device. In some embodiments, the first representation is displayed based on a detected eye position of a user. For example, the representation can be a line that is representative of the current posture or eye position of a user. In some embodiments, in response to detecting the change in posture or the eye position of the user, the line is updated to indicate the new (or, alternatively, the change in) posture or eye position. In some embodiments, the line is only displayed via the secondary display. In some embodiments, the LEDs can emit light in various combinations that are indicative of the new (or, alternatively, the change in) posture or eye position.

As described above, one aspect of the present technology is the gathering and use of data available from various sources to provide specialized resource management of devices with additive displays (e.g., devices with additive displays) to conserve battery life for users and to provide specialized content to users of the devices. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to conserve the battery life of a user's device. Accordingly, for example, the use of such personal information data helps the system to properly manage resources to conserve battery life for the devices. Further, other uses for personal information data that benefit the user are also contemplated by the present disclosure. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data privacy and security. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of managing resources for low-powered devices, the present technology can be configured to allow users to select to "opt in" or "opt out" of participation in the collection of personal information data during registration for services or anytime thereafter. In another example, users can select not to provide eye-tracking data, such as pupil location, pupil dilation, and/or blink rate for specialized resource management. In yet another example, users can select to limit the length of time the eye-tracking data is maintained or entirely prohibit the development of a baseline eye-tracking profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health-related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers the use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, resources of low-powered devices can be managed and content (e.g., status updates and/or objects) can be selected and delivered to users by inferring preferences based on non-personal information data or a bare minimum amount of personal information, such as the content being requested by the device associated with a user, other non-personal information available to the system controlling the device, or publicly available information.

What is claimed is:

1. A head-mounted display (HMD) device, comprising:
   one or more image sensors;
   a primary display that extends across a field-of-view and has a first resolution;
   a secondary display that is physically and electronically coupled to the primary display and has a second resolution that is lower than the first resolution;
   one or more processors; and
   memory storing one or more programs configured to be executed by the one or more processors, the one or more programs including instructions for:
      detecting an object in a computer-generated reality (CGR) environment at a first location; and
      in response to detecting the object in the CGR environment at the first location:
         in accordance with a determination that the first location is within a first predetermined distance outside of the field-of-view of the primary display of the HMD device, displaying, via the secondary display of the HMD device, a first modified representation of the object that is visually distinguished from a first actual representation of the object; and
         in accordance with a determination that the first location is within the field-of-view of the primary display and not within the field-of-view of the secondary display:
            displaying, via the primary display, the first actual representation; and
            forgoing to display, via the secondary display, the first modified representation.

2. The HMD device of claim 1, wherein first modified representation has visual content that is different from visual content of the first actual representation.

3. The HMD device of claim 1, wherein the first modified representation has a size that is based on a distance between the first location and the field-of-view of the primary display of the HMD device.

4. The HMD device of claim 1, wherein the first modified representation has a brightness that is based on a size of the object.

5. The HMD device of claim 1, wherein the first modified representation has a blur that is higher than a blur of the first actual representation.

6. The HMD device of claim 1, wherein displaying the first modified representation includes displaying an animation.

7. The HMD device of claim 1, the one or more programs further including instructions for:
   in response to detecting the object in the CGR environment at the first location:
      in accordance with a determination that the first location is within the field-of-view of the primary display and a field-of-view of the secondary display:
         displaying, via the primary display, a second actual representation of a first portion of the object; and
         while displaying, via the primary display, the second actual representation of the first portion of the object, displaying, via the secondary display, a second modified representation of a second portion of the object.

8. The HMD device of claim 7, wherein the second actual representation is displayed at a higher resolution than the second modified representation.

9. The HMD device of claim 7, wherein the second actual representation is displayed adjacent to an edge of the primary display.

10. The HMD device of claim 7, wherein:
displaying, via the primary display, the second actual representation includes applying a visual effect to the second actual representation; and
the second actual representation of the object after applying the visual effect has a blur that is greater than a blur of the second actual representation of the object before the visual effect was applied.

11. The HMD device of claim 1, the one or more programs further including instructions for:
in response to detecting the object in the CGR environment at the first location:
in accordance with a determination that the first location is within a second predetermined distance outside of the field-of-view of the primary display of the HMD device, wherein the second predetermined distance is different from the first predetermined distance:
displaying, via the primary display, a representation that corresponds to directional information to locate the object, wherein the representation that corresponds to the directional information to locate the object is different from the first actual representation.

12. A non-transitory computer-readable storage medium storing one or more programs configured to be executed by one or more processors of a head-mounted display (HMD) device having one or more sensors, a primary display that extends across a field-of-view and has a first resolution, and a secondary display that is physically and electronically coupled to the primary display and has a second resolution that is lower than the first resolution, the one or more programs including instructions for:
detecting an object in a computer-generated reality (CGR) environment at a first location; and
in response to detecting the object in the CGR environment at the first location:
in accordance with a determination that the first location is within a first predetermined distance outside of the field-of-view of the primary display of the HMD device, displaying, via the secondary display of the HMD device, a first modified representation of the object that is visually distinguished from a first actual representation of the object; and
in accordance with a determination that the first location is within the field-of-view of the primary display and not within the field-of-view of the secondary display:
displaying, via the primary display, the first actual representation; and
forgoing to display, via the secondary display, the first modified representation.

13. The non-transitory computer-readable storage medium of claim 12, the one or more programs further including instructions for:
in response to detecting the object in the CGR environment at the first location:
in accordance with a determination that the first location is within the field-of-view of the primary display and a field-of-view of the secondary display:
displaying, via the primary display, a second actual representation of a first portion of the object; and
while displaying, via the primary display, the second actual representation of the first portion of the object, displaying, via the secondary display, a second modified representation of a second portion of the object.

14. The non-transitory computer-readable storage medium of claim 13, wherein the second actual representation is displayed at a higher resolution than the second modified representation.

15. The non-transitory computer-readable storage medium of claim 13, wherein the second actual representation is displayed adjacent to an edge of the primary display.

16. The non-transitory computer-readable storage medium of claim 13, wherein:
displaying, via the primary display, the second actual representation includes applying a visual effect to the second actual representation; and
the second actual representation of the object after applying the visual effect has a blur that is greater than a blur of the second actual representation of the object before the visual effect was applied.

17. The non-transitory computer-readable storage medium of claim 12, the one or more programs further including instructions for:
in response to detecting the object in the CGR environment at the first location:
in accordance with a determination that the first location is within a second predetermined distance outside of the field-of-view of the primary display of the HMD device, wherein the second predetermined distance is different from the first predetermined distance:
displaying, via the primary display, a representation that corresponds to directional information to locate the object, wherein the representation that corresponds to the directional information to locate the object is different from the first actual representation.

18. A method, comprising:
at a system having one or more processors, memory, one or more image sensors, and a head-mounted display (HMD) device, the HMD device including a primary display that extends across a field-of-view and has a first resolution, and a secondary display that is physically and electronically coupled to the primary display and has a second resolution that is lower than the first resolution:
detecting an object in a computer-generated reality (CGR) environment at a first location; and
in response to detecting the object in the CGR environment at the first location:
in accordance with a determination that the first location is within a first predetermined distance outside of the field-of-view of the primary display of the HMD device, displaying, via the secondary display of the HMD device, a first modified representation of the object that is visually distinguished from a first actual representation of the object; and
in accordance with a determination that the first location is within the field-of-view of the primary display and not within the field-of-view of the secondary display:
displaying, via the primary display, the first actual representation; and
forgoing to display, via the secondary display, the first modified representation.

19. The method of claim 18, further comprising:
in response to detecting the object in the CGR environment at the first location:
in accordance with a determination that the first location is within the field-of-view of the primary display and a field-of-view of the secondary display:
displaying, via the primary display, a second actual representation of a first portion of the object; and
while displaying, via the primary display, the second actual representation of the first portion of the object, displaying, via the secondary display, a second modified representation of a second portion of the object.

20. The method of claim 19, wherein the second actual representation is displayed at a higher resolution than the second modified representation.

21. The method of claim 19, wherein the second actual representation is displayed adjacent to an edge of the primary display.

22. The method of claim 19, wherein:
displaying, via the primary display, the second actual representation includes applying a visual effect to the second actual representation; and
the second actual representation of the object after applying the visual effect has a blur that is greater than a blur of the second actual representation of the object before the visual effect was applied.

23. The method of claim 18, further comprising:
in response to detecting the object in the CGR environment at the first location:
in accordance with a determination that the first location is within a second predetermined distance outside of the field-of-view of the primary display of the HMD device, wherein the second predetermined distance is different from the first predetermined distance:
displaying, via the primary display, a representation that corresponds to directional information to locate the object, wherein the representation that corresponds to the directional information to locate the object is different from the first actual representation.

* * * * *